(12) United States Patent
Gotou et al.

(10) Patent No.: US 6,262,557 B1
(45) Date of Patent: Jul. 17, 2001

(54) MOTOR WITH ELECTRONIC DISTRIBUTING CONFIGURATION

(75) Inventors: Makoto Gotou, Nishinomiya; Masaaki Ochi, Hirakata, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/325,983

(22) Filed: Jun. 4, 1999

Related U.S. Application Data

(63) Continuation of application No. 09/123,164, filed on Jul. 27, 1998, now Pat. No. 5,982,118.

(30) Foreign Application Priority Data

Aug. 6, 1997 (JP) .................................................... 9-211508
Apr. 15, 1998 (JP) .................................................. 10-104472

(51) Int. Cl.[7] .................................................... H02P 7/628
(52) U.S. Cl. .......................... 318/811; 318/254; 318/439; 318/599; 318/139
(58) Field of Search .................................. 318/254, 439, 318/138, 599, 811

(56) References Cited

U.S. PATENT DOCUMENTS

| | | | |
|---|---|---|---|
| 4,309,643 | * 1/1982 | Akamatsu | 318/138 |
| 4,491,771 | * 1/1985 | Kimura | 318/254 |
| 4,556,827 | * 12/1985 | Erdman | 318/254 |
| 4,710,686 | 12/1987 | Guzik . | |
| 5,018,058 | 5/1991 | Ionescu et al. . | |
| 5,229,677 | * 7/1993 | Dade et al. | 318/432 X |
| 5,319,294 | * 6/1994 | Ohto et al. | 318/568.22 |
| 5,523,660 | 6/1996 | Fujii . | |
| 5,561,595 | 10/1996 | Smith . | |
| 5,585,701 | 12/1996 | Kaida et al. . | |
| 5,610,486 | 3/1997 | Li . | |
| 5,614,797 | 3/1997 | Carobolante . | |
| 5,656,897 | 8/1997 | Carobolante et al. . | |
| 5,661,382 | 8/1997 | Enami et al. . | |
| 5,712,539 | * 1/1998 | Zweighaft et al. | 318/7 |
| 5,821,708 | * 10/1998 | Williams et al. | 318/254 |
| 5,847,521 | * 12/1998 | Morikawa et al. | 318/254 |
| 6,002,226 | * 12/1999 | Collier-Hallman et al. | 318/439 |

FOREIGN PATENT DOCUMENTS

| | | |
|---|---|---|
| 3940569 A1 | 6/1991 | (DE) . |
| 195 00 900 A1 | 7/1996 | (DE) . |
| 5-030782 | 2/1993 | (JP) . |
| 5-328785 | 12/1993 | (JP) . |
| 7-163177 | 6/1995 | (JP) . |

* cited by examiner

Primary Examiner—Robert E. Nappi
Assistant Examiner—Tyrone Smith
(74) Attorney, Agent, or Firm—Akin, Gump, Strauss, Hauer & Feld, L.L.P.

(57) ABSTRACT

First power transistors of first power amplifying parts and second power transistors of second power amplifying parts form current paths from a DC power source to three-phase windings. A first distribution control block activates the first power amplifying parts with first three-phase signals, each having an active electrical angle larger than 120 degrees. A second distribution control block activates the second power amplifying parts with second three-phase signals, each having an active electrical angle larger than 120 degrees. A switching operation block has a current detecting part and a switching control part. The current detecting part obtains a current detected signal corresponding to a composed supply current of negative or positive parts of the three-phase drive currents to the three-phase windings. The switching control part compares an output signal of the current detecting part with a command signal and switches at least one power transistor of the first power transistors and the second power transistors to an off state when the output signal of the current detecting part becomes a value corresponding to the command signal, thereby causing the at least one power transistor to perform high-frequency switching responding with a comparison result.

31 Claims, 30 Drawing Sheets

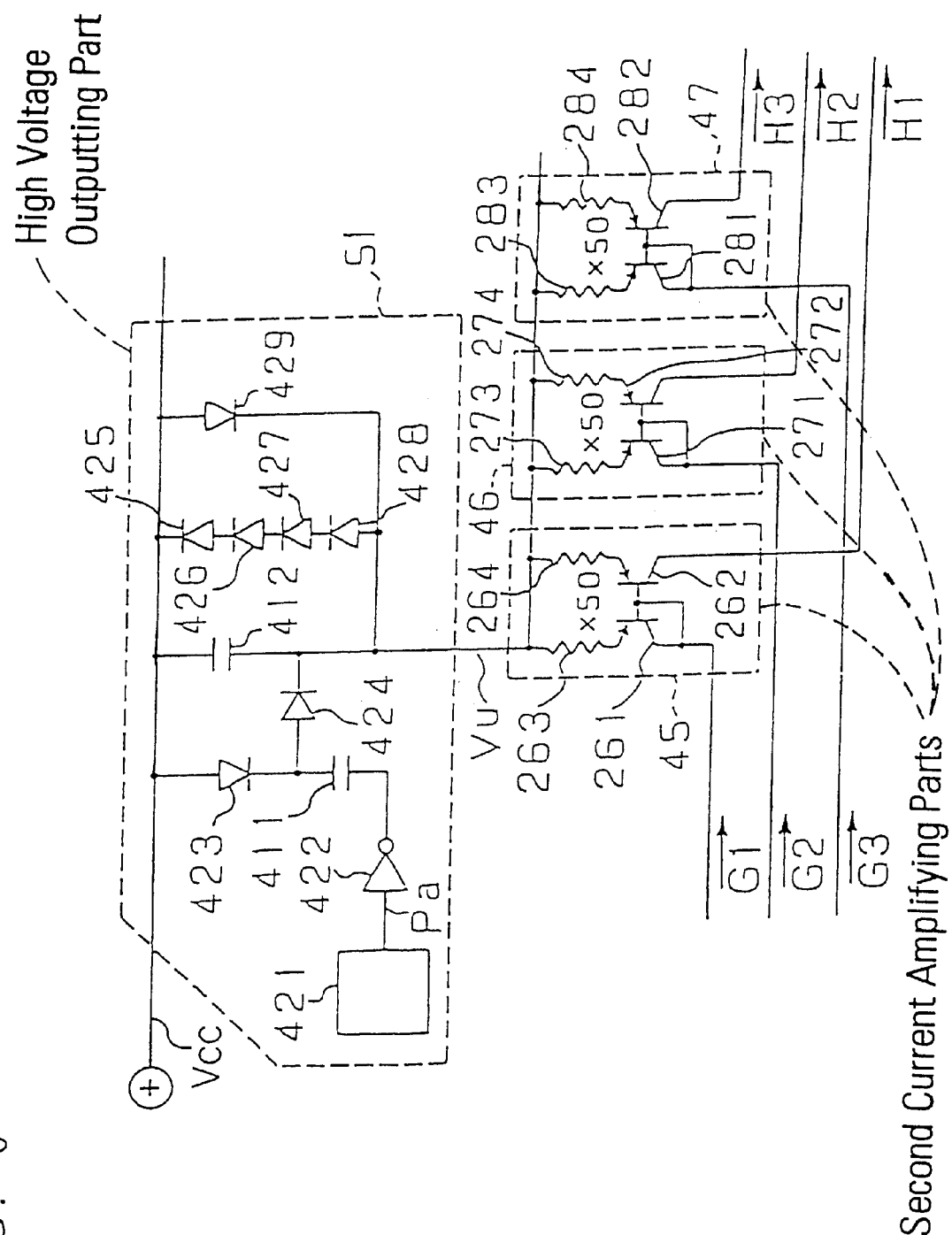
F I G. 6

F I G. 10
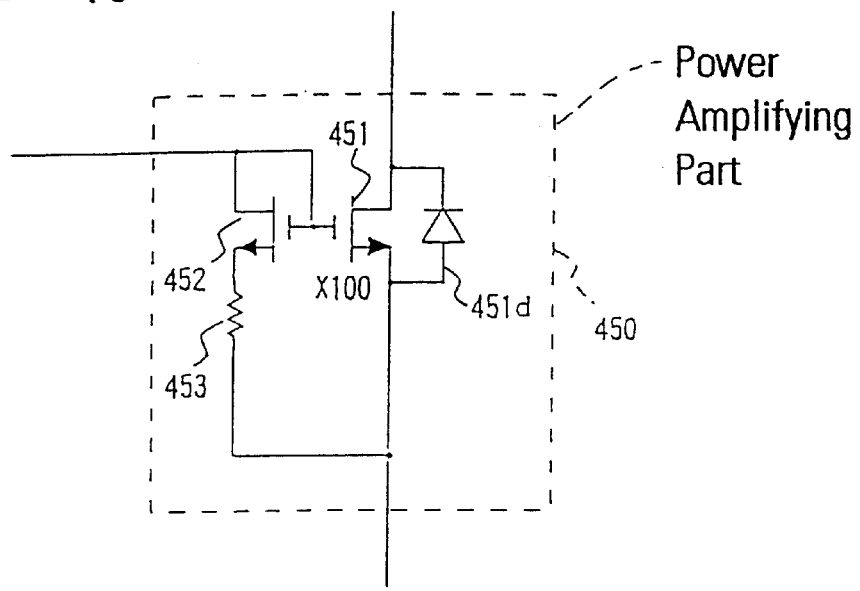
F I G. 11
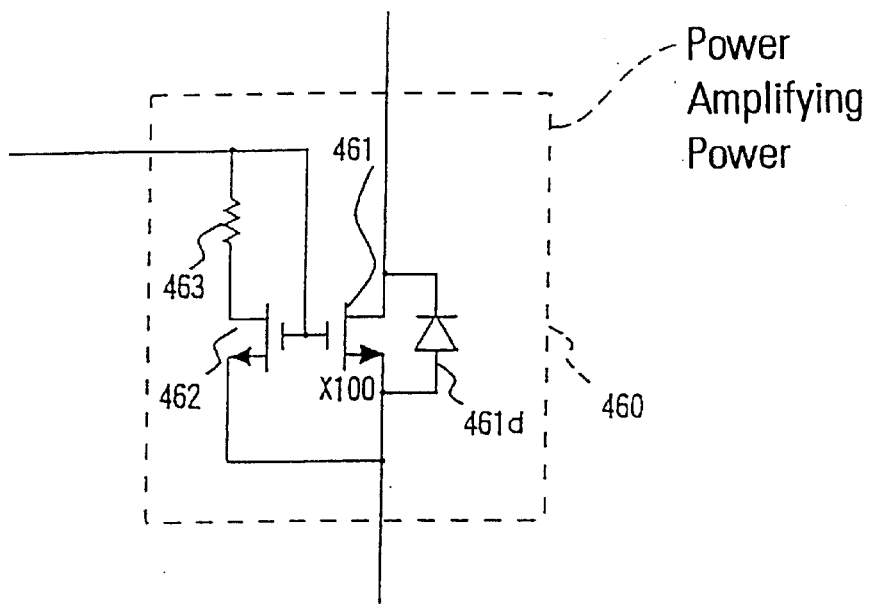

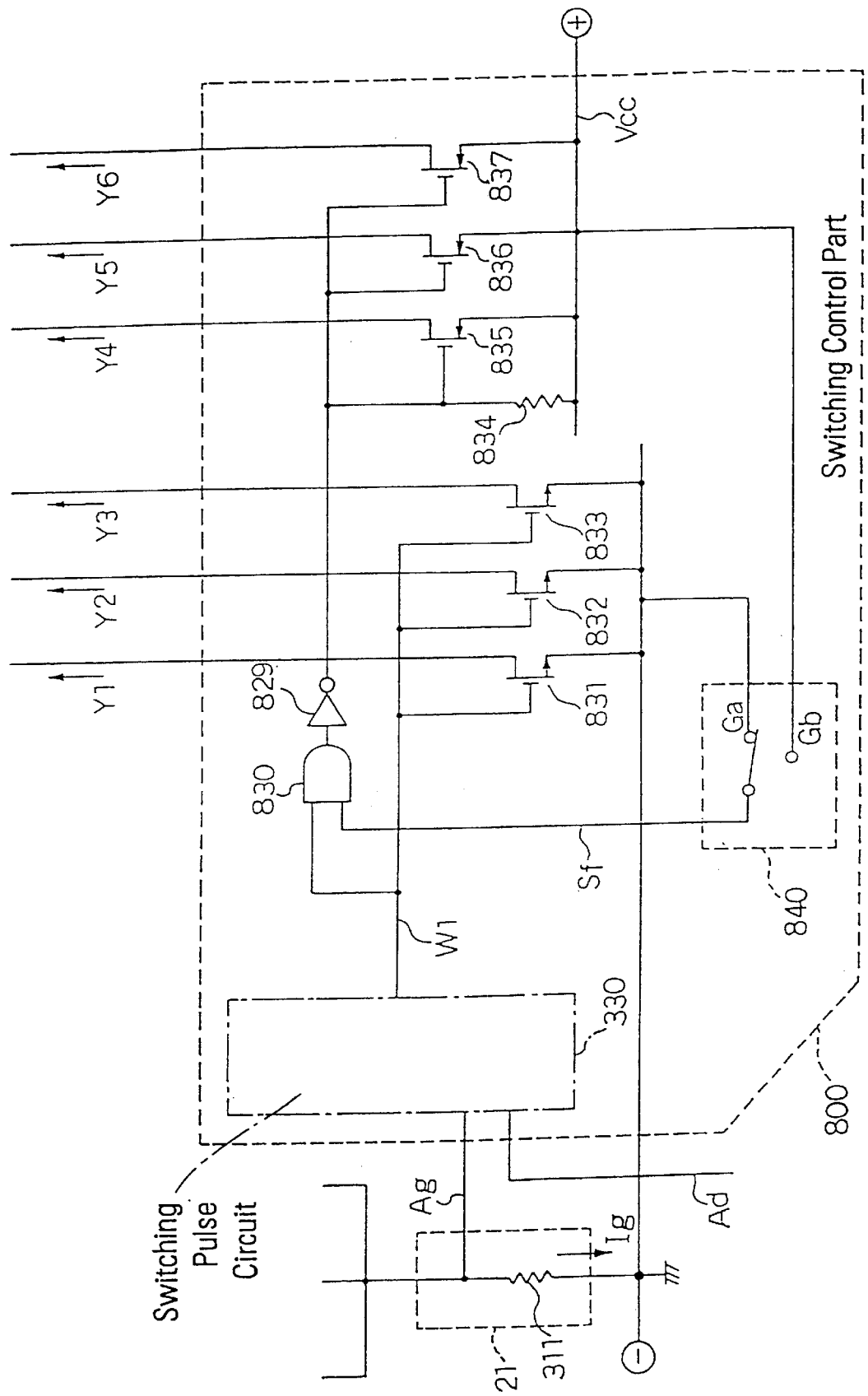
F I G. 24

MOTOR WITH ELECTRONIC DISTRIBUTING CONFIGURATION

CROSS REFERENCE TO RELATED APPLICATIONS

This application is a continuation of application Ser. No. 09/123,164, filed Jul. 27, 1998 and entitled "Motor With Electronic Distributing Configuration" now U.S. Pat. No. 5,982,118.

BACKGROUND OF THE INVENTION

1. Field of the Invention

The present invention relates to a motor that electronically alters current paths by using plural transistors.

2. Description of the Related Art

In recent years, many office automation apparatus and audio visual apparatus use motors that electronically alters current paths by using plural transistors. For example, there is a motor that alters current paths to windings by using both PNP-type power transistors and NPN-type power transistors.

FIG. 34 shows such a prior art motor, the operation of which will be described. A rotor 2011 has a field part formed by a permanent magnet. According to the rotation of the rotor 2011, a position detecting block 2041 generates two pairs of three-phase voltage signals K1, K2, K3 and K4, K5, K6. A first distributing block 2042 generates three-phase lower conduction control signals L1, L2, and L3 corresponding to the voltage signals K1, K2, and K3, and controls the conduction of lower NPN-type power transistors 2021, 2022, and 2023. A second distributing block 2043 generates three-phase upper conduction control signals M1, M2, and M3 corresponding to the voltage signals K4, K5, and K6, and controls the conduction of upper PNP-type power transistors 2025, 2026, and 2027. Consequently, three-phase drive voltages are supplied to three-phase windings 2012, 2013, and 2014.

This prior art motor, however, has the following various problems.

(1) Large Power Loss

In the prior art configuration, the emitter-collector voltages of the NPN-type power transistors 2021, 2022, and 2023 and the PNP-type power transistors 2025, 2026, and 2027 are controlled in analogue fashion, thereby supplying drive currents of necessary amplitude to the windings 2012, 2013, and 2014. Consequently, the residual voltage drop across the power transistor in activated period becomes large, and the product of this residual voltage drop and the conducted current of the power transistor causes a large power loss. Especially, since the drive currents to the motor windings are large, the power loss has been extremely large. As a result, the motor has a very low power efficiency.

(2) Expensive Cost

In order to reduce the manufacturing cost of a motor, it is very effective to integrate transistors, resistors, and the like onto a single chip as an IC. However, a large chip area is required to compose those PNP-type power transistors 2025, 2026, and 2027, thereby increasing the cost. In addition, when those transistors and resistors are integrated on an IC chip, it is also difficult to carry out a fast operation of PNP-type power transistors due to the effects of parasitic capacitances. Moreover, power loss and heat generation of the power transistors are also too large to integrate them into an IC. Especially, since the drive currents to motor windings are large, the IC is likely confronted with a thermal breakdown caused by the heat generation from those power transistors. If a radiating plate is provided to the IC in order to prevent such a thermal breakdown, the cost is then increased greatly.

(3) Large Motor Vibration

In recent years, in optical disk apparatus such as DVD-ROM and magnetic disk apparatus such as HDD and FDD, a motor with reduced vibration is strongly demanded because of higher density recording and/or playing back on/from such disks. In the prior art configuration, however, when a power transistor is changed over abruptly, a spike voltage is generated in a winding, thereby pulsating the drive currents. Consequently, the generated force of the motor is pulsated and a large motor vibration occurs.

It has been strongly desired to develop a motor in which each of or all of these problems are solved.

It is therefore an object of the present invention to solve the above problems, respectively or concurrently and provide a motor that has the configuration suitable for implementation in integrated circuit form.

SUMMARY OF THE INVENTION

The motor of the present invention comprises:

a movable member;

plural-phase windings;

voltage supplying means for supplying a DC voltage,

Q pieces (Q is an integer of 3 or more) of first power amplifying means each including a first FET power transistor for forming a current path between a negative terminal side of said voltage supplying means and one of said plural-phase windings;

Q pieces of second power amplifying means each including a second FET power transistor for forming a current path between a positive terminal side of said voltage supplying means and one of said plural-phase windings;

altering signal producing means for producing plural-phase altering signals;

first distribution control means for controlling said Q pieces of first power amplifying means responding with output signals of said altering signal producing means;

second distribution control means for controlling said Q pieces of second power amplifying means responding with output signals of said altering signal producing means; and switching operation means for causing at least one piece of said Q pieces of first power amplifying means and said Q pieces of second power amplifying means to perform high-frequency switching, and that said first distribution control means and said second distribution control means include means for supplying at least a current signal, varying smoothly or substantially smoothly at least in rising and/or falling slopes to a conduction control terminal side of at least one piece of said Q pieces of first power amplifying means and said Q pieces of second power amplifying means and said Q pieces of second power amplifying means.

With the above-mentioned configuration, some of the first power amplifying means and the second power amplifying means are caused to execute high-frequency switching operation so that the power loss of these power amplifying means can be reduced remarkably. As a result, the power efficiency of the motor is also improved significantly. In the case that some of the first and second power amplifying means execute high-frequency switching operations, smooth altering operation of current paths to the plural-phase windings can be achieved by supplying a current signal, varying smoothly or substantially smoothly at least in rising and/or falling slopes among the rising slope portion, the falling slope portion and flat portion, to the conduction control terminal side of power amplifying means. As a result, the drive current signals to the plural-phase windings are altered smoothly, thereby reducing pulsation or fluctuation of the generated torque of the motor. Therefore, an excellent motor with reduced vibration and reduced power loss can be realized. Further, power transistors of the first and second power amplifying means can be integrated on a single IC chip together with other transistors and resistors. Consequently, the above motor can be obtained at low cost.

Furthermore, the motor in accordance with another configuration of the invention comprises:

a movable member;

plural-phase windings;

voltage supplying means for supplying a DC voltage;

Q pieces (Q is an integer of 3 or more) of first power amplifying means each including a first FET power transistor for forming a current path between one output terminal side of said voltage supplying means and one of said plural-phase windings, and for amplifying an input current to the conduction control terminal side;

Q pieces of second power amplifying means each including a second FET power transistor for forming a current path between the other output terminal side of said voltage supplying means and one of said plural-phase windings, and for amplifying an input current to the conduction control terminal side;

first distribution control means for supplying first Q-phase current signals, each having an active electrical angle larger than 360/Q degrees, to a conduction control terminal side of each of said Q pieces of first power amplifying means;

second distribution control means for supplying second Q-phase current signals, each having an active electrical angle larger than 360/Q degrees, to a conduction control terminal side of each of said Q pieces of second power amplifying means; and switching operation means for causing at least either said Q pieces of first power amplifying means or said Q pieces of second power amplifying means to perform high-frequency switching.

With the above-mentioned configuration, some of the first power amplifying means and the second power amplifying means are caused to execute high-frequency switching operations so that the power loss of these power amplifying means can be reduced remarkably. As a result, the power efficiency of the motor is also improved significantly. Further, each of the first and second power amplifying means is so configured to amplify an input current to the conduction control terminal side. The first Q-phase current signals, each having an active electrical angle larger than 360/Q degrees, are supplied to the conduction control terminal sides of the Q pieces of first power amplifying means. The second Q-phase current signals, each having an active electrical angle larger than 360/Q degrees, are supplied to the conduction control terminal sides of the Q pieces of the second power amplifying means. As a result, smooth altering operation of current paths to the plural-phase windings can be achieved. For example, each of the first and second Q-phase current signals can be a current signal which varies smoothly or substantially smoothly at least in rising and/or falling slopes. Thus, the drive current signals to the windings are altered smoothly, thereby reducing pulsation or fluctuation of the generated torque of the motor. Therefore, an excellent motor with reduced vibration and reduced power loss can be realized.

The motor in accordance with another configuration of the invention comprises:

a movable member;

plural-phase windings;

voltage supplying means for supplying a DC voltage,

Q pieces (Q is an integer of 3 or more) of first power amplifying means each including a first power transistor for forming a current path between one output terminal side of said voltage supplying means and one of said plural-phase windings;

Q pieces of second power amplifying means each including a second power transistor for forming a current path between the other output terminal side of said voltage supplying means and one of said plural-phase windings;

altering signal producing means for producing plural-phase altering signals;

first distribution control means for supplying first Q-phase signals, each having an active electrical angle larger than 360/Q degrees, to a conduction control terminal side of each of said Q pieces of first power amplifying means responding with output signals of said altering signal producing means;

second distribution control means for supplying second Q-phase signals, each having an active electrical angle larger than 360/Q degrees, to a conduction control terminal side of each of said Q pieces of second power amplifying means responding with output signals of said altering signal producing means; and switching operation means for causing at least one of Q pieces of said first power transistors and Q pieces of said second power transistors to perform high-frequency switching, and for causing at least either said Q pieces of first power amplifying means or said Q pieces of second power amplifying means to perform off-operation simultaneously at their conduction control terminal sides responding with a single pulse signal.

With the above-mentioned configuration, at least either the first power amplifying means or the second power amplifying means are caused to execute high-frequency switching operations according to a single pulse signal so that the power loss of these power amplifying means can be reduced remarkably. As a result, the power efficiency of the motor is also improved remarkably. In addition, some or all of the first and second power transistors are caused to perform high-frequency switching operations. The first Q-phase signals, each having an active electrical angle larger than 360/Q degrees, are supplied to the conduction control terminal sides of the Q pieces of the first power amplifying means. The second Q-phase signals, each having an active electrical angle larger than 360/Q degrees, are supplied to the conduction control terminal sides of the Q pieces of the second power amplifying means. As a result, smooth altering operation of current paths to the plural-phase windings can be achieved. For example, each of the first and second Q-phase signals can be a current signal which varies smoothly or substantially smoothly at least in rising and/or falling slopes, thereby reducing pulsation of drive current signals and fluctuation of the generated torque. Therefore, an excellent motor with reduced vibration and reduced power loss can be realized. Further, since only a single pulse signal controls switching operation of at least either first power amplifying means or second power amplifying means simultaneously, it is easy to control the switching timing, thereby simplifying switching control configuration of the motor.

The motor in accordance with another aspect of the invention comprises:

a movable member;

plural-phase windings;

voltage supplying means for supplying a DC voltage,

Q pieces (Q is an integer of 3 or more) of first power amplifying means each including a first power transistor for forming a current path between a negative terminal side of said voltage supplying means and one of said plural-phase windings;

Q pieces of second power amplifying means each including a second power transistor for forming a current path between a positive terminal side of said voltage supplying means and one of said plural-phase windings;

altering signal producing means for producing plural-phase altering signals;

first distribution control means for controlling said Q pieces of first power amplifying means responding with output signals of said altering signal producing means; and second distribution control means for controlling said Q pieces of second power amplifying means responding with output signals of said altering signal producing means; and that said first distribution control means and said second distribution control means include:

means for supplying at least a current signal, varying smoothly or substantially smoothly at least in rising and/or falling slopes, to a conduction control terminal side of at least one piece of power amplifying means among said Q pieces of first power amplifying means and said Q pieces of second power amplifying means, and means for supplying at least an auxiliary signal, which has an active period smaller than that of said at least a current signal within a conduction interval of said at least a current signal, to the conduction control terminal side of said at least one piece of power amplifying means.

With the above-mentioned configuration, it is obvious to be able to reduce the power loss caused by on-resistance of power transistor of power amplifying means remarkably when an auxiliary current signal is supplied. Consequently, a motor with reduced power loss can be obtained. In addition, by supplying a current signal which varies smoothly or substantially smoothly at least in rising and/or falling slopes, the pulsation of the drive current signals can be reduced remarkably. As a result, an excellent motor with reduced vibration and reduced power loss can be realized.

These and other configurations and operations will be described in detail in conjunction with the preferred embodiments.

BRIEF DESCRIPTION OF THE DRAWINGS

FIG. 6 is a circuit diagram of second current amplifying parts 45, 46, and 47, and a high-voltage outputting part 51 in the embodiment 1.

FIG. 10 is a circuit diagram showing another configuration of the power amplifying part in the embodiment of the present invention.

FIG. 11 is a circuit diagram showing another configuration of the power amplifying part in the embodiment of the present invention.

FIG. 24 is a circuit diagram of a switching control part 800 in the embodiment 5.

DETAILED DESCRIPTION OF THE INVENTION

Several preferred embodiments of the present invention will be described in detail below with reference to the accompanying drawings shown in FIG. 1 to FIG. 33.

<<Embodiment 1>>

Figure 1:
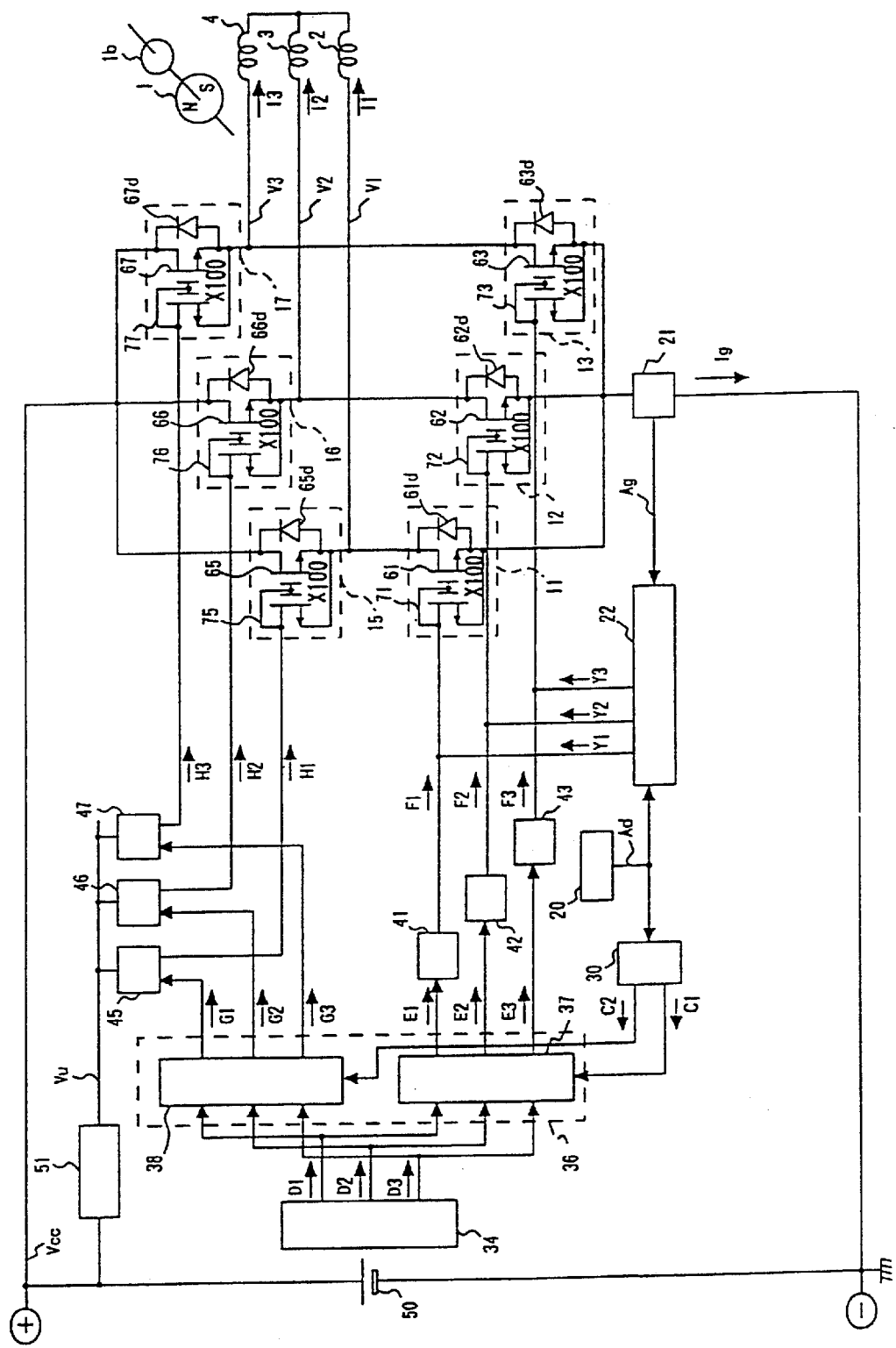
FIG. 1 is a diagram showing the configuration of the embodiment 1 of the present invention.

FIGS. 1 to 8 illustrate a configuration of the motor in the embodiment 1 of the present invention. FIG. 1 shows a comprehensive configuration of the motor. A movable member 1 is, for example, a rotor provided with a field part that generates magnetic fluxes of plural poles due to a permanent magnet. In this embodiment, the field part of the movable member 1 is indicated with a double-pole magnetized permanent magnet. In modified embodiments of the present invention, it may be constructed from multipolar magnet or from many magnetic pole pieces. Three-phase windings 2, 3, and 4 are disposed on a stator, each displaced from the others by electrically 120 degree. The three-phase windings 2, 3, and 4 generate three-phase fluxes by three-phase drive current signals I1, I2, and I3. The motor generates a force by the interaction between the field part of the movable member 1 and the drive current signals, and gives the generated force to the movable member 1. A disk 1*b* is mounted to the movable member 1 and rotated together with the movable member 1.

A DC power source part 50, as a voltage supplying part, has a negative terminal side (–) and a positive terminal side (+). The negative terminal side is connected to the ground potential, and the DC power source part 50 supplies a DC voltage Vcc at the positive terminal side. The current output terminal sides of three first power amplifying parts 11, 12, and 13 are connected to the negative terminal side of the DC power source part 50 commonly via a current detecting part 21. The first power amplifying part 11 includes a first NMOS-FET power transistor 61 and a first power diode 61*d* connected in parallel and reversely to the first NMOS-FET power transistor 61. The NMOS-FET transistor means an FET transistor with N-channel MOS structure. The current output terminal side of the first NMOS-FET power transistor 61 is connected to the negative terminal side of the DC power source part 50 via the current detecting part 21 and the current input terminal thereof is connected to the power supplying terminal of the winding 2. The current input terminal side of the first power diode 61*d* is connected to the current output terminal side of the first NMOS-FET power transistor 61 and the current output side thereof is connected to the current input terminal side of the first NMOS-FET power transistor 61. The first power amplifying part 11 forms a first FET power current-mirror circuit having the first NMOS-FET power transistor 61 and an NMOS-FET transistor 71, thereby amplifying an input current signal to the conduction control terminal side thereof. In this embodiment, the FET power current-mirror circuit means an FET current-mirror circuit having an FET power transistor as an output power transistor. The ratio of cell sizes of the NMOS-FET power transistor 61 to the NMOS-FET transistor 71 is set to 100 times and the current amplifying ratio of the first power current-mirror circuit is set to 100 times when the FET power transistor 61 is operating in the half-on state in its active operation region. An FET transistor can operate in three states; full-on state, half-on state, and off state. In full-on state, the FET transistor performs short-circuited between the current input and output terminals. In the half-on state, the FET transistor can amplify an input signal in its active operation region. In the full-on state or in the half-on state, the FET transistor is activated or active. The FET power transistor 61 is configured, for example, by an FET transistor with double diffused N-channel MOS structure, and a parasitic diode device is connected reversely from the current output terminal side to the current input terminal side of the FET power transistor 61 equivalently. This parasitic diode device is used as the first power diode 61*d*.

In the same way, the first power amplifying part 12 includes a first NMOS-FET power transistor 62 and a first power diode 62*d* connected in parallel and reversely to the first NMOS-FET power transistor 62. The current output terminal side of the first NMOS-FET power transistor 62 is connected to the negative terminal side of the DC power source part 50 via the current detecting part 21 and the current input terminal side thereof is connected to the power supplying terminal of the winding 3. The current input terminal side of the first power diode 62*d* is connected to the current output terminal side of the first NMOS-FET power transistor 62 and the current output terminal side thereof is connected to the current input terminal side of the first NMOS-FET power transistor 62. The first power amplifying part 12 forms a first FET power current-mirror circuit having the first NMOS-FET power transistor 62 and the NMOS-FET transistor 72 and amplifies an input current signal to the conduction control terminal side thereof (ratio of cell sizes: 100 times). The first NMOS-FET power transistor 62 is configured, for example, by an FET transistor with double-diffused N-channel MOS structure and a parasitic diode device of the first NMOS-FET power transistor 62 is used as a first power diode 62*d*.

In the same way, the first power amplifying part 13 includes a first NMOS-FET power transistor 63 and a first power diode 63*d* connected in parallel and reversely to the first NMOS-FET power transistor 63. The current output terminal side of the first NMOS-FET power transistor 63 is connected to the negative terminal side of the DC power source part 50 via the current detecting part 21 and the current input terminal side thereof is connected to the power supplying terminal of the winding 4. The current input terminal side of the first NMOS-FET power diode 63*d* is connected to the current output terminal side of the first NMOS-FET power transistor 63 and the current output terminal side thereof is connected to the current input terminal side of the first NMOS-FET power transistor 63. The first power amplifying part 13 forms a first FET power current-mirror circuit having the first NMOS-FET power transistor 63 and the NMOS-FET transistor 73 and amplifies an input current signal to the conduction control terminal side thereof (ratio of cell sizes: 100 times). The first NMOS-FET power transistor 63 is configured, for example, by an FET transistor with double-diffused N-channel MOS structure and a parasitic diode device of the first NMOS-FET power transistor 63 is used as a first power diode 63*d*.

Each of the first power current-mirror circuits of the first power amplifying parts 11, 12, and 13 amplifies an input current signal to each conduction control terminal side thereof. The control pulse signals Y1, Y2, and Y3 of the switching control part 22 control ON/OFF of the first NMOS-FET power transistors 61, 62, and 63, thereby carrying out high frequency switching operations. The first power amplifying parts 11, 12, and 13 supply drive voltage signals V1, V2, and V3 in high-frequency switching to the power supplying terminal sides of the three-phase windings 2, 3, and 4, so that negative current parts of the drive current signals I1, I2, and I3 are supplied to these windings 2, 3, and 4. This operation will be described in detail later.

The current input terminal sides of three second power amplifying parts 15, 16, and 17 are connected to the positive terminal side of the DC power source part 50 commonly. The second power amplifying part 15 includes a second NMOS-FET power transistor 65 and a second power diode 65d connected in parallel and reversely to the second NMOS-FET power transistor 65. The current input terminal side of the second NMOS-FET power transistor 65 is connected to the positive terminal side of the DC power source part 50 and the current output terminal side thereof is connected to the power supplying terminal of the winding 2. The current input terminal side of the second power diode 65d is connected to the current output terminal side of the second NMOS-FET power transistor 65 and the current output terminal side thereof is connected to the current input terminal side of the second NMOS-FET power transistor 65. The second power amplifying part 15 forms a second FET power current-mirror circuit having the second NMOS-FET power transistor 65 and the NMOS-FET transistor 75 and amplifies an input current signal to the conduction control terminal side thereof. The ratio of cell sizes of the second NMOS-FET power transistor 65 to the NMOS-FET transistor 75 is set to 100 times, and the current amplifying ratio of the second power current-mirror circuit is set to 101 times when the second NMOS-FET power transistor 65 is operating in the half-on state in its active operation region. The second NMOS-FET power transistor 65 is configured, for example, by an FET transistor with double diffused N-channel MOS structure and a parasitic diode device is connected reversely from the current output terminal side to the current input terminal side of the second NMOS-FET power transistor 65 equivalently. This parasitic diode device is used as a second power diode 65d.

In the same way, the second power amplifying part 16 includes a second NMOS-FET power transistor 66 and a second power diode 66d connected in parallel and reversely to the second NMOS-FET power transistor 66. The current input terminal side of the second NMOS-FET power transistor 66 is connected to the positive terminal side of the DC power source part 50 and the current output terminal side thereof is connected to the power supplying terminal of the winding 3. The current input terminal side of the second power diode 66d is connected to the current output terminal side of the second NMOS-FET power transistor 66 and the current output terminal side thereof is connected to the current input terminal side of the second NMOS-FET power transistor 66. The second power amplifying part 16 forms a second FET power current-mirror circuit having the second NMOS-FET power transistor 66 and the NMOS-FET transistor 76 and amplifies an input current signal to the conduction control terminal side thereof (ratio of cell sizes: 100 times). The second NMOS-FET power transistor 66 is configured, for example, by an FET transistor with double-diffused N-channel MOS structure and a parasitic diode device of the second NMOS-FET power transistor 66 is used as a second power diode 66d.

In the same way, the second power amplifying part 17 includes a second NMOS-FET power transistor 67 and a second power diode 67d connected in parallel and reversely to the second NMOS-FET power transistor 67. The current input terminal side of the second NMOS-FET power transistor 67 is connected to the positive terminal side of the DC power source part 50 and the current output terminal side thereof is connected to the power supplying terminal of the winding 4. The current input terminal side of the second power diode 67d is connected to the current output terminal side of the second NMOS-FET power transistor 67 and the current output terminal side thereof is connected to the current input terminal side of the second NMOS-FET power transistor 67. The second power amplifying part 17 forms a second FET power current-mirror circuit having the second NMOS-FET power transistor 67 and the NMOS-FET transistor 77 and amplifies an input current signal to the conduction control terminal side thereof (ratio of cell sizes: 100 times). The second NMOS-FET power transistor 67 is configured, for example, by an FET transistor with double-diffused N-channel MOS structure and a parasitic diode device of the second NMOS-FET power transistor 67 is used as a second power diode 67d.

Each of the second power current-mirror circuits of the second power amplifying parts 15, 16, and 17 amplifies an input current signal to each conduction control terminal side thereof, so that positive current parts of the drive current signals I1, I2, and I3 are supplied to the three-phase windings 2, 3, and 4. This operation will be described in detail later.

The first power amplifying parts 11, 12, and 13 are connected in parallel and alter current paths, each between each of power supplying terminals of the windings and the negative terminal side of the DC power source part 50. At the same time, the second power amplifying parts 15, 16, and 17 are connected in parallel and alter current paths, each between each of power supplying terminals of the windings and the positive terminal side of the DC power source part 50.

A command signal Ad from a command signal producing part 20 is entered to both a supply signal producing part 30 and a switching control part 22. The command signal producing part 20 is configured, for example, by a speed control block that detects and controls the rotational speed of the movable member 1 to an aimed value. Consequently, the command signal Ad controls both drive current signals and drive voltage signals supplied to the windings 2, 3, and 4, thereby commanding the supply power to these windings.

Figure 3:
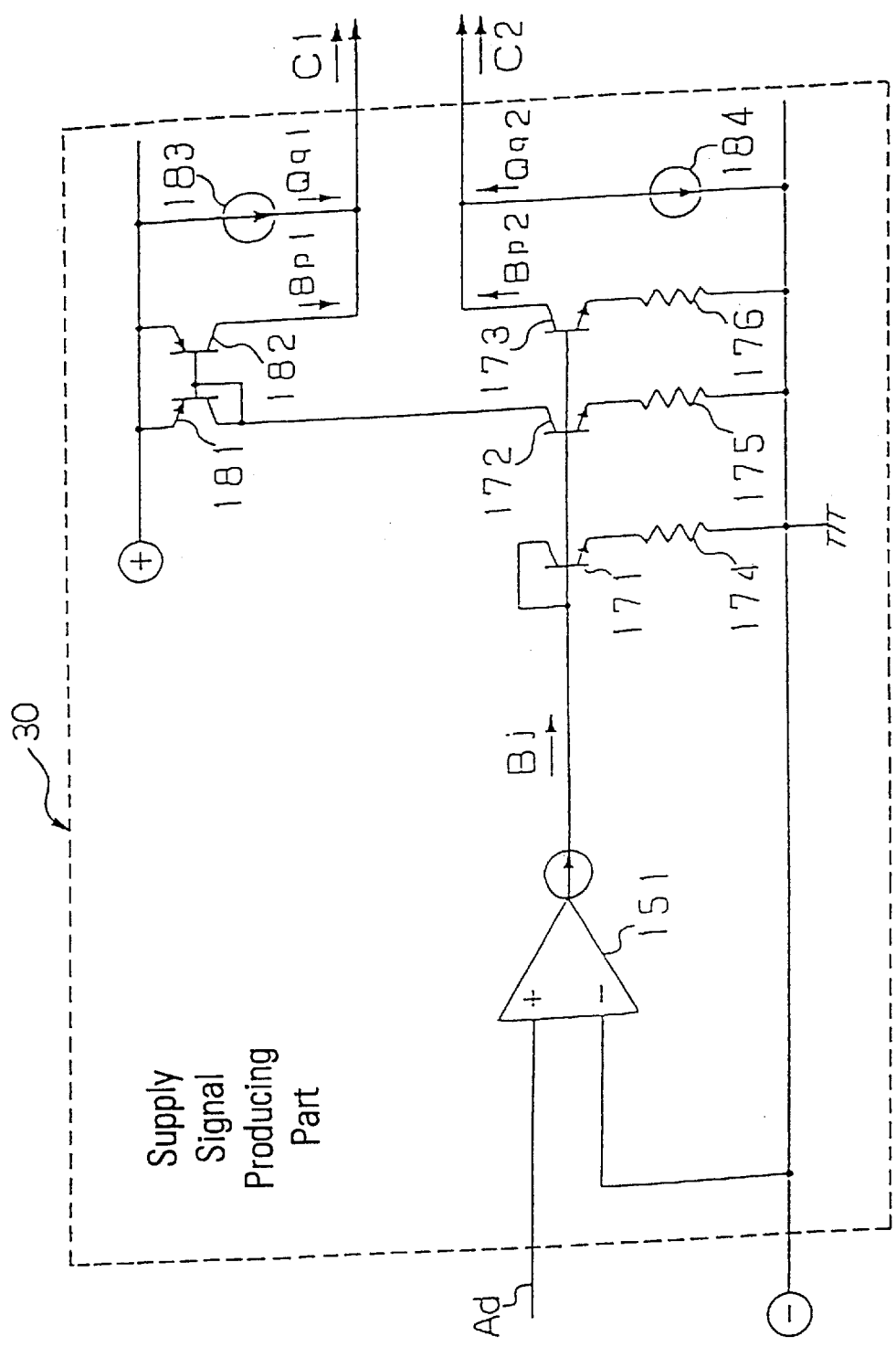
FIG. 3 is a circuit diagram of a supply signal producing part 30 in the embodiment 1.

The supply signal producing part 30 outputs the first supply current signal C1 and the second supply current signal C2, both corresponding to the command signal Ad. FIG. 3 shows a configuration of the supply signal producing part 30. A voltage-current converting circuit 151 outputs a converted current signal Bj proportional to the command signal Ad. The converted current signal Bj from a voltage-current converting circuit 151 is supplied to a current-mirror circuit composed of transistors 171 to 173 and resistors 174 to 176, thereby generating two current signals proportional to the converted current signal Bj at the collector sides of the transistors 172 and 173. The collector current signal of the transistor 172 is output via a current-mirror circuit consisting of the transistors 181 and 182. The collector current signal Bp1 of the transistor 182 is added to the first specified current signal Qq1 of a constant current source 183, thereby outputting the added current as the first supply current signal C1. Then, C1=Bp1+Qq1. The collector current signal Bp2 of the transistor 173 is added to the second specified current signal Qq2 of a constant current source 184, thereby outputting the added current as the second supply current signal C2. Then, C2=Bp2+Qq2. Consequently, both the first supply current signal C1 and the second supply current signal C2 are proportional to or approximately proportional to the command signal Ad. In addition, each of the first supply current signal C1 and the second supply current signal C2 includes a specified bias current of Qq1 or Qq2 of each of the constant current sources 183 and 184. The current values Qq1 and Qq2 of the constant current sources 183 and 184 are set as needed, and can be zero.

Figure 2:
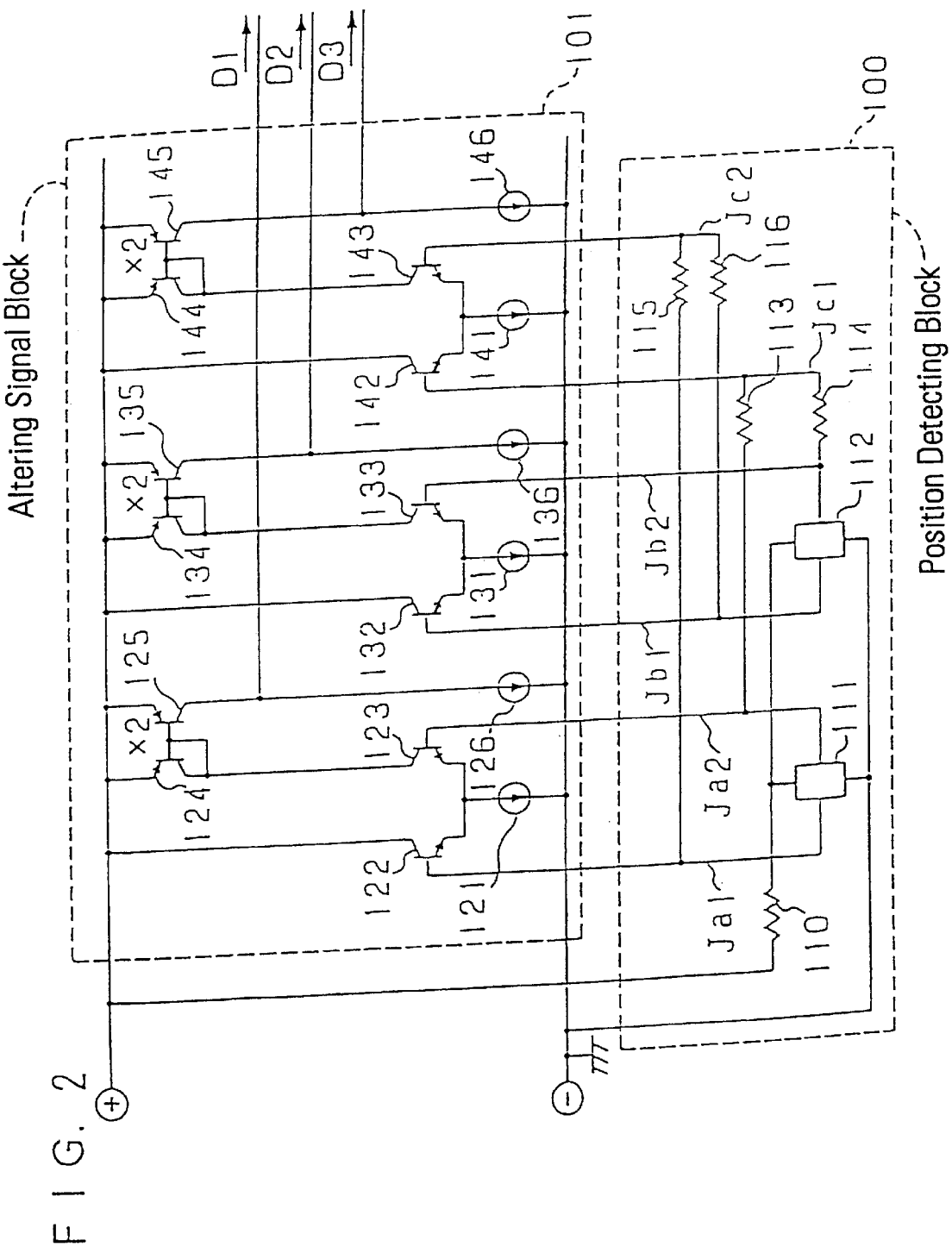
FIG. 2 is a circuit diagram of an altering signal producing part 34 in the embodiment 1.

An altering signal producing part 34 shown in FIG. 1 outputs three-phase altering current signals D1, D2, and D3, which vary smoothly. FIG. 2 shows a configuration of the altering signal producing part 34. In this embodiment, the altering signal producing part 34 is configured by a position detecting block 100 and an altering signal block 101.

The position detecting block 100 includes position detecting elements 111 and 112, each consisting of a magnetic-to-electric converting element (for example, a Hall element) to detect magnetic fluxes generated from the movable member 1. There is an electrical phase difference of 120 degrees between the position detecting elements 111 and 112. The position detecting elements 111 and 112 output two-phase position signals Ja1 and Jb1, as well as Ja2 and Jb2, each varying smoothly and in sinusoidal form according to the movement of the movable member 1. In this embodiment, Ja1 and Ja2 are inverted in phase with respect to each other (a phase difference of 180 degrees between them electrically), and Jb1 and Jb2 are also inverted in phase with respect to each other. Phase inverted signals are not counted in the number of new phases. The position signals Ja2 and Jb2 are compounded by resistors 113 and 114 to produce a third position signal Jc1, and the position signals Ja2 and Jb2 are compounded by the resistors 115 and 116 to produce a third phase position signal Jc2. Consequently, the position detecting part 100 obtains three-phase position signals Ja1, Jb1, and Jc1 (Ja2, Jb2, and Jc2), each having a phase difference of 120 degrees from others electrically and varying in sinusoidal form. Three position detecting elements can also be used to generate three-phase position signals.

Figure 9:
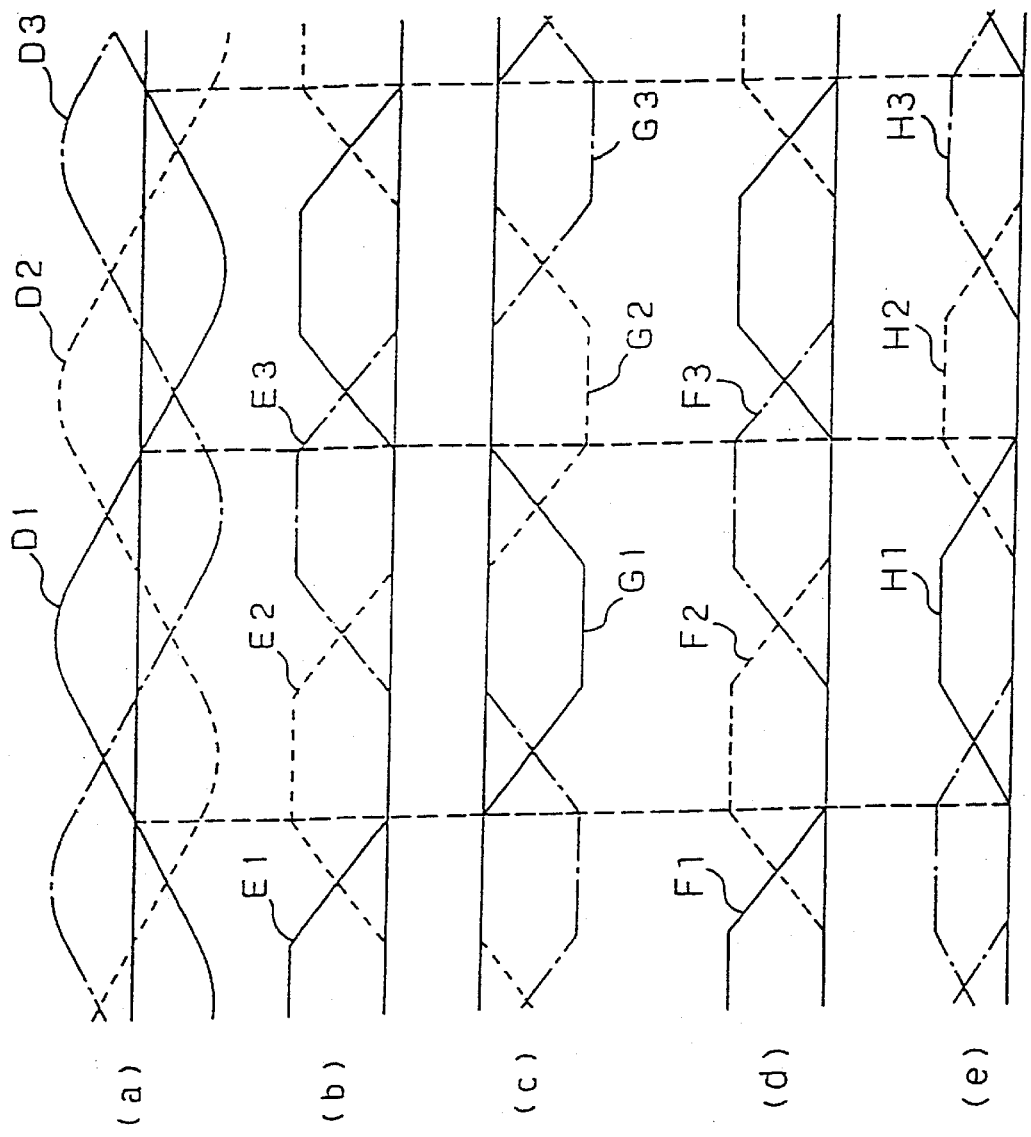
FIG. 9 is a waveform chart for explaining the operation of the embodiment 1.
Figure 12:
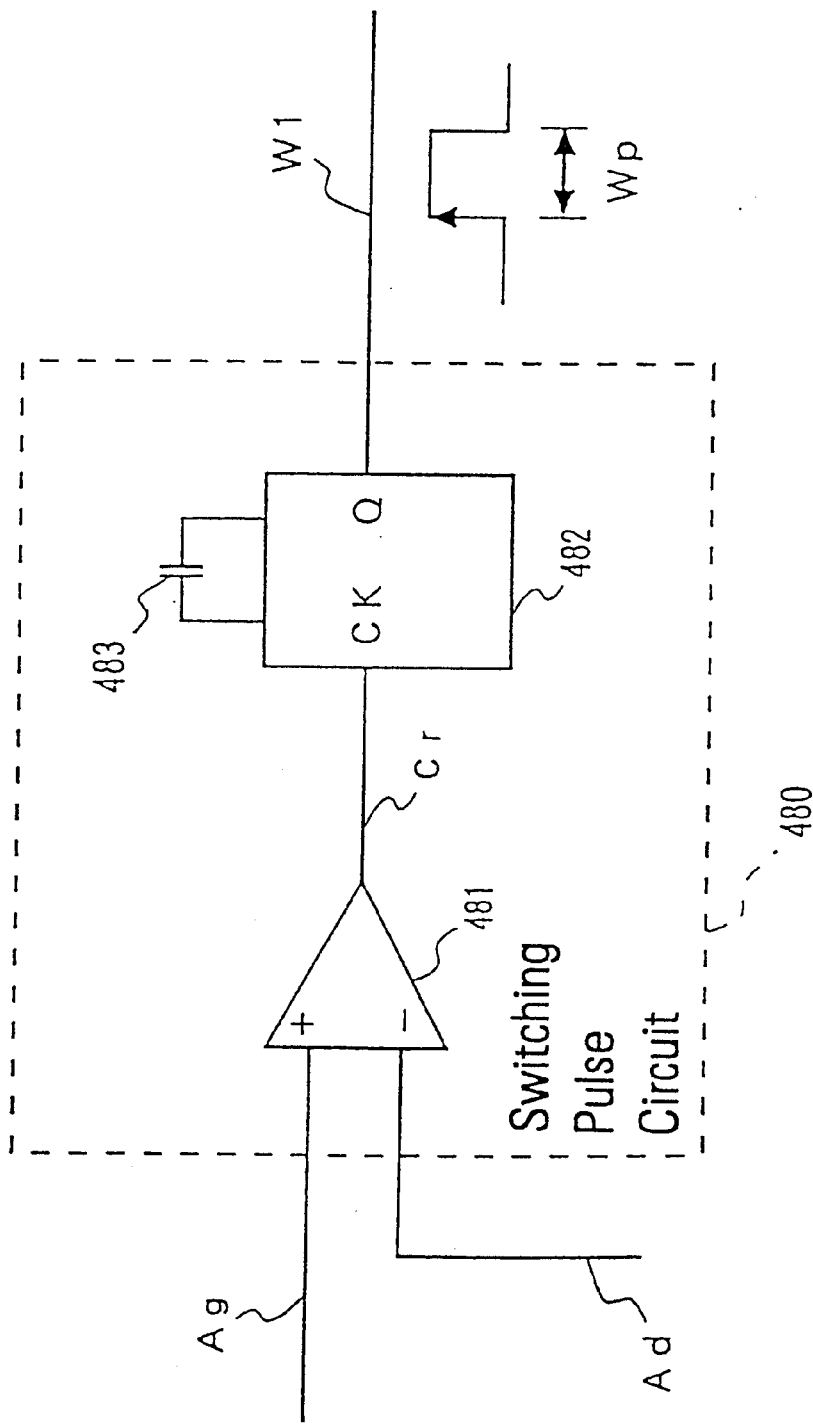
FIG. 12 is a circuit diagram showing another configuration of the switching pulse circuit in the embodiment of the present invention.

The altering signal block 101 generates sinusoidal altering current signals D1, D2, and D3, varying smoothly corresponding to three-phase position signals. The transistors 122 and 123 distribute the current of the constant current source 121 to the collector sides thereof according to the differential voltage between the first phase position signals Ja1 and Ja2. The collector current of the transistor 123 is amplified doubly by a current-mirror circuit formed from the transistors 124 and 125, and output from the collector of the transistor 125. The collector current of the transistor 125 is compared with the current of the constant current source 126, then the differential current between them is output as the first phase altering current signal D1. Consequently, the altering current signal D1 varies smoothly according to the position signal Ja1, so that the current signal D1 flows out (as a positive current part) in a 180-degree active electrical angle section and flows in (as a negative current part) in the next 180-degree active electrical angle section. In the same way, the altering current signal D2 varies smoothly according to the position signal Jb1, so that the current signal D2 flows out (as a positive current) in a 180-degree active electrical angle section and flows in (as a negative current part) in the next 180-degree active electrical angle section. In the same way, the altering current signal D3 varies smoothly according to the position signal Jc1, so that the current signal D3 flows out (as a positive current part) in a 180-degree active electrical angle section and flows in (as a negative current part) in the next 180-degree active electrical angle section. Consequently, the altering current signals D1, D2, and D3 become sinusoidal three-phase current signals, each having a specified phase difference from others. FIG. 9(a) illustrates the waveforms of the altering current signals D1, D2, and D3. The horizontal axis in FIG. 9 indicates the rotational position of the movable member 1.

The distributed signal producing part 36 shown in FIG. 1 includes a first distributor 37 and a second distributor 38. The first distributor 37 distributes the first supply current signal C1 of the supply signal producing part 30 corresponding to the three-phase altering current signals D1, D2, and D3 of the altering signal producing part 34, thereby producing three-phase first distributed current signals E1, E2, and E3, each varying smoothly. The second distributor 38 distributes the second supply current signal C2 of the supply signal producing part 30 corresponding to the three-phase altering current signals D1, D2, and D3 of the altering signal producing part 34, thereby producing three-phase second distributed current signals G1, G2, and G3, each varying smoothly.

Figure 4:
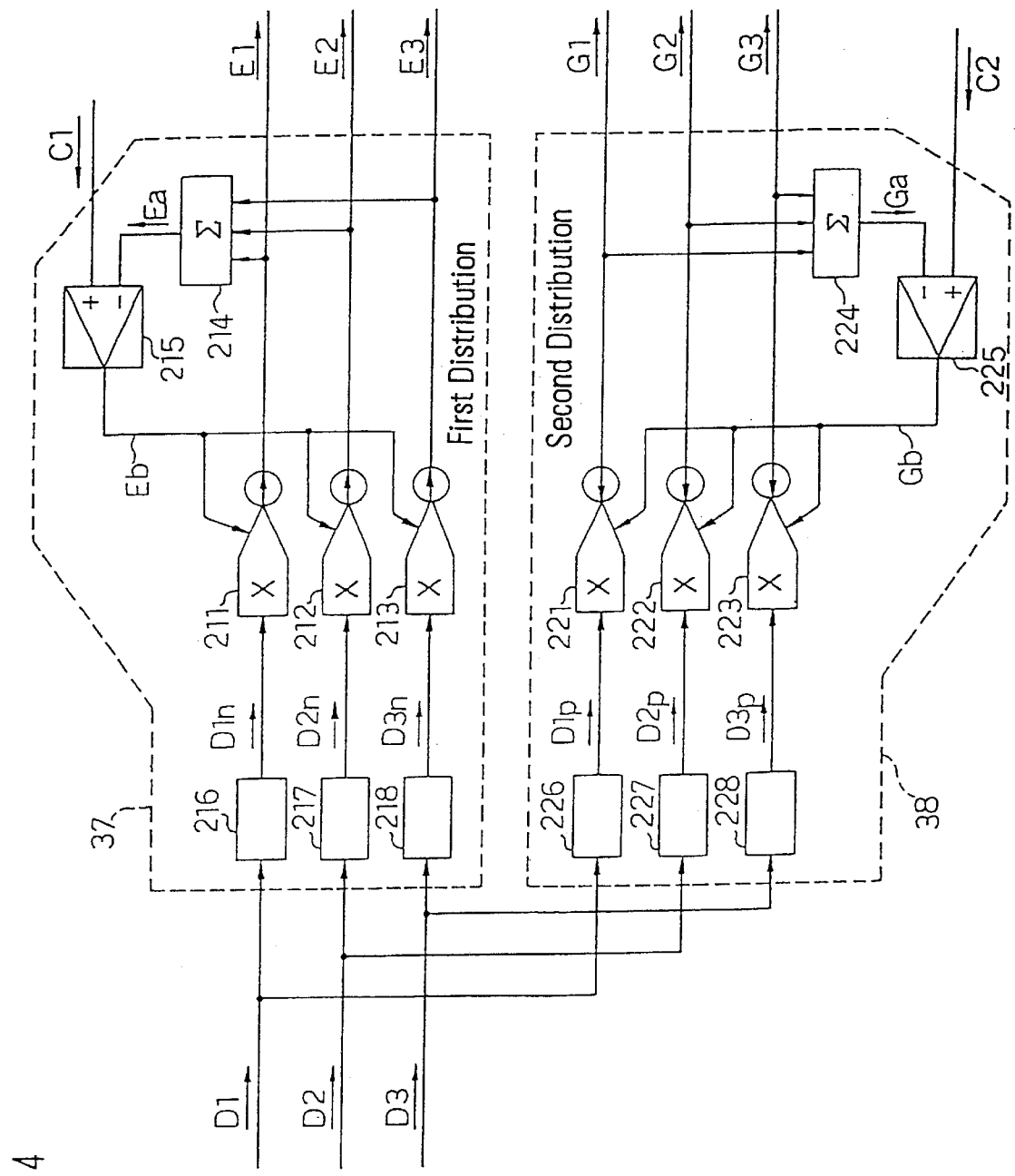
FIG. 4 is a circuit diagram of a distributed signal producing part 36 in the embodiment 1.

FIG. 4 shows a configuration of the distributed signal producing part 36. The first separating circuit 216 of the first distributor 37 outputs a first separated signal D1n equivalent or corresponding to the negative current part of the altering current signal D1 of the altering signal producing part 34. The first separating circuit 217 outputs a first separated signal D2n equivalent or corresponding to the negative current part of the altering current signal D2 of the altering signal producing part 34. The first separating circuit 218 outputs a first separated signal D3n equivalent or corresponding to the negative current part of the altering current signal D3 from the altering signal producing part 34. Consequently, the first separating circuits 216, 217, and 218 of the first distributor 37 obtain three-phase first separated signals D1n, D2n, and D3n equivalent or corresponding to the negative current parts of the three-phase altering current signals D1, D2, and D3.

The first multiplying circuit 211 of the first distributor 37 multiplies the first separated signal D1n of the first separating circuit 216 by a first feedback signal Eb of the first feedback circuit 215 so as to output a first distributed current signal E1 proportional to the result of the multiplication. In the same way, the first multiplying circuit 212 multiplies a first separated signal D2n of the first separating circuit 216 by a first feedback signal Eb of the first feedback circuit 215 so as to output the first distributed current signal E2 proportional to the result of the multiplication. In the same way, the first multiplying circuit 213 multiplies a first separated signal D3n of the first separating circuit 218 by a first feedback signal Eb of the first feedback circuit 215 so as to output the first distributed current signal E3 proportional to the result of the multiplication.

The first composing circuit 214 adds up the values of the first distributed current signals E1, E2, and E3 and outputs a first composed signal Ea corresponding to the total value. The first feedback circuit 215 obtains the first feedback signal Eb corresponding to a difference between the first composed signal Ea of the first composing circuit 214 and the first supply current signal C1 of the supply signal producing part 30. Consequently, the first multiplying circuits 211, 212, and 213, the first composing circuit 214, and the first feedback circuit 215 are combined to form a feedback loop, so that the first composed signal Ea takes a value corresponding to the first supply current signal C1. Since the first composed signal Ea corresponds to a total value of the three-phase first distributed current signals E1, E2, and E3, the three-phase first distributed current signals E1, E2, and E3 are proportional to the three-phase first separated signals D1n, D2n, and D3n. As a result, the three-phase first distributed current signals E1, E2, and E3 of the first distributor 37 become three-phase current signals which are obtained by distributing the first supply current signal C1 of the supply signal producing part 30 corresponding to the negative current parts of the three-phase altering current signals D1, D2, and D3 of the altering signal producing part 34 substantially. In other words, the amplitudes of the three-phase first distributed current signals E1, E2, and E3 are changed in proportion to the first supply current signal C1. FIG. 9(b) illustrates waveforms of the three-phase first distributed current signals E1, E2, and E3. The first distributor 37 distributes the first supply current signal C1 to one phase or two phases alternately according to the rotation of the movable member 1, thereby outputting the three-phase first distributed current signals E1, E2, and E3, each having a phase difference of 120 degrees electrically from others. The three-phase first distributed current signals E1, E2, and E3 are positive current signals (flow out current signals).

The second separating circuit 226 of the second distributor 38 outputs a second separated signal D1p equivalent or corresponding to the positive current part of the altering current signal D1 from the altering signal producing part 34. The second separating circuit 227 outputs a second separated signal D2p equivalent or corresponding to the positive current part of the altering current signal D2 from the altering signal producing part 34. The second separating circuit 228 outputs a second separated signal D3p equivalent or corresponding to the positive current part of the altering current signal D3 from the altering signal producing part 34. Consequently, the second separating circuits 226, 227, and 228 of the second distributor 38 obtain second three-phase separated signals D1p, D2p, and D3p equivalent or corresponding to the positive current parts of the three-phase altering current signals D1, D2, and D3.

The second multiplying circuit 221 of the second distributor 38 multiplies a second separated signal D1p of the second separating circuit 226 by a second feedback signal Gb of the second feedback circuit 225 so as to output a second distributed current signal G1 proportional to the result of the multiplication. In the same way, the second multiplying circuit 222 multiplies a second separated signal D2p of the second separating circuit 227 by a second feedback signal Gb of the second feedback circuit 225 so as to output a second distributed current signal G2 proportional to the result of the multiplication. In the same way, the second multiplying circuit 223 multiplies a second separated signal D3p of the second separating circuit 228 by a second feedback signal Gb of the second feedback circuit 225 so as to output a second distributed current signal G3 proportional to the result of the multiplication.

The second composing circuit 224 adds up the values of the three-phase second distributed current signals G1, G2, and G3 and outputs the second composed signal Ga corresponding to the total value. The second feedback circuit 225 obtains the second feedback signal Gb corresponding to a difference between the second composed signal Ga of the second composing circuit 224 and the second supply current signal C2 of the supply signal producing part 30. Consequently, the second multiplying circuits 221, 222, and 223, the second composing circuit 224, and the second feedback circuit 225 are combined to form a feedback loop, so that the second composed signal Ga takes a value corresponding to the second supply current signal C2. Since the second composed signal Ga corresponds to a total value of the three-phase second distributed current signals G1, G2, and G3, the three-phase second distributed current signals G1, G2, and G3 are proportional to the three-phase second separated signals D1p, D2p, and D3p. As a result, the three-phase second distributed current signals G1, G2, and G3 of the second distributor 38 become three-phase current signals which are obtained by distributing the second supply current signal C2 of the supply signal producing part 30 corresponding to the altering current signals D1, D2, and D3 from the altering signal producing part 34 substantially. In other words, the amplitudes of the three-phase second distributed current signals G1, G2, and G3 are changed in proportion to the second supply current signal C2. FIG. 9(c) illustrates waveforms of the three-phase second distributed current signals G1, G2, and G3. The second distributor 38 distributes the second supply current signal C2 to one phase or two phases alternately according to the rotation of the movable member 1, thereby outputting the three-phase second distributed current signals G1, G2, and G3, each having a phase difference of 120 degrees electrically from others. The second three-phase distributed current signals G1, G2, and G3 are negative current signals (flow in current signals).

There is a phase difference of 180 degrees between the first distributed current signal E1 and the second distributed current signal G1, and the signals E1 and G1 are varied smoothly and complementarily (either of E1 or G1 is always zero). In the same way, there is a phase difference of 180 degrees between the first distributed current signal E2 and the second distributed current signal G2, and the signals E2 and G2 are varied smoothly and complementarily (either of E2 or G2 is always zero). In the same way, there is a phase difference of 180 degrees between the first distributed current signal E3 and the second distributed current signal G3, and the signals E3 and G3 are varied smoothly and complementarily (either of E3 or G3 is always zero).

The first distributed current signals E1, E2, and E3 of the first distributor 37 shown in FIG. 1 are entered to the first current amplifying parts 41, 42, and 43, respectively. The first current amplifying parts 41, 42, and 43 amplify the first distributed current signals E1, E2, and E3 by a predetermined factor, thereby producing first amplified current signals F1, F2, and F3, respectively.

Figure 5:
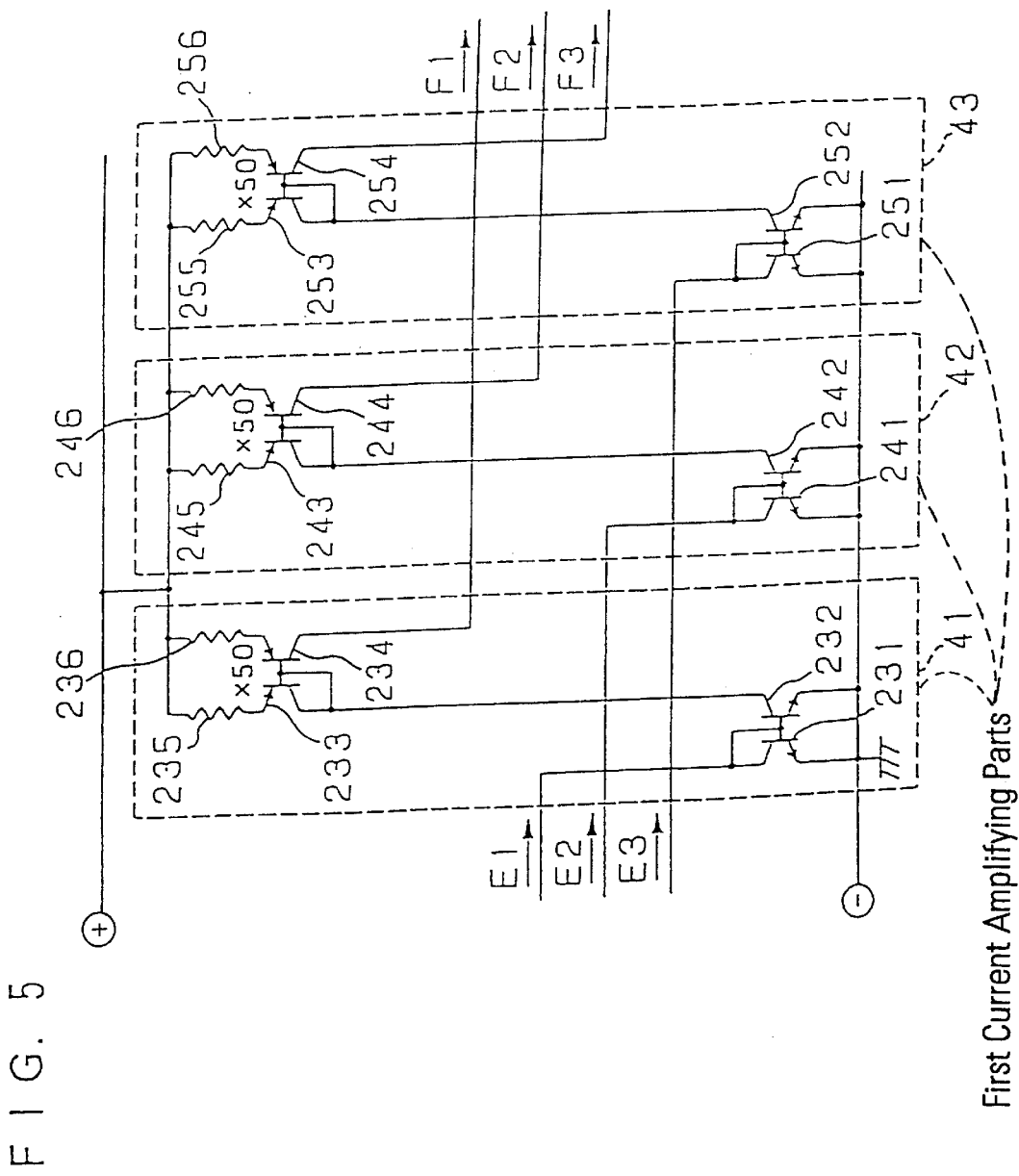
FIG. 5 is a circuit diagram of first current amplifying parts 41, 42, and 43 in the embodiment 1.

FIG. 5 shows a configuration of the first current amplifying parts 41, 42, and 43. The first current amplifying part 41 is configured by a first amplifying part current-mirror circuit which includes the first-stage current-mirror circuit consisting of transistors 231 and 232 and the next-stage current-mirror circuit consisting of transistors 235 and 236 and resistors 235 and 236. The emitter areas of both transistors 231 and 232 are set equally and the current amplifying factor of the first-stage current-mirror circuit is set to one. The emitter area ratio of the transistor 233 to the transistor 234 is set to 50 times and the resistance ratio of the resistor 236 to the resistor 235 is set to 50 times, so as to amplify a current signal by a predetermined factor of 50 times in the next-stage current-mirror circuit. In the same way, the first current amplifying part 42 is configured by a first amplifying part current-mirror circuit consisting of transistors 241, 242, 243, and 244, and resistors 245 and 246 to amplify a current signal by a predetermined factor of 50 times. In the same way, the first current amplifying part 43 is configured by a first amplifying part current-mirror circuit consisting of transistors 251, 252, 253, and 254, and resistors 255 and 256 to amplify a current signal by a predetermined factor of 50 times. Consequently, the first current amplifying parts 41, 42, and 43 amplify the three-phase first distributed current signals E1, E2, and E3 by a predetermined factor of 50 times, respectively, thereby producing the three-phase first amplified current signals F1, F2, and F3.

The second distributed current signals G1, G2, and G3 of the second distributor 38 shown in FIG. 1 are entered to the second current amplifying parts 45, 46, and 47, respectively. The second current amplifying parts 45, 46, and 47 amplify the second distributed current signals G1, G2, and G3 by a predetermined factor, thereby producing second amplified current signals H1, H2, and H3. A high-voltage outputting part 51 charges upconverting capacitors according to a high frequency pulse signal, and produces a high level potential Vu higher than the positive terminal side potential Vcc of the DC power source part 50. The second amplified current signals H1, H2, and H3 are supplied to the conduction control terminal sides of the second FET power current-mirror circuits of the second power amplifying parts 15, 16, and 17 from the high level point Vu of the high-voltage outputting part 51. Thus, the output transistors of the second current amplifying parts 45, 46, and 47 are prevented from saturation and the second NMOS-FET power transistors 65, 66, and 67 are conducted enough.

FIG. 6 shows a configuration of the second current amplifying parts 45, 46, and 47, as well as the high-voltage outputting part 51. The second current amplifying part 45 is configured by a second amplifying part current-mirror circuit consisting of transistors 261 and 262, and resistors 263 and 264. The emitter area ratio of the transistor 261 to the transistor 262 is set to 50 times and the resistance ratio of the resistor 264 to the resistor 263 is set to 50 times, so that the second current amplifying part 45 amplifies the current signal G1 by 50 times. In the same way, the second current amplifying part 46 is configured by a second amplifying part current-mirror circuit consisting of transistors 271 and 272, and resistors 273 and 274 to amplify the current signal G2 by 50 times. In the same way, the second current amplifying part 47 is configured by a second amplifying part current-mirror circuit consisting of transistors 281 and 282, and resistors 283 and 284 to amplify the current signal G3 by 50 times. Consequently, the second current amplifying parts 45, 46, and 47 amplify the three-phase second distributed current signals G1, G2, and G3, respectively, thereby outputting the three-phase second amplified current signals H1, H2, and H3.

The high-voltage outputting part 51 has a pulse generating circuit 421 that outputs a pulse signal Pa of about 100 kHz; a first upconverting capacitor 411; a second upconverting capacitor 412; a first voltage limit circuit consisting of diodes 425 to 428; and a second voltage limit circuit consisting of a diode 429. The level of an inverter 422 is changed digitally according to the pulse signal Pa of the pulse generating circuit 421. When the level of the inverter 422 is "L" (Low, or at, for example, the negative terminal side potential of the DC power source part 50), the first upconverting capacitor 411 is charged via the diode 423. When the inverter 422 changes to "H" (High, or to, for example, the positive terminal side potential of the DC power source part 50), the electric charge stored in the first upconverting capacitor 411 is transferred to the second upconverting capacitor 412 via the diode 424. Thus, the second upconverting capacitor 412 is charged. Consequently, the high level potential Vu is output at a terminal of the second upconverting capacitor 412. The potential Vu is higher than the positive terminal side potential Vcc of the DC power source part 50. The high level potential Vu is coupled to the second current amplifying parts 45, 46, and 47.

If the second upconverting capacitor 412 is continued to be charged, the high level potential Vu rises too high, so that transistors and diodes in an integrated circuit may be confronted with a voltage breakdown. In order to avoid such a problem, therefore, a first voltage limit circuit consisting of diodes 425 to 428 is provided to limit the high level potential Vu within a specified value. If no voltage breakdown is expected, the first voltage limit circuit is omissible.

The second amplified current signals H1, H2, and H3 operate so as to discharge the charge stored in the second upconverting capacitor 412. If a large current operation is continued long, for example, when starting the motor, the second upconverting capacitor 412 is discharged much, so that the potential Vu drops significantly sometimes. In order to avoid such a problem, therefore, a second voltage limit circuit consisting of a diode 429 is provided to prevent the high level potential Vu from dropping excessively. The second voltage limit circuit does not function in the normal speed controlled state in which the current level is small. If the potential Vu varies small, the second voltage limit circuit is omissible.

The current detecting part 21 shown in FIG. 1 detects a conducted current signal Ig supplied from the DC power source part 50 and outputs a current detected signal Ag corresponding to the conducted current signal Ig. The switching control part 22 compares the command signal Ad with the current detected signal Ag and turns on/off the control pulse signals Y1, Y2, and Y3 according to the comparison result, thereby causing the first NMOS-FET power transistors 61, 62, and 63 of the first power amplifying parts 11, 12, and 13 to perform high frequency switching operations. The switching control part 22 and the current detecting part 21 together form a switching operation block.

Figure 7:
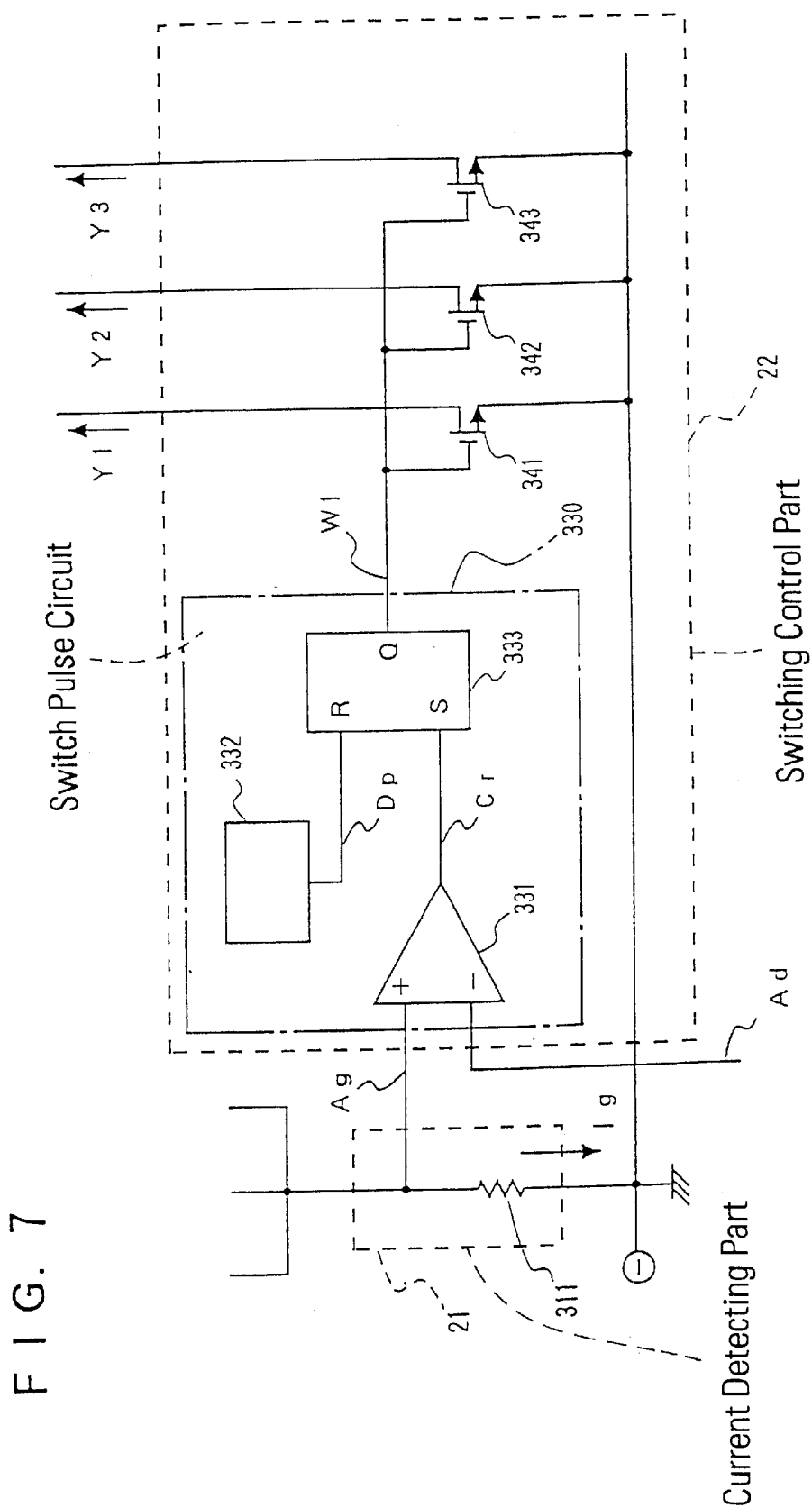
FIG. 7 is a circuit diagram of a switching control part 22 in the embodiment 1.

FIG. 7 shows a configuration of the current detecting part 21 and the switching control part 22. The current detecting part 21 is configured by a current detecting resistor 311 inserted in a current supply path of the DC power source part 50 and the conducted current signal Ig of the DC power source part 50 is detected by a voltage drop of the resistor 311, thereby outputting the current detected signal Ag.

The switching control part 22 includes a switching pulse circuit 330 that obtains a switching control signal W1. A comparing circuit 331 of the switching pulse circuit 330 compares the current detected signal Ag with the command signal Ad, and obtains a compared output signal Cr. A trigger generating circuit 332 outputs a high frequency trigger pulse signal Dp of about 100 kHz so as to trigger a state holding circuit 333 repetitively at short interval. The state holding circuit 333 changes the state of the switching control signal W1 to "Lb" (low potential state) at a rising edge of the trigger pulse signal Dp and to "Hb" (high potential state) at a rising edge of the compared output signal Cr. When the state of the switching control signal W1 turns to "Lb", the control transistors 341, 342, and 343 are turned off simultaneously or concurrently, so that the control pulse signals Y1, Y2, and Y3 are turned off (non-conducted state). At this time, the first power amplifying parts 11, 12, and 13 amplify the first amplified current signals F1, F2, and F3, thereby forming current paths for supplying negative current parts of the drive current signals to the windings 2, 3, and 4. When the state of the switching control signal W1 turns to "Hb", the control transistors 341, 342, and 343 are turned on simultaneously or concurrently, so that the control pulse signals Y1, Y2, and Y3 are turned on (conducted state). As a result, the input current signals to the conduction control terminal sides of the first power amplifying parts 11, 12, and 13 are bypassed. Thus, the first NMOS-FET power transistors 61, 62, and 63 of the first power amplifying parts 11, 12, and 13 are all turned off simultaneously or concurrently. Therefore, the first power amplifying parts 11, 12, and 13 are controlled at a high-frequency switching operation by a single pulse signal of the switching control signal W1. The drive voltage signals V1, V2, and V3 become pulsive corresponding to the switching control signal W1, and the conducted current signal Ig corresponding to the composed supply current signal of the drive current signals I1, I2, and I3 is controlled by the switching control signal W1, thereby controlling the drive current signals I1, I2, and I3 to the windings 2, 3, and 4 corresponding to the command signal Ad. Hereunder, this operation will be described more in detail.

If the level of the switching control signal W1 of the state holding circuit 333 is changed to "Lb" at a rising edge of the trigger pulse signal Dp, the first NMOS-FET power transistors of the first power amplifying parts 11, 12, and 13 are conducted according to the first amplified current signals F1, F2, and F3, which corresponds to the first distributed current signals E1, E2, and E3 selected and distributed by the first distributor 37. For example, when only the first distributed current signal E1 and then the first amplified current signal F1 are selected, the first NMOS-FET power transistor 61 of the first power amplifying part 11 is turned on. For supplying the negative current part of the drive current signal I1 to the winding 2 sufficiently, the first NMOS-FET power transistor 61 becomes in the full-on state. In the full-on state of an FET transistor, the voltage drop between the current input and output terminal sides of the transistor becomes very small due to a small ON resistance. The negative part of the drive current signal I1 to the winding 2 is increasing gradually due to a n inductance of the winding 2. Consequently, the composed supply current signal Ig and the current detected signal Ag of the current detecting part 21 are also increasing. And, at a moment the value of the current detected signal Ag exceeds the value of the command signal Ad, the compared output signal Cr of the comparing circuit 331 generates a rising edge, thereby the switching control signal W1 of the state holding circuit 333 turns to "Hb". Then, the control transistors 341, 342, and 343 become turned on, and the conduction control terminal sides of the first power amplifying parts 11, 12, and 13 are connected to the negative terminal side of the DC power source part 50, thereby causing all of the first NMOS-FET power transistors 61, 62, and 63 to become turned off simultaneously or concurrently. The conducted current signal Ig becomes zero. The off-state of an FET transistor means a state in which no current flows through the transistor from the input terminal side to the output terminal side. At this time, the inductance of the winding 2 increases the drive voltage V1 pulsively, thereby forming a current path passing through the second power diode 65*d* of the second power amplifying part 15. As a result, the negative current part of the drive current signal I1 to the winding 2 flows continuously. The negative current value of the drive current signal I1 to the winding 2 is reducing gradually. Then, in a short time, the next rising edge of the trigger pulse signal Dp appears, thus, enabling the switching operation to be repeated as described above. Therefore, the trigger pulse signal Dp makes the first power amplifying parts to perform high frequency switching operation, respectively. Since this switching operation is performed at about 100 kHz, switching ripples of the drive current signals are very small.

The conducted current signal Ig of the DC power source part 50, which is equal to the composed supply current to the windings, is controlled according to the command signal Ad, thereby controlling continuously the drive current signals to the windings 2, 3, and 4. The conducted current of the activated first NMOS-FET power transistor never exceeds the value of the conducted current signal Ig of the DC power source part 50. Consequently, it is possible to cause the activated first power transistor of the first power amplifying part to perform an on-state switching operation surely by supplying the first amplified current signal according to the command signal Ad to the conduction control terminal side of the activated first power amplifying part.

In correspondence with the movement of the movable member 1, the first distributor 37 distributes the first supply current signal C1 to one or two of the first distributed current signals alternately and smoothly, and the current paths to the windings are altered smoothly. For example, assume that the first distributed current signals E1 and E2, as well as the first amplified current signals F1 and F2 are supplied. If the switching control signal W1 of the state holding circuit 333 is changed to "Lb" at a rising edge of the trigger pulse signal Dp, the first NMOS-FET power transistor 61 of the first power amplifying part 11 and the first NMOS-FET power transistor 62 of the first power amplifying part 12 are turned active simultaneously. At this time, the first NMOS-FET power transistor 61 is active (full-on or half-on state) according to the first amplified current signal F1, thereby forming a current path for supplying the negative current part of the drive current signal I1 to the winding 2. The first NMOS-FET power transistor 62 is active (full-on or half-on state) according to the first amplified current signal F2, thereby forming a current path for supplying the negative current part of the drive current signal I2 of the winding 3. At this time, at least one of the first NMOS-FET power transistors 61 and 62 is in the full-on state, and at most one of the first NMOS-FET power transistors 61 an d 62 is in the half-on state. When a power transistor is operating in the half-on state, the FET power current-mirror circuit in a power amplifying part amplifies the input current signal to the conduction control terminal side by a specified amplifying factor. The conducted current signal Ig of the DC power source part 50 becomes equal to the composed supply current obtained by summing the negative current parts of the drive current signals I1, I2, and I3 to the windings 2, 3, and 4. The inductances of the windings increase the conducted current signal Ig gradually. When the current detected signal Ag exceeds the command signal Ad, the compared output signal Cr generates a rising edge, and thereby the switching control signal W1 is changed to "Hb". The control transistors 341, 342, and 343 are thus turned on. Consequently, the conduction control terminal sides of the first power amplifying parts 11, 12, and 13 are connected to the negative terminal side of the DC power source part 50 concurrently, thereby the first NMOS-FET power transistors 61, 62, and 63 are turned off simultaneously. The conducted current signal Ig becomes zero. The inductance of the winding 2 increases the drive voltage signal V1 pulsively, thereby forming a current path passing through the second power diode 65*d* of the second power amplifying part 15 so as to flow continuously the negative current part of the drive current signal I1 to the winding 2. The negative current of the drive current signal I1 to the winding 2 is decreasing gradually. Also the inductance of the winding 3 increases the drive voltage signal V2 pulsively, thereby forming a current path passing through the second power diode 66d of the second power amplifying part 16 so as to flow continuously the negative current part of the drive current signal I2 to the winding 3. The negative current of the drive current signal I2 to the winding 3 decreasing gradually. Soon the next rising edge of the trigger pulse signal Dp appears, thus enabling the switching operation to be repeated as described above. In accordance with the movement of the movable member 1, the first distributed current signals E1 and E2, as well as the first amplified current signals F1 and F2 can be varied, thereby changing the negative current parts of the drive current signals I1 and I2 to the windings 2 and 3 smoothly. In the same way, current paths to the windings are altered smoothly. Since amplitudes of the three-phase first amplified current signals are varied in proportion to or approximately in proportion to the command signal Ad in this embodiment, the current paths can be altered smoothly even when the command signal Ad is changed.

The second NMOS-FET power transistors of the second power amplifying parts 15, 16, and 17 are activated according to the second amplified current signals H1, H2, and H3, which corresponds to the second distributed current signals G1, G2, and G3 selected and distributed by the second distributor 38. For example, when only the second distributed current signal G2 and then the second amplified current signal H2 are selected, the second NMOS-FET power transistor 66 of the second power amplifying part 16 is turned on. For supplying the positive current part of the drive current signal I2 to the winding 3 sufficiently, the second NMOS-FET power transistor 66 becomes in the full-on state. Since the conducted current signal Ig of the DC power source part 50 and the composed supply current signal to the windings are controlled corresponding to the command signal Ad as described above, the positive current part of the drive current signal I2 to the winding 3 is also controlled corresponding to the command signal Ad. Therefore, it is possible to cause the activated second power transistor of the second power amplifying part to perform in the full-on state surely by supplying the second amplified current signal according to the command signal Ad to the conduction control terminal side of the second power amplifying part.

In correspondence with the movement of the movable member 1, the second distributor 38 distributes the second supply current signal C2 to one or two of the second distributed current signals alternately and smoothly, and the current paths to the windings are altered smoothly. For example, assume that the second distributed current signals G2 and G3, as well as the second amplified current signals H2 and H3 are supplied. At this time, the second NMOS-FET power transistor 66 of the second power amplifying part 16 and the second NMOS-FET power transistor 67 of the second power amplifying part 17 are activated. The second NMOS-FET power transistor 66 is active (full-on or half-on state) according to the second amplified current H2, thereby forming a current path for supplying the positive current part of the drive current signal I2 to the winding 3. The second NMOS-FET power transistor 67 is active (full-on or half-on state) according to the second amplified current signal H3, thereby forming a current path for supplying the positive current part of the drive current signal I3 to the winding 4. At this time, at least one of the second NMOS-FET power transistors 66 and 67 is in the full-on state, and at most one of the second NMOS-FET power transistors 66 and 67 is in the half-on state. When a power transistor is operating in the half-on state, the FET power current-mirror circuit in a power amplifying part amplifies the input current signal to the conduction control terminal side by a specified amplifying factor. The second distributed current signals G2 and G3, as well as the second amplified current signals H2 and H3 vary according to the movement of the movable member 1, thereby changing the positive current parts of the drive current signals I2 and I3 to the windings 3 and 4 smoothly. In the same way, current paths to the windings are altered smoothly. Since amplitudes of the three-phase second amplified current signals are varied in proportion or approximately in proportion to the command signal Ad in this embodiment, the current paths can be altered smoothly even when the command signal Ad is changed.

Figure 8:
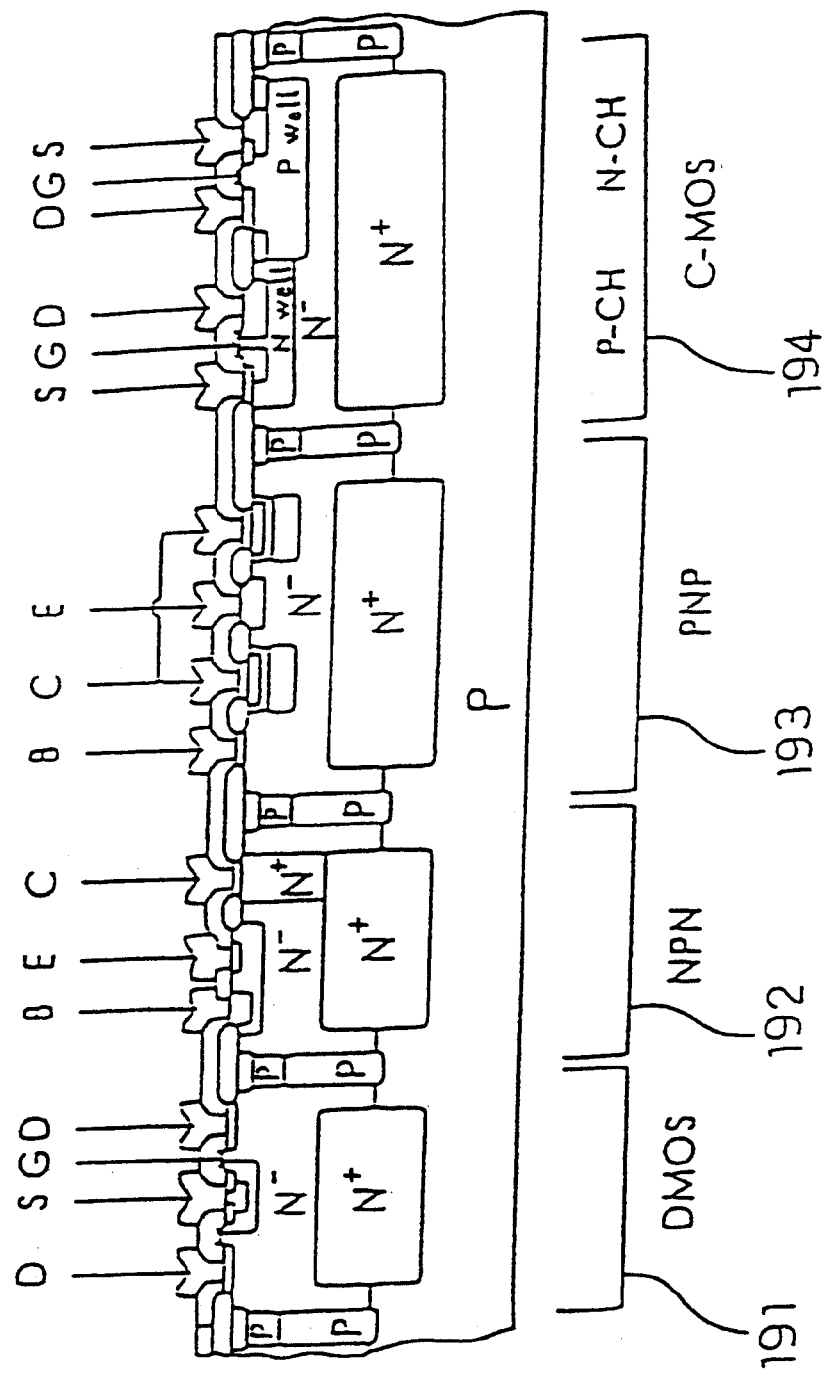
FIG. 8 is a cross sectional view of a portion of an integrated circuit in the embodiment 1.

The first NMOS-FET power transistors 61, 62, and 63 of the first power amplifying parts 11, 12, and 13 shown in FIG. 1, as well as the second NMOS-FET power transistors 65, 66, and 67 of the second power amplifying parts 15, 16, and 17 are junction-isolated so as to be integrated on a single chip silicon substrate together with semiconductor elements of the transistors, resistors, etc. used for the command signal producing part 20, the current detecting part 21, the switching control part 22, the supply signal producing part 30, the altering signal producing part 34, the distributed signal producing part 36, the first current amplifying parts 41, 42, and 43, the second current amplifying parts 45, 46, and 47, and the high-voltage outputting part 51. FIG. 8 shows an example of a structure of such an integrated circuit. Various transistors are formed by diffusing required N+ layers, N− layers, P+ layers, P− layers, etc. into a P type silicon substrate. A numeral 191 indicates a double-diffused NMOS-FET transistor, which is used as a first NMOS-FET power transistor or a second NMOS-FET power transistor. The parasitic diode device of this double-diffused NMOS-FET transistor is used as a first power diode or a second power diode. A numeral 192 indicates a bipolar transistor of NPN type, which is used as a signal amplifying transistor. A numeral 193 indicates a bipolar transistor of PNP type, which is used as a signal amplifying transistor. A numeral 194 indicates a CMOS FET transistors of the P-channel and the N-channel, which are used to process logic signals. Each transistor is junction-isolated from the others by P layers whose potential are identical to the potential of a silicon substrate connected to the ground potential (0V). A junction-isolated IC can integrate many power transistor devices and signal transistors high-densely on a small single chip substrate by using a low cost manufacturing process. In other words, the IC can be manufactured at a low cost. A specific mask layout is a design item, so detailed explanation for the layout will be omitted here.

Next, the operation of the motor shown in FIG. 1 will be described. The altering signal producing part 34 generates three-phase altering current signals D1, D2, and D3 varying smoothly and supplies these signals to the first and second distributors 37 and 38 of the distributed signal producing part 36. The first distributor 37 outputs three-phase first distributed current signals E1, E2, and E3, proportional to the first supply current signal C1, according to the three-phase first separated signals D1n, D2n, and D3n. The first current amplifying parts 41, 42, and 43 output the first amplified current signals F1, F2, and F3 by amplifying the first distributed current signals E1, E2, and E3, respectively, thereby supplying the first amplified current signals F1, F2, and F3 to the conduction control terminal sides of the first power amplifying parts 11, 12, and 13. The first NMOS-FET power transistors 61, 62, and 63 of the first power amplifying parts 11, 12, and 13 perform high frequency on/off switching by the control pulse signals Y1, Y2, and Y3 corresponding to the switching control signal W1 from the switching control part 22. When the switching control signal W1 is on the "Lb" level, the first power amplifying parts 11, 12, and 13 amplify the first amplified current signals F1, F2, and F3, thereby forming current paths for supplying negative current parts of the drive current signals I1, I2, and I3 to the three-phase windings 2, 3, and 4. When the switching control signal W1 is turned in the "Hb" level, the first NMOS-FET power transistors 61, 62, and 63 of the first power amplifying parts 11, 12, and 13 are all turned off simultaneously. At this time, the current paths for supplying negative current parts of the drive current signals I1, I2, and I3 to the three-phase windings 2, 3, and 4 are formed by one or two of the second power diodes 65d, 66d, and 67d of the second power amplifying parts 15, 16, and 17. Consequently, the drive current signals to the windings can be varied smoothly even while the first power amplifying parts 11, 12, and 13 are performing high frequency switching operations. Consequently, the first power amplifying parts 11, 12, and 13 can smoothly alter the current paths to the windings.

The current detecting part 21 detects the conducted current signal Ig of the DC power source part 50 and outputs the current detected signal Ag corresponding to the conducted current signal Ig. The switch control part 22 compares the command signal Ad from the command signal producing part 20 with the current detected signal Ag of the current detecting part 21, thereby changing the switching control signal W1 according to the comparison result and then causing the first NMOS-FET power transistors 61, 62, and 63 of the first power amplifying parts 11, 12, and 13 (and the first power current-mirror circuit) to turn off simultaneously according to the change of the switching control signal W1. Consequently, one or two FET power transistors of the first NMOS-FET power transistors 61, 62, and 63 of the first power amplifying parts 11, 12, and 13 perform high frequency on/off switching according to the single pulse signal W1, thereby controlling the conducted current signal Ig of the DC power source part 50 so that the composed supply current of the drive current signals to the windings is controlled in accordance with the command signal Ad. The supply signal producing part 30, the first distributor 37, and the first current amplifying parts 41, 42, and 43 together form a first distribution control block, which controls the conduction periods of the first NMOS-FET power transistors 61, 62, and 63 of the first power amplifying parts 11, 12, and 13. The switching control part 22 and the current detecting part 21 together form the switching operation block, which controls the switching operations of the first NMOS-FET power transistors 61, 62, and 63 of the first power amplifying parts 11, 12, and 13.

On the other hand, the second distributor 38 outputs the second three-phase distributed current signals G1, G2, and G3, proportional to the second supply current signal C2, according to the second three-phase separated signals D1p, D2p, and D3p. The second current amplifying parts 45, 46, and 47 output the second amplified current signals H1, H2, and H3 by amplifying the second distributed current signals G1, G2, and G3, respectively, thereby supplying the second amplified current signals G1, G2, and G3 to the conduction control terminal sides of the second power amplifying parts 15, 16, and 17. The second power amplifying parts 15, 16, and 17 amplify the second amplified signals H1, H2, and H3, respectively, thereby supplying positive current parts of the drive current signals I1, I2, and I3 to the three-phase windings 2, 3, and 4, even when the first power amplifying parts 11, 12, and 13 perform high frequency on/off switching. Consequently, the second power amplifying parts 15, 16, and 17 can smoothly alter the current paths to the windings. The supply signal producing part 30, the first distributor 38, and the second current amplifying parts 45, 46, and 47 together form a second distribution control block, which controls the conduction periods of the second NMOS-FET power transistors 65, 66, and 67 of the second power amplifying parts 15, 16, and 17.

The first power amplifying parts 11, 12, and 13 amplify the three-phase first amplified current signals F1, F2, and F3, varying smoothly in rising and/or falling slopes, supplied to their conduction control terminal sides, and perform on/off switching at their conduction control terminal sides by the control pulse signals Y1, Y2, and Y3 of the switching control part 22. Consequently, it becomes possible to alter smoothly the negative current parts of the drive current signals I1, I2, and I3 to the windings 2, 3, and 4, while the first NMOS-FET power transistors 61, 62, and 63 perform high frequency on/off switching operation corresponding to the single switching control signal W1.

The second power amplifying parts 15, 16, and 17 amplifies the three-phase second amplified current signals H1, H2, and H3, varying smoothly in rising and/or falling slopes, supplied to their conduction control terminal sides of the second power amplifying parts 15, 16, and 17. Consequently, it becomes possible to alter smoothly the positive current parts of the drive current signals I1, I2,and I3 to the windings 2, 3, and 4.

Consequently, the first power amplifying parts 11, 12, and 13, as well as the second amplifying parts 15, 16, and 17 can alter smoothly the waveforms of the drive current signals I1, I2, and I3 to the windings 2, 3, and 4. The ripple of the generated force of the motor can thus be reduced remarkably in size, thereby realizing a high performance motor with reduced vibration and acoustic noise as well as reduced power loss.

Furthermore, the three-phase first amplified current signals are changed in proportion to or approximately in proportion to the command signal Ad so as to supply three-phase input current signals properly to the conduction control terminal sides of the first power amplifying parts. Consequently, even when the drive current signals to the windings are changed corresponding to the command signals Ad, the drive current signals can be altered smoothly. The current paths to the windings can thus always be altered smoothly.

Furthermore, the three-phase second amplified current signals are changed in proportion to or approximately in proportion to the command signal Ad so as to supply three-phase input current signals properly to the conduction control terminal sides of the second power amplifying parts. Consequently, even when the drive current signals to the windings are changed corresponding to the command signal Ad, the drive current signals can be altered smoothly. The current paths to the windings can thus always altered smoothly.

Furthermore, according to the operations of the first distributor 37 and the second distributor 38, the first distributed signal and the second distributed current signal in the same phase are flown complementarily. Thus, the first NMOS-FET power transistor of the first power amplifying part and the second NMOS-FET power transistor of the second power amplifying part in the same phase also function complementarily. Consequently, the first power amplifying part and the second power amplifying part in the same phase supply the bi-directional drive current signal varying smoothly, and do not make a short-circuit current through them.

As described above, the embodiment has a motor configuration suitable for reducing power loss of the power amplifying parts and improving power efficiency. In this embodiment, the first NMOS-FET power transistors of the first power amplifying parts are turned on/off at a high frequency. Thus, the power loss in the first power amplifying parts becomes small. And, since the second NMOS-FET power transistors of the second power amplifying parts are turned on in supplying a large current, the power loss in the second power amplifying part becomes small. Consequently, this embodiment can provide a motor with excellent power efficiency. In addition, since the first and second amplified current signals are changed corresponding to the command signal Ad, the power loss caused by input current signals to the conduction control terminal sides of the first and second power amplifying parts also becomes small.

Furthermore, in this embodiment, the three-phase first amplified current signals F1, F2, and F3 (as the first three-phase current signals) are supplied to the conduction control terminal sides of three first power amplifying parts. And, the first three-phase current signals F1, F2, and F3 are varied smoothly in rising and falling slopes. Consequently, the negative current parts of the drive current signals I1, I2, and I3 to the windings 2, 3, and 4 are altered smoothly while one or two of the first NMOS-FET power transistors 61, 62, and 63 of the first amplifying parts 11, 12, and 13 are turned on/off at a high frequency.

In the same way, the three-phase second amplified current signals H1, H2, and H3 (as the second three-phase current signals) are supplied to the conduction control terminal sides of three second power amplifying parts. The second three-phase current signals H1, H2, and H3 are varied smoothly in rising and falling slopes. Consequently, the positive current parts of the drive current signals I1, I2, and I3 to the windings 2, 3, and 4 are altered smoothly while one or two of the first NMOS-FET power transistors 65, 66, and 67 of the second amplifying parts 15, 16, and 17 are turned active (full-on or half-on).

It is thus possible to alter current paths smoothly, thereby reducing the ripples in both drive current signals and generated force. As a result, the vibration and the acoustic noise of the motor can be reduced remarkably. Furthermore, since at least slopes of the first and second three-phase current signals are changed corresponding to the command signal Ad, altering operation of the current paths can be achieved smoothly even when the motor load is varied. The current signal supplied to the conduction control terminal side of each power amplifying part can be a current signal varying smoothly or substantially smoothly at least in rising and/or falling slopes. For example, the current signal can be a current signal whose value is varied stepwisely.

Furthermore, the current detecting part 21 obtains the current detected signal Ag corresponding to the conducted current signal Ig from the DC power source part 50 in this embodiment. So the current detected signal Ag is corresponding to the composed supply-current of the negative or positive parts of the three-phase drive currents to the three-phase windings. The switching control part 22 compares the command signal Ad with the output signal Ag from the current detecting part 21, and causes the first NMOS-FET power transistors 61, 62, and 63 of the three first power amplifying parts 11, 12, and 13 to perform on/off switching operations, pulsively according to the comparison result. Consequently, the conducted current signal Ig and the composed supply current can be controlled corresponding to the command signal Ad, and the three-phase drive current signals can be altered smoothly even when the command signal Ad changes. As a result, the motor of the invention can control the generated torque accurately corresponding to the command signal Ad and reduce vibration remarkably. Furthermore, one or two first power amplifying parts are conducted at the repetitive timing of the trigger pulse signal Dp and three first power amplifying parts are turned off simultaneously by a single pulse signal (switching control signal W1). Consequently, the configuration of the motor becomes very simple. In other words, although one or two first power amplifying parts are turned on as the movable member 1 is moved, it is only needed that one or two of the first power amplifying parts 11, 12, and 13 are turned on/off at a high frequency according to a single pulse signal, thereby making the configuration of the motor very simple. In addition, since only a single pulse signal is used to decide the timing of high frequency switching, the switching timing control is easy and both current detecting operation and current controlling operation become stable. The switching operation block (the switching control part 22 and the current detecting part 21) controls switching operations of power amplifying parts.

In this embodiment, a motor configuration is suitable for implementation in integrated circuit form. Since parasitic diodes of power transistors are used as power diodes, these power elements can be integrated on a small chip. Furthermore, it is possible to integrate semiconductor devices such as transistors and resistors, needed for the command signal producing part 20, the current detecting part 21, the switching control part 22, the supply signal producing part 30, the altering signal producing part 34, the distributed signal producing part 36 (the first distributor 37 and the second distributor 38), three first current amplifying parts 41, 42, and 43, three second current amplifying parts 45, 46, and 47, and the high-voltage outputting part 51, into an IC on a chip together with power transistors.

Furthermore, heat or power loss of the power devices are made small enough to integrate them into an IC, because the first NMOS-FET power transistors are switched on/off at a high frequency and the second NMOS-FET power transistors are turned on. Consequently, even when these power devices are integrated into an IC on a chip, the IC will never be confronted with a thermal breakdown. In addition, no radiator plate is needed.

Furthermore, this embodiment can prevent operations of the parasitic transistor devices, each being composed to have a base terminal at a junction-isolated portion. As shown in FIG. 8, the high density IC using a junction-isolation technology can be manufactured at a low cost. However, this IC has a disadvantage that many parasitic transistor devices, each having the base terminal at the junction-isolated portion, are formed, so the junction isolated portion is connected to the negative terminal side (ground potential) of the DC power source part 50. Usually, these parasitic transistors are reversely biased so that their functions are disabled. If the terminal potential of an integrated transistor falls down below the ground potential by more than a forward voltage drop of a diode, however, the parasitic transistor begins functioning, thereby causing the parasitic transistor to flow in a current from a integrated transistor (not a parasitic transistor). When a large current is supplied to a winding having an inductance just like that in a motor, if a parasitic transistor begins functioning, it may disturb the functions of the integrated transistors significantly. Especially, when a power transistor supplying a large drive current signal to a winding is switched on/off at a high frequency, the power transistor changes pulsively the winding voltage or the drive voltage signal, and its parasitic transistors are apt to begin functioning, thereby having a great deal of possibility to disturb the normal circuit operation significantly.

In this embodiment, only the first NMOS-FET power transistors are switched pulsively so as to supply the drive current signals to the windings. And, since the current output terminal sides of the first NMOS-FET power transistors are connected to the negative terminal side of the DC power source part, the potentials at both current input and output terminal sides of the first NMOS-FET power transistors are not lowered under the ground potential. In addition, although the potential at the current input terminal side of each of the first NMOS-FET power transistors goes over the positive terminal potential of the DC power source part 50, no parasitic transistor disturbing an integrated transistor turns to be functioning. Consequently, even when the first NMOS-FET power transistors are used for high frequency switching, no parasitic transistor disturbs the circuit operation.

Furthermore, the second NMOS-FET power transistors alters their current paths smoothly. Consequently, even when the second NMOS-FET power transistors alters the current paths, the potential of the power supply terminal to each winding never goes under the negative terminal potential of the DC power source part 50.

Consequently, even when the first and second NMOS-FET power transistors are integrated on a chip together with other transistors, parasitic transistors in the IC are completely prevented to disturb the circuit operation. It is thus possible to integrate the motor circuit on a single chip substrate without worrying about operations of parasitic transistor devices.

Furthermore, in this embodiment, each of the first power amplifying parts is configured by a first FET power current-mirror circuit and each of the second amplifying parts is configured by a second FET power current-mirror circuit, thereby reducing remarkably the variation of the current amplifying gains among the first and second power amplifying parts 11, 12, 13, 14, 15, 16, and 17 significantly. In addition, the first three-phase current signals F1, F2, and F3 corresponding to the altering signals are supplied to the conduction control terminal sides of the three first power amplifying parts 11, 12, and 13. Each of the first three-phase current signals F1, F2, and F3 is varied smoothly or substantially smoothly at least in rising and falling slopes. In addition, the second three-phase current signals H1, H2, and H3 corresponding to the altering signals are supplied to the conduction control terminal sides of three second power amplifying parts 15, 16, and 17. Each of the second three-phase current signals H1, H2, and H3 are varied smoothly or substantially smoothly at least in rising and falling slopes. Three first FET power transistors 61, 62, and 63, as well as three second FET power transistors 65, 66, and 67 are therefore enabled to alter their current paths smoothly while the first FET power transistors 61, 62, and 63 are used for high frequency switching. As a result, ripples of the drive current signals are reduced, and a generated torque with reduced pulsation can be obtained, thereby reducing vibration and acoustic noise of the motor significantly. In addition, since the FET power transistors are integrated into an IC, the variation of the current amplifying factors of the FET power current-mirror circuits has successfully reduced.

This embodiment also has an advantage that it can reduce the variation of the overall gain of the first power amplifying parts and the first distribution control block, as well as the variation of the overall gain of the second amplifying parts and the second distribution control block. In addition, the first supply current signal C1 and the second supply current signal C2 of the supply signal producing part 30 are changed corresponding to the command signal Ad, thereby changing the first and second three-phase current signals corresponding to the command signal Ad. The altering operation of the current paths to the windings can thus be achieved smoothly while at least one of the three first NMOS-FET power transistors is operated in high frequency switching between full on and off. In addition, the altering operation of the current paths to the windings can thus be achieved smoothly while at least one of the three second NMOS-FET power transistors is turned on fully without fail. Each of the first three-phase current signals has a proper slope to be varied smoothly or substantially smoothly and is supplied to the conduction control terminal side of each of the first power amplifying parts. Each of the second three-phase current signals has a proper slope to be varied smoothly or substantially smoothly and is supplied to the conduction control terminal side of each of the second amplifying parts. The first and second three-phase current signals are changed corresponding to the command signal Ad, which commands a supply power to the windings so as to make the composed supply current large in a starting period and that small in a speed controlled period. As a result, the current paths to the windings are altered smoothly and the generated torque has a reduced pulsation. So vibration and acoustic noise of the motor can be reduced significantly even when the command signal Ad is changed. Since it is very important to widen the active electrical angle or active electrical angle width of each of the three-phase first current signals F1, F2, and F3 more than 120 electrical degrees so as to alter current paths smoothly, the active electrical angle width should be 180 degrees or about 180 degrees most preferably. However, an active electrical angle width of 150 degrees or over will also be effective considerably. And, since it is very important to widen the active electrical angle width of each of the three-phase second current signals H1, H2, and H3 more than 120 electrical degrees so as to alter current paths smoothly, the active electrical angle width should be 180 degrees or about 180 degrees most preferably. However, an active electrical angle width of 150 degrees or over will also be effective considerably.

Furthermore, the first three-phase current signal F1 and the second three-phase current signal H1 of the first phase has a difference of 180 electrical degrees, and flows complementarily. The first three-phase current signal F2 and the second three-phase current signal H2 of the second phase also has a difference of 180 electrical degrees, and flows complimentarily. The first three-phase current signal F3 and the second three-phase current signal H3 of the third phase also has a difference of 180 electrical degrees, and flows complimentarily. Consequently, the first power amplifying part and the second power amplifying part of the same phase are never conducted concurrently. Thus, no short-circuit current through them is occurred in the IC, thereby neither current breakdown nor thermal breakdown occurs in any of the power transistors.

In this embodiment, the drive circuit for supplying the drive current signals to the three-phase loads (the windings 2, 3, and 4) is configured by the first power amplifying parts 11, 12, and 13, the second power amplifying parts 15, 16, and 17, the command signal producing part 20, the current detecting part 21, the switching control part 22, the supply signal producing part 30, the altering signal producing part 34, the distributed signal producing part 36 (first and second distributors 37 and 38), the first current amplifying parts 41, 42, and 43, the second current amplifying parts 45, 46, and 47, and the high-voltage outputting part 51.

The altering signal producing part 34 in this embodiment is configured by including the position detecting part 100 having two magnetic-electronic converting elements. However, three magnetic-electronic converting elements can be used to produce three-phase position signals in the altering signal producing part 34. In addition, the three-phase altering signals can be produced without above-mentioned elements, for example, by detecting the back electromotive forces generated in the windings 2, 3, and 4.

The first three-phase current signals F1, F2, and F3 or the second three-phase current signals H1, H2, and H3 can be varied with a time slope substantially in rising and falling slopes. Consequently, the drive current signals I1, I2, and I3 are also altered smoothly with a time slope in rising and falling slopes. In addition, a current value of a drive current signal should preferably be varied continuously. However, there may be provided a time in which a drive current signal becomes zero. The vibration of the motor can be reduced by setting the conduction angle width of each of the first NMOS-FET power transistors more than 120 electrical degrees (preferably, 150 degrees or over) and providing a period in which two first NMOS-FET power transistors are conducted simultaneously or concurrently. The vibration of the motor can also be reduced by setting the conduction angle width of each of the second NMOS-FET power transistors more than 120 electrical degrees (preferably, 150 degrees or over) and providing a period in which two second NMOS-FET power transistors are conducted simultaneously or concurrently. Most preferably, the conduction angle width of each of the first and second NMOS-FET transistors should be set to 180 degrees or approximately about 180 degrees.

Furthermore, each of the first and second power amplifying parts 11, 12, 13, 15, 16, and 17 is not limited to the configuration shown in FIG. 1 in this embodiment. The configuration is modified freely. For example, instead of each of the first and second power amplifying parts 11, 12, 13, 15, 16, and 17, a power amplifying part 450 shown in FIG. 10 can be used. The power amplifying part 450 includes an FET power current-mirror circuit consisting of an FET power transistor 451, a power diode 451d, and an FET transistor 452, and a resistor 453. This FET power current-mirror circuit is configured so that the control terminal side of the FET power transistor 451 is connected to the control terminal side of the FET transistor 452 (directly or via an element, for example, such as a resistor), one terminal side of the current path terminal pair of the FET transistor 452 is connected to one terminal side of the current path terminal pair of the FET power transistor 451 via a resistor 453, the other terminal side of the current path terminal pair of the FET transistor 452 is connected to the conduction control terminal side of the power amplifying part 450 (directly or via an element), and the control terminal side of the FET transistor 452 is connected to the conduction control terminal side of the power amplifying part 452 (directly or via an element). This FET power current-mirror circuit has an advantage that it has a considerably large current amplifying ratio larger than the ratio of the cell sizes of the NMOS-FET power transistor 451 and the NMOS-FET transistor 452. Therefore, the power amplifying part 450 has an advantage to reduce the input current to the power amplifying part.

For another example, a power amplifying part 460 shown in FIG. 11 can be used instead of each of the first and second power amplifying parts of FIG. 1. The power amplifying part 460 includes an FET power current-mirror circuit consisting of an NMOS-FET power transistor 461, a power diode 461d, an NMOS-FET transistor 462, and a resistor 463. The FET power current-mirror circuit is configured so that the control terminal side of the FET power transistor 461 is connected to the control terminal side of the FET transistor 462 (directly or via an element), one terminal side of the current path terminal pair of the FET transistor 462 is connected to the conduction control terminal side of the power amplifying part 460 via the resistor 463, the other terminal side of the current path terminal pair of the FET transistor 462 is connected to the other terminal side of the current path terminal pair of the FET power transistor 461 (directly or via an element), and the control terminal side of the FET transistor 462 is connected to the conduction control terminal side of the power amplifying part 460 (directly or via an element). This FET power current-mirror circuit has a predetermined current amplifying rate while the input current to the conduction control terminal side is small. When the input current is increased, the current amplifying rate is increased sharply. Consequently, the FET power current-mirror circuit has an advantage that the input current to each power amplifying part can be reduced when a large current is supplied to each of windings, for example, when a motor is started up. The NMOS-FET power transistor 451 and the power diode 451d, as well as the NMOS-FET power transistor 461 and the power diode 461d can be configured by an FET power transistor with double diffused N channel MOS structure and its parasitic diode device, respectively, so that these transistors and diodes can be integrated easily into an IC.

Furthermore, the configuration of the switching pulse circuit 330 of the switching control part 22 shown in FIG. 7 can be modified freely in this embodiment. For example, instead of the switching pulse circuit 330, a switching pulse circuit 480 shown in FIG. 12 can be used. The comparing circuit 481 of the switching pulse circuit 480 outputs a compared output signal Cr obtained by comparing the command signal Ad with the current detected signal Ag. In other words, the compared output signal Cr enters the "Lb" state when the value of the current detected signal Ag is smaller than the value of the command signal Ad. The compared output signal Cr enters the "Hb" state when the value of the current detected signal Ag is larger than the value of the command signal Ad. The timer circuit 482 generates a switching control signal W1 at a rising edge of the compared output signal Cr of the comparing circuit 481 (when the state is changed from "Lb" to "Hb"). The control signal W1 enters the "Hb" state only by a predetermined time interval Wp. This time interval Wp is decided by charge/discharge operation of the capacitor 483.

When the switching control signal W1 is in the "Lb" state, the control pulse signals Y1, Y2, and Y3 are turned off (non-conducted state) and the first power amplifying parts 11, 12, and 13 are turned on (full-on or half-on state) according to the first amplifying current signals F1, F2, and F3. When the switching control signal W1 enters the "Hb" state, the control pulse signals Y1, Y2, and Y3 are turned on (conducted state) and the first NMOS-FET power transistors 61, 62, and 63 of the first power amplifying parts 11, 12, and 13 are turned off simultaneously or concurrently.

Consequently, the switching control signal W1 enters the "Lb" state if the value of the current detected signal Ag is smaller than the value of the command signal Ad. Thus, the first power amplifying parts are turned on. When the conducted current signal Ig of the DC power source part 50 is increased and the value of the current detected signal Ag becomes larger than the value of the command signal Ad, the compared output signal Cr enters to the "Hb" state. Then, the timer circuit 482 is triggered at a rising edge of the compared output signal Cr from the comparing circuit 481, so that the switching control signal W1 enters the "Hb" state only within the predetermined time interval Wp. As a result, the first power amplifying parts 11, 12, and 13 are turned off during the predetermined time interval Wp. When the predetermined time interval Wp is over after the first amplifying parts 11, 12, and 13 are turned off, the switching control signal W1 enters the "Lb" state and the first power amplifying parts are turned on again. The first NMOS-FET power transistors 61, 62, and 63 of the first power amplifying parts 11, 12, and 13 perform high frequency on/off switching operations such way. In addition, according to the movement of the movable member 1, the current paths to the windings 2, 3, and 4 are altered smoothly.

<<Embodiment 2>>

Figure 13:
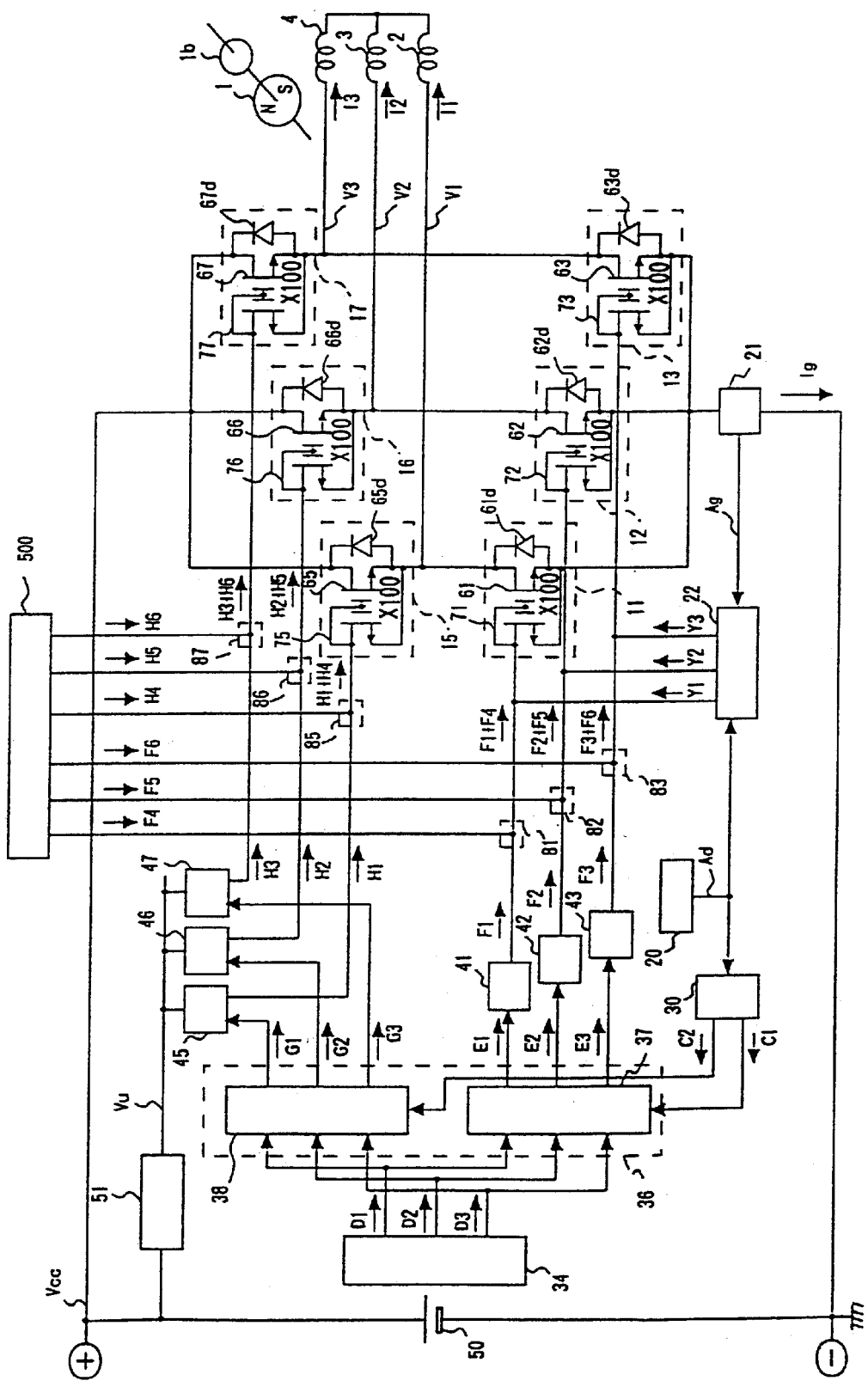
FIG. 13 is a diagram showing the configuration of the embodiment 2 of the present invention.

A motor in the embodiment 2 of the present invention will be described with reference to FIGS. 13 to 15. FIG. 13 illustrates a configuration of the motor. In the embodiment 2, an auxiliary supply part 500, first mixing parts 81, 82, and 83, and second mixing parts 85, 86, and 87 are added newly. In the other configuration, components similar to the foregoing embodiment 1 are designated by the same numerals, and detailed explanation thereof is omitted.

The auxiliary supply part 500 in FIG. 13 supplies first three-phase auxiliary current signals F4, F5, and F6, and second three-phase auxiliary current signals H4, H5, and H6 according to output signals from the altering signal producing part 34. FIG. 14 shows a configuration of the auxiliary supply part 500. The auxiliary supply part 500 is composed of an auxiliary altering signal producing part 510 and an auxiliary current altering part 520. The auxiliary altering signal producing part 510 receives three-phase position signals Ja1, Jb1, and Jc1 from the altering signal producing part 34 and outputs auxiliary altering signals J4 to J9 according to those position signals.

Figure 15:
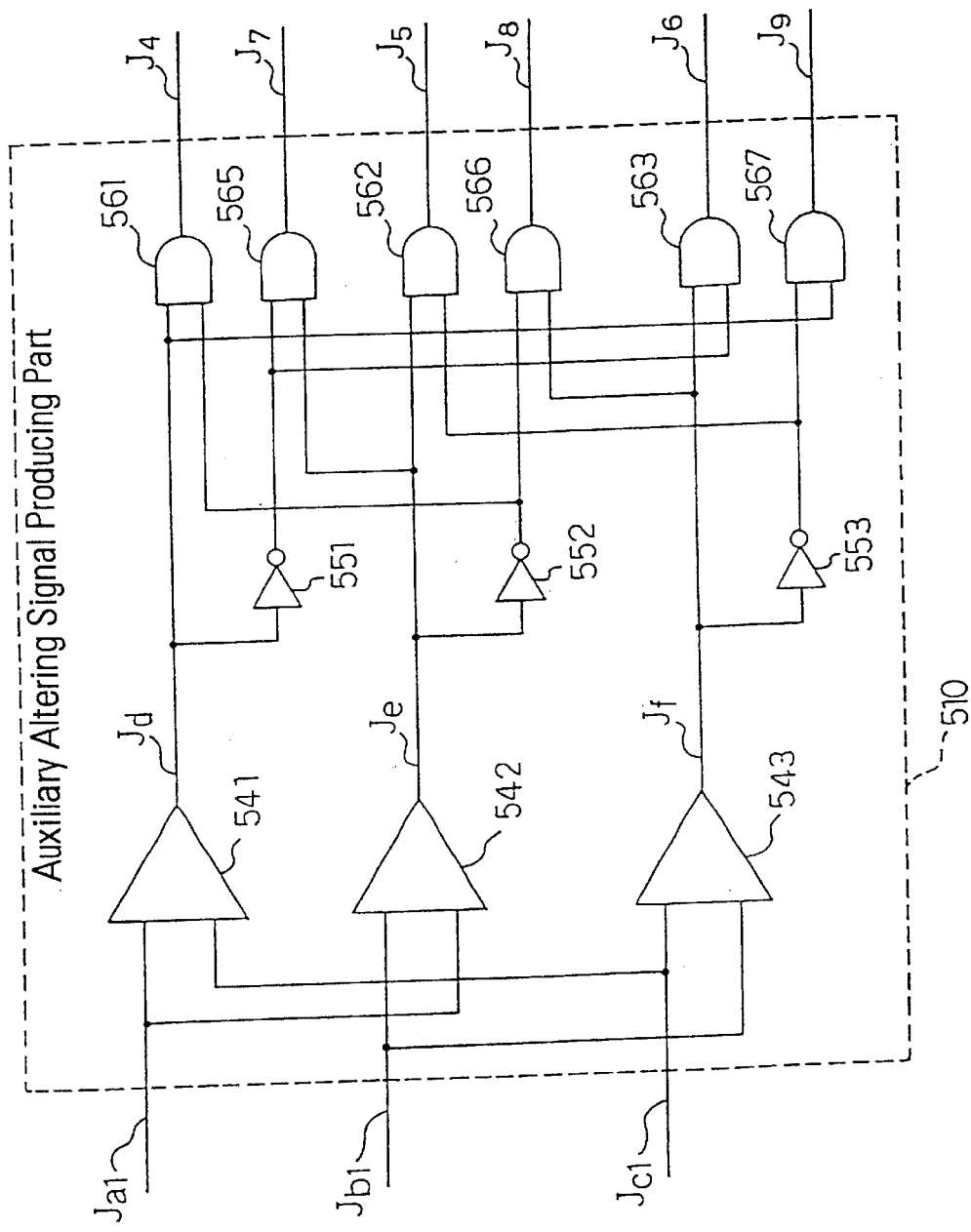
FIG. 15 is a circuit diagram of an auxiliary altering signal producing part 510 in the embodiment 2.
Figure 16:
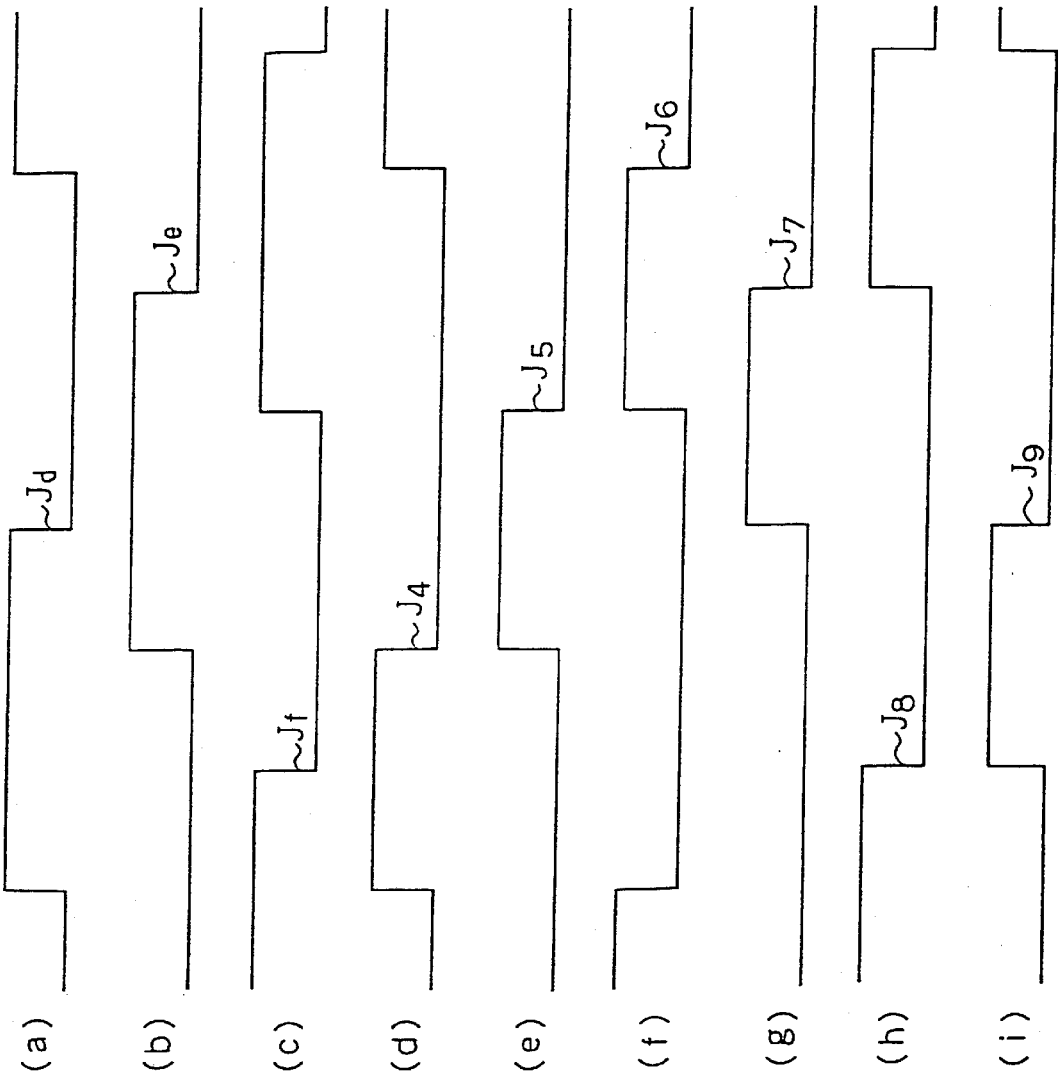
FIG. 16 is a waveform chart for explaining the operation of the auxiliary altering signal producing part 510 in the embodiment 2.
Figure 17:
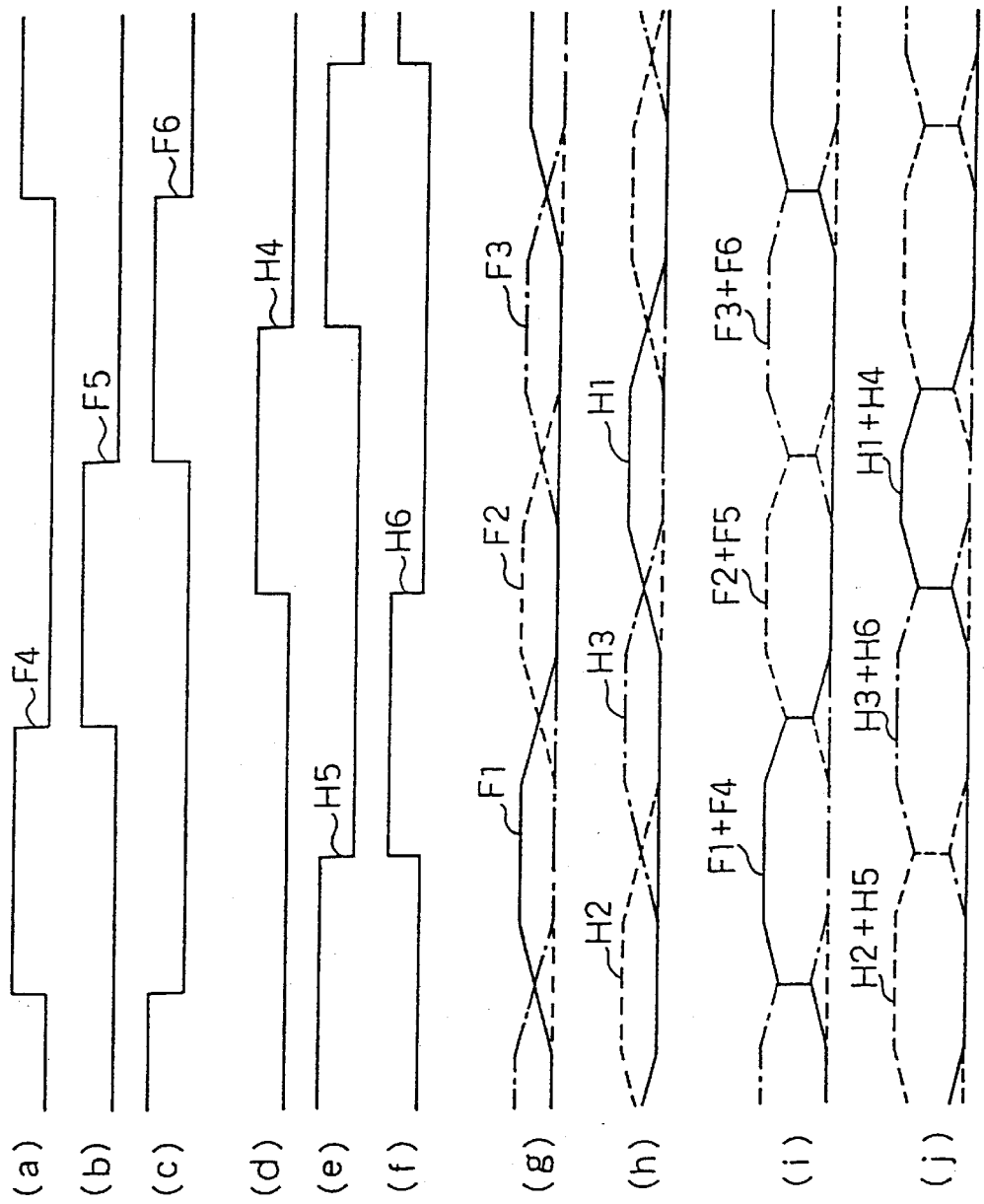
FIG. 17 is a waveform chart showing the first auxiliary current signals, the second auxiliary current signals, the first amplified current signals, the second amplified current signals, the first mixed current signals, and the second mixed current signals.

FIG. 15 illustrates a configuration of the auxiliary altering signal producing part 510 as an example. The comparator circuits 541, 542, and 543 of the auxiliary altering signal producing part 510 compare two-phase signals of the three-phase position signals Ja1, Jb1, and Jc1 and outputs three-phase digital signals Jd, Je, and Jf, respectively according to the comparison result. FIGS. 16(a) to (c) illustrate the relationship among the waveforms of the digital signals Jd, Je, and Jf. These digital signals Jd, Je, and Jf are compounded logically in NOT circuits 551, 552, and 553, and AND circuits 561 to 567, thereby generating auxiliary altering signals J4 to J9. FIGS. 16(d) to (i) illustrate the relationship among the waveforms of the auxiliary altering signals J4 to J9. Each of the digital signals Jd, Je, and Jf enters the "Hb" state in 180 electrical degrees or about 180 degrees and enters the "Lb" state in the rest 180 degrees. In addition, each of the digital signals Jd, Je, and Jf becomes a three-phase signal having a phase difference of 120 degrees from others. Each of the auxiliary altering signals J4, J5, and J6 enters the "Hb" state in 120 electrical degrees or about 120 degrees and enters the "Lb" state in the rest 240 degrees. Those digital signals J4, J5, and J6 are three-phase signals changing sequentially. Each of the auxiliary altering signals J7, J8, and J9 enters the "Hb" state in 120 electrical degrees or about 120 degrees and enters the "Lb" state in the rest 240 degrees. Those digital signals J7, J8, and J9 are three-phase signals changing sequentially.

Figure 14:
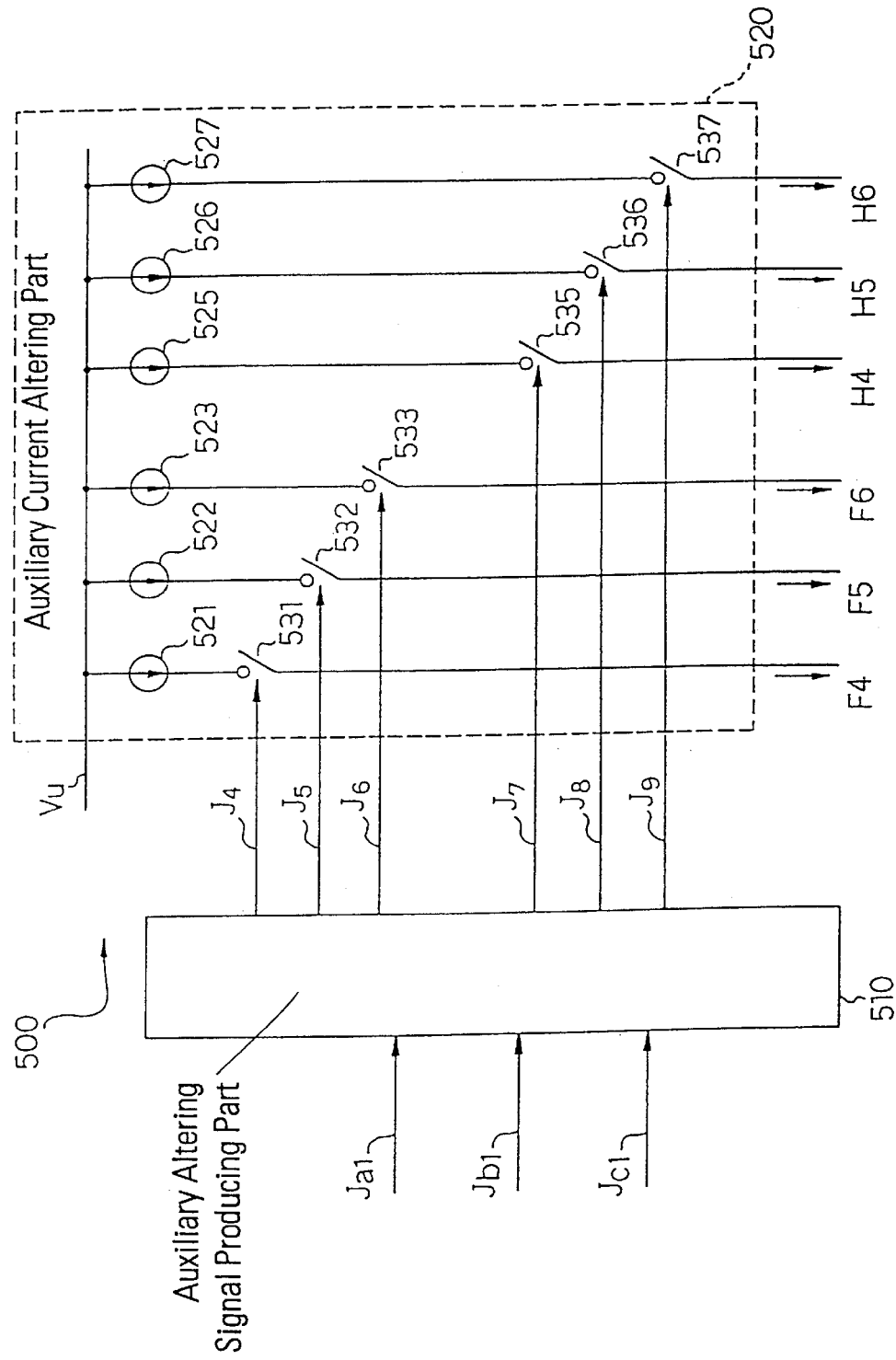
FIG. 14 is a circuit diagram of an auxiliary supply part 500 in the embodiment 2.

In FIG. 14, the auxiliary altering signals J4 to J9 from the auxiliary altering signal producing part 510 are entered to an auxiliary current altering part 520. The auxiliary current altering part 520 includes three first current sources 521, 522, and 523, three second current sources 525, 526, and 527, three first switch circuits 531, 532, and 533, and three second switch circuits 535, 536, and 537. The first current sources 521, 522, and 523, as well as the second current sources 525, 526, and 527 are connected to a terminal side of the high level potential Vu of the high-voltage outputting part 51.

The first switch circuits 531, 532, and 533 are switched on corresponding to the "Hb" states of the auxiliary altering signals J4, J5, and J6 of the auxiliary altering signal producing part 510, respectively. Consequently, the current signals of the first current sources 521, 522, and 523 are output according to the auxiliary altering signals J4, J5, and J6, thereby supplying the three-phase first auxiliary current signals F4, F5, and F6. The second switch circuits 535, 536, and 537 are switched on corresponding to the "Hb" states of the auxiliary altering signals J7, J8, and J9 of the auxiliary altering signal producing part 510, respectively. Consequently, the current signals of the second current sources 525, 526, and 527 are output according to the auxiliary altering signals J7, J8, and J9, thereby supplying the three-phase second auxiliary current signals H4, H5, and H6. FIGS. 17(a) to (c) illustrate waveforms of the first auxiliary current signals F4, F5, and F6 and FIGS. 17(d) to (f) illustrate waveforms of the second auxiliary current signals H4, H5, and H6.

The first mixing part 81 shown in FIG. 13 is composed of a node simply. The first mixing part 81 adds up and mixes the first amplified current signal F1 of the first current amplifying part 41 and the first auxiliary current signal F4 so as to output a first mixed current signal F1+F4. The first mixing part 82 is composed of a node simply. The first mixing part 82 adds up and mixes the first amplified current signal F2 of the first current amplifying part 42 and the first auxiliary current signal F5 so as to output a first mixed current signal F2+F5. The first mixing part 83 is composed of a node simply. The first mixing part 83 adds up and mixes the first amplified current signal F3 of the first current amplifying part 43 and the first auxiliary current signal F6 so as to output a first mixed current signal F3+F6.

The second mixing part 85 is composed of a node simply. The second mixing part 85 adds up and mixes the second amplified current signal H1 of the second current amplifying part 45 and the second auxiliary current signal H4 so as to output a second mixed current signal H1+H4. The second mixing part 86 is composed of a node simply. The second mixing part 86 adds up and mixes the second amplified current signal H2 of the second current amplifying part 46 and the second auxiliary current signal H5 so as to output a second mixed current signal H2+H5. The second mixing part 87 is composed of a node simply. The second mixing part 87 adds up and mixes the second amplified current signal H3 of the second current amplifying part 47 and the second auxiliary current signal H6 so as to output a second mixed current signal H3+H6.

FIG. 17(g) illustrates waveforms of the first amplified current signals F1, F2, and F3, and FIG. 17(h) illustrates waveforms of the second amplified current signals H1, H2, and H3. FIG. 17(i) illustrates waveforms of the first mixed current signals F1+F4, F2+F5, and F3+F6, and FIG. 17(j) illustrates waveforms of the second mixed current signals H1+H4, H2+H5, and H3+H6.

The first mixed current signals F1+F4, F2+F5, and F3+F6 are three-phase first current signals, each varying smoothly during about 30-degree active electrical angle in a rising slope from zero and in a falling slope to zero, respectively. In the same way, the second mixed current signals H1+H4, H2+H5, and H3+H6 are three-phase second current signals, each varying smoothly during about 30-degree active electrical angle in a rising slope from zero and in a falling slope to zero, respectively.

The first mixed current signals F1+F4, F2+F5, and F3+F6 are supplied to the conduction control terminal sides of the first power amplifying parts 11, 12, and 13, respectively, thereby controlling the conduction periods of the first NMOS-FET power transistors 61, 62, and 63. The first NMOS-FET power transistors 61, 62, and 63 alter smoothly the current paths to the windings according to the first mixed current signals, while performing high frequency on/off switching under the switching control of the switching control part 22 and the current detecting part 21. In the same way, the second mixed current signals H1+H4, H2+H5, and H3+H6 are supplied to the conduction control terminal sides of the second power amplifying parts 15, 16, and 17, respectively, thereby controlling the conduction periods of the second NMOS-FET power transistors 65, 66, and 67. The second NMOS-FET power transistors 65, 66, and 67 alter smoothly the current paths to the windings corresponding to the second mixed current signals.

The remainder of the configuration and operation is similar as that in the above embodiment 1, so detailed explanation thereof will be omitted here.

In this embodiment, each of the three-phase first mixed current signals (as each of the first three-phase current signals) supplied to the conduction control terminal side of each of the first power amplifying parts is varied smoothly at least in rising and falling slopes, thereby altering smoothly the three-phase drive current signals to the windings. At this time, a first auxiliary current signal is included in a first mixed current signal, thereby reducing the on-resistance of a first NMOS-FET power transistor which dominantly supplies the drive current. As a result, the power loss of the first NMOS-FET power transistor is reduced. In addition, the conduction control terminal side of each of the first power amplifying parts is turned on/off by each of control pulse signals Y1, Y2, and Y3 of the switching control part, thereby causing each of the first NMOS-FET power transistors to perform high frequency switching. Therefore, the first NMOS-FET power transistor performs switching surely with the first auxiliary current signal, thereby reducing the power less remarkably.

In the same way, each of the three-phase second mixed current signals (as each of the second three-phase current signals) supplied to the conduction control terminal side of each of the second power amplifying parts is varied smoothly at least in rising and falling slopes, respectively, thereby altering smoothly the three-phase drive current signals to the windings. At this time, a second auxiliary current signals is included in a second mixed current signal, thereby reducing the on-resistance of a second NMOS-FET power transistor which dominantly supplies the drive current. As a result, the power loss of the second NMOS-FET power transistor is reduced greatly.

Consequently, the power loss of each of the first and second NMOS-FET power transistors can be reduced significantly, thereby improving the power efficiency of the motor significantly. In addition, ripples of the drive current signals to the windings can be reduced, thereby reducing both vibration and acoustic noise of the motor significantly.

In the case of the above embodiment, the active angle of each of the first mixed current signals is set to 180 degrees or about 180 degrees, the active angle of each of the first auxiliary current signals is set to 120 degrees or about 120 degrees, the active angle of the rising slope varying smoothly is set to 30 degrees or about 30 degrees, and the active angle of the falling slope varying smoothly is set to 30 degrees or about 30 degrees. Consequently, the current paths to the windings can be altered smoothly, as well as the power loss caused by the on-resistance of each of the first NMOS-FET power transistors is reduced significantly. In addition, the three-phase first auxiliary current signals F4, F5, and F6 are supplied sequentially so that at least one of the first auxiliary signals is supplied. It is also prevented that two or more first auxiliary current signals are supplied in the same period.

In the same way, the active angle of each of the second mixed current signals is set to 180 degrees or about 180 degrees, the active angle of each of the second auxiliary current signals is set to 120 degrees or about 120 degrees, the active angle of the rising slope varying smoothly is set to 30 degrees or about 30 degrees, and the active angle of the falling slope varying smoothly is set to 30 degrees or about 30 degrees. Consequently, the current paths to the windings can be altered smoothly, as well as the power loss caused by the on-resistance of each of the second NMOS-FET power transistors is reduced significantly. In addition, the three-phase second auxiliary current signals H4, H5, and H6 are supplied sequentially so that at least one of the second auxiliary signals is supplied. It is also prevented that two or more second auxiliary current signals are supplied in the same period.

On the other hand, each of these active angles can be changed as needed. The active angle of each of the first and second mixed current signals may be, for example, 150 degrees. The active electrical angle of each of the first and second auxiliary current signals may also be varied from 120 degrees, although the performance is degraded in such a case.

This embodiment 2 can thus obtain similar advantages as those of the above embodiment 1.

<<Embodiment 3>>

Figure 18:
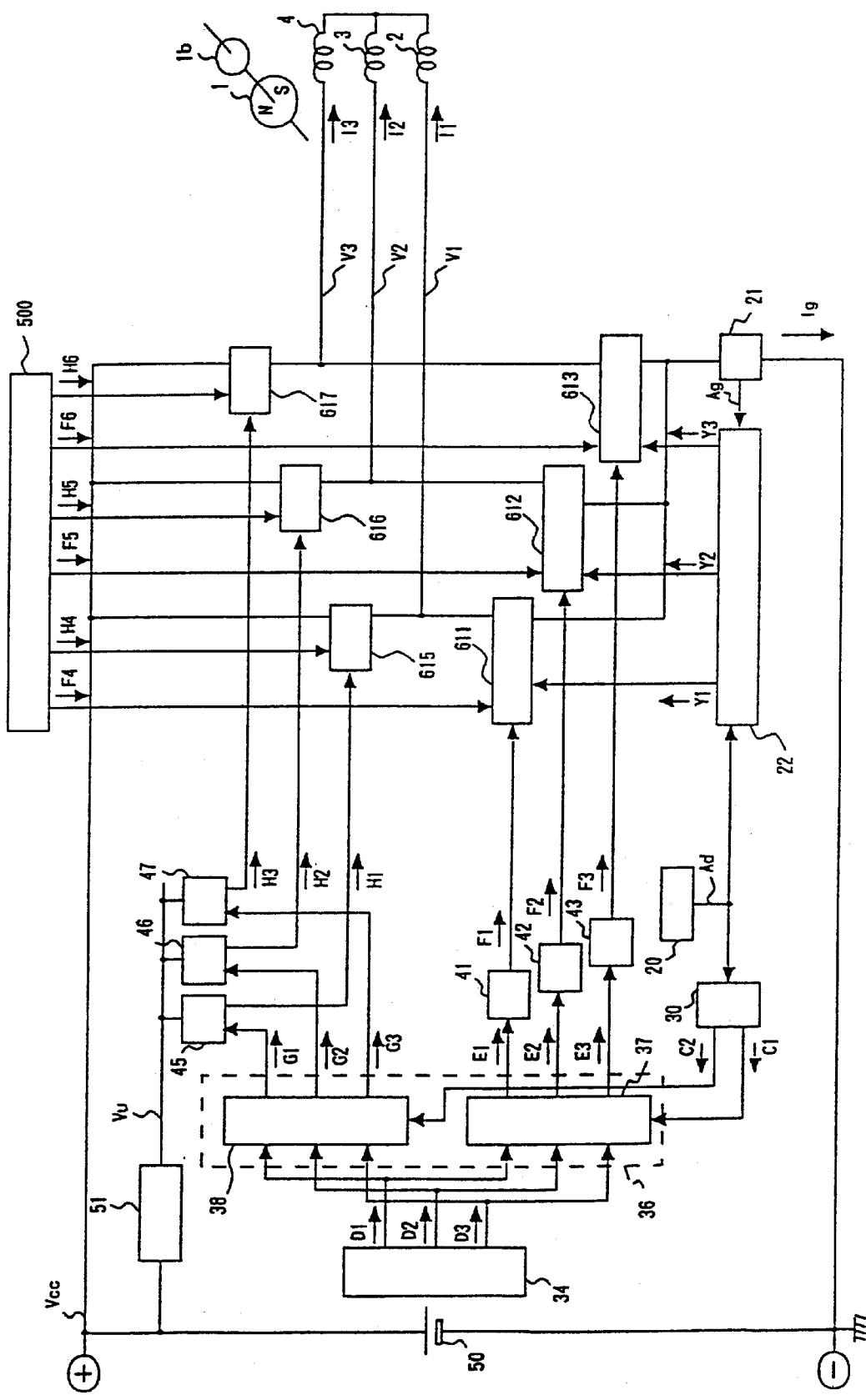
FIG. 18 is a diagram showing the configuration of the embodiment 3 of the present invention.
Figure 19:
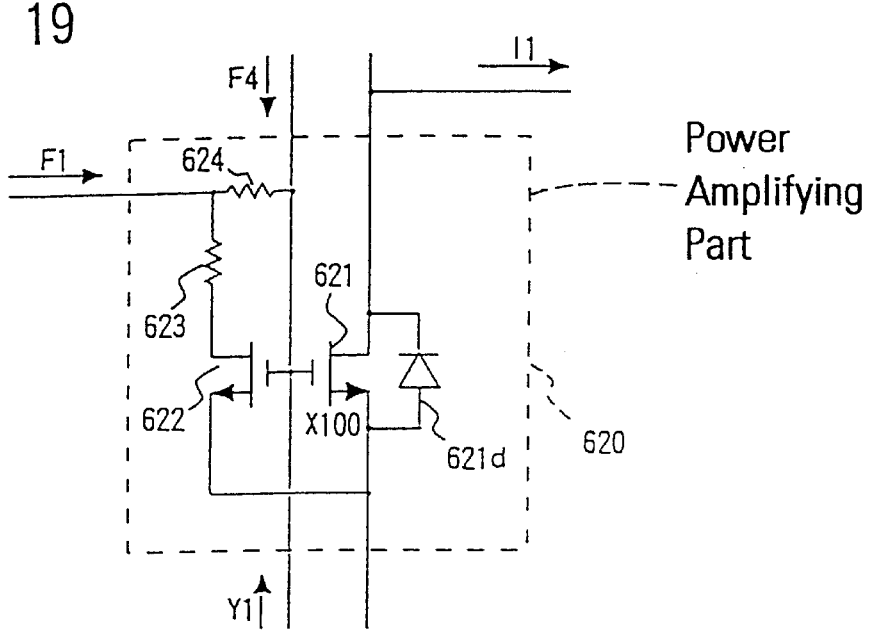
FIG. 19 is a circuit diagram of a power amplifying part in the embodiment 3.

FIGS. 18 and 19 illustrate the motor in the embodiment 3 of the present invention. FIG. 18 shows a configuration of the motor. In the embodiment 3, the auxiliary supply part 500 supplies the auxiliary current signals to the conduction control terminal sides of the power amplifying parts. In the other configuration, components similar to the foregoing embodiments 2 and 3 are designated by the same numerals, and detailed explanation thereof is omitted.

In FIG. 18, the first power amplifying part 611 receives the first amplified current signal F1 from the first current amplifying part 41 via the first terminal of its conduction control terminal side, the first auxiliary current signal F4 from the auxiliary supply part 500 via the second terminal of its conduction control terminal side, and the control pulse signal Y1 from the switching control part 22 via the third terminal of its conduction control terminal side, respectively. In the same way, the first power amplifying part 612 receives the first amplified current signal F2 from the first current amplifying part 42 via the first terminal of its conduction control terminal side, the first auxiliary current signal F5 from the auxiliary supply part 500 via the second terminal of its conduction control terminal side, and the control pulse signal Y2 from the switching control part 22 via the third terminal of its conduction control terminal side, respectively. In the same way, the first power amplifying part 613 receives the first amplified current signal F3 from the first current amplifying part 43 via the first terminal of its conduction control terminal side, the first auxiliary current signal F6 from the auxiliary supply part 500 via the second terminal of its conduction control terminal side, and the control pulse signal Y3 from the switching control part 22 via the third terminal of its conduction control terminal side, respectively.

On the other hand, the second power amplifying part 615 receives the second amplified current signal H1 from the second current amplifying part 45 via the first terminal of its conduction control terminal side and the second auxiliary current signal H4 from the auxiliary supply part 500 via the second terminal of its conduction control terminal side. In the same way, the second power amplifying part 616 receives the second amplified current signal H2 from the second current amplifying part 46 via the first terminal of its conduction control terminal side and the second auxiliary current signal H5 from the auxiliary supply part 500 via the second terminal of its conduction control terminal side. In the same way, the second power amplifying part 617 receives the second amplified current signal H3 from the second current amplifying part 47 via the first terminal of its conduction control terminal side and the second auxiliary current signal H6 from the auxiliary supply part 500 via the second terminal of its conduction control terminal side.

FIG. 19 illustrates the power amplifying part 620 which is equivalent to the configuration of each of the first and second power amplifying parts 611, 612, 613, 615, 616, and 617. In this embodiment, the power amplifying part 620 is used as the first power amplifying part 611. The power amplifying part 620 includes an FET power current-mirror circuit consisting of an NMOS-FET power transistor 621, a power diode 621d, an NMOS-FET transistor 622, and resistors 623 and 624. The current input terminal side of the power diode 621d is connected to the current output terminal side of the NMOS-FET power transistor 621 and the current output terminal side thereof is connected to the current input terminal side of the NMOS-FET power transistor 621.

A resistor 623 is connected between the first terminal of the conduction control terminal side of the power amplifying part 620 and one terminal of the current path terminal pair of the NMOS-FET transistor 622. A resistor 624 is connected between the first and second terminals of the conduction control terminal side thereof. The third terminal of the conduction control terminal side thereof is connected to the control terminal side of the NMOS-FET power transistor 621. Consequently, the FET power current-mirror circuit of the power amplifying part 620 has a predetermined current amplifying rate while the first amplified current signal F1 supplied to the first terminal of the conduction control terminal side is small. When the value of the first amplified current signal F1 is increased, the current amplifying rate is increased sharply. In addition, the first auxiliary current signal F4 supplied to the second terminal of the conduction control terminal side is used to reduce the on-resistance of the NMOS-FET power transistor 621. In addition, the NMOS-FET power transistor 621 and the FET power current-mirror circuit of the power amplifying part 620 perform high frequency on/off switching by the control pulse signal Y1 supplied to the third terminal of the conduction control terminal side.

The NMOS-FET power transistor 621 is configured, for example, by an FET transistor with double diffused N channel MOS structure and a parasitic diode device of the NMOS-FET power transistor 621 is used as a power diode 621d. The resistor 623 or/and 624 of the power amplifying part 620 may be omissible with no operation problem. The first amplified current signal F1 and the first auxiliary current signal F4 are compounded in the power amplifying part 620 and the compounded signal is supplied to the NMOS-FET power transistor 621 and the power current-mirror circuit.

The first power amplifying part 612 or 613 has the same configuration as shown in FIG. 19. The second power amplifying part 615, 616, or 617 has the same configuration except avoiding connection to the third terminal of the conduction control terminal side.

The remainder of the configuration and operation is similar as that in the above embodiment 2 or 1. Thus, detailed explanation thereof will be omitted here.

In this embodiment, the three-phase first amplified current signal (as the first three-phase current signal) to be supplied to the first terminal of the conduction control terminal side of each of the first power amplifying parts is varied smoothly at least in rising and falling slopes, thereby altering smoothly the three-phase drive current signals to the windings. In addition, a first auxiliary current signal is supplied to the second terminal of the conduction control terminal side of each of the first power amplifying parts, thereby reducing the on-resistance of each of the first NMOS-FET power transistors which dominantly supplies the largest drive current. In addition, a control pulse signal of the switching control part is supplied to the third terminal of the conduction control terminal side of each of the first power amplifying parts so that each of the first NMOS-FET power transistors performs high frequency on/off switching.

In the same way, the three-phase second amplified current signal (as the second three-phase current signal) to be supplied to the second terminal of the conduction control terminal side of each of the second power amplifying parts is varied smoothly at least in rising and falling slopes, thereby altering smoothly the three-phase drive current signals to the windings. In addition, a second auxiliary current signal is supplied to the second terminal of the conduction control terminal side of each of the second power amplifying parts, thereby reducing the on-resistance of each of the second NMOS-FET power transistors which dominantly supplies the largest drive current.

This embodiment can thus obtain similar advantages as those of the above embodiments.

Figure 20:
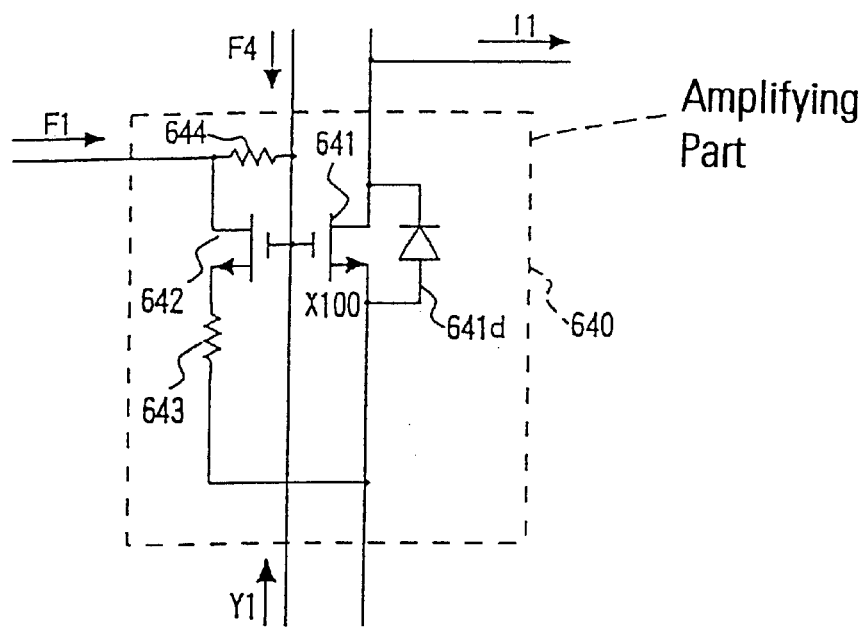
FIG. 20 is a circuit diagram showing another configuration of the power amplifying part in the embodiment of the present invention.

In this embodiment, the first power amplifying parts 611, 612, and 613, and the second power amplifying parts 615, 616, and 617 are not limited only to the power amplifying part 620 shown in FIG. 19. They can be modified freely. FIG. 20 illustrates another configuration of amplifying part 640 usable as each of the first power amplifying parts 611, 612, and 613, and the second power amplifying parts 615, 616, and 617. In this embodiment, the power amplifying part 640 includes an FET power current-mirror circuit consisting of an NMOS-FET power transistor 641, a power diode 641d, an NMOS-FET transistor 642, and resistors 643 and 644. The current input terminal side of the power diode 641d is connected to the current output terminal side of the NMOS-FET power transistor 641 and the current output terminal side thereof is connected to the current input terminal side of the NMOS-FET power transistor 641.

The first terminal of the conduction control terminal side of the power amplifying part 640 is connected to one terminal of the current path terminal pair of the NMOS-FET transistor 642, a resistor 643 is connected between the other terminal of the current path terminal pair of the NMOS-FET transistor 642 and one terminal of the current path terminal pair of the NMOS-FET power transistor 641, and a resistor 644 is connected between the first and second terminals of the conduction control terminal side thereof. The third terminal of the conduction control terminal side thereof is connected to the control terminal side of the NMOS-FET power transistor 641. Consequently, when the power amplifying part 640 is used as the first power amplifying part 621, the FET power current-mirror circuit of the power amplifying part 640 can greatly amplify an input current such as the first amplified current signal F1 or the first auxiliary current signal F4. In addition, the first auxiliary current signal F4 to the second terminal of the conduction control terminal side is used to reduce the on-resistance of the NMOS-FET power transistor 641. In addition, the NMOS-FET power transistor 641 and the FET power current-mirror circuit of the power amplifying part 640 perform high frequency on/off switching by the control pulse signal Y1 supplied to the third terminal of the conduction control terminal side. The NMOS-FET power transistor 641 is configured, for example, by an FET transistor with double diffused N channel MOS structure, and a parasitic diode device of the NMOS-FET power transistor 641 is used as the power diode 641d. The resistor 643 or/and 644 of the power amplifying part 640 may be omissible with no operation problem.

<<Embodiment 4>>

Figure 21:
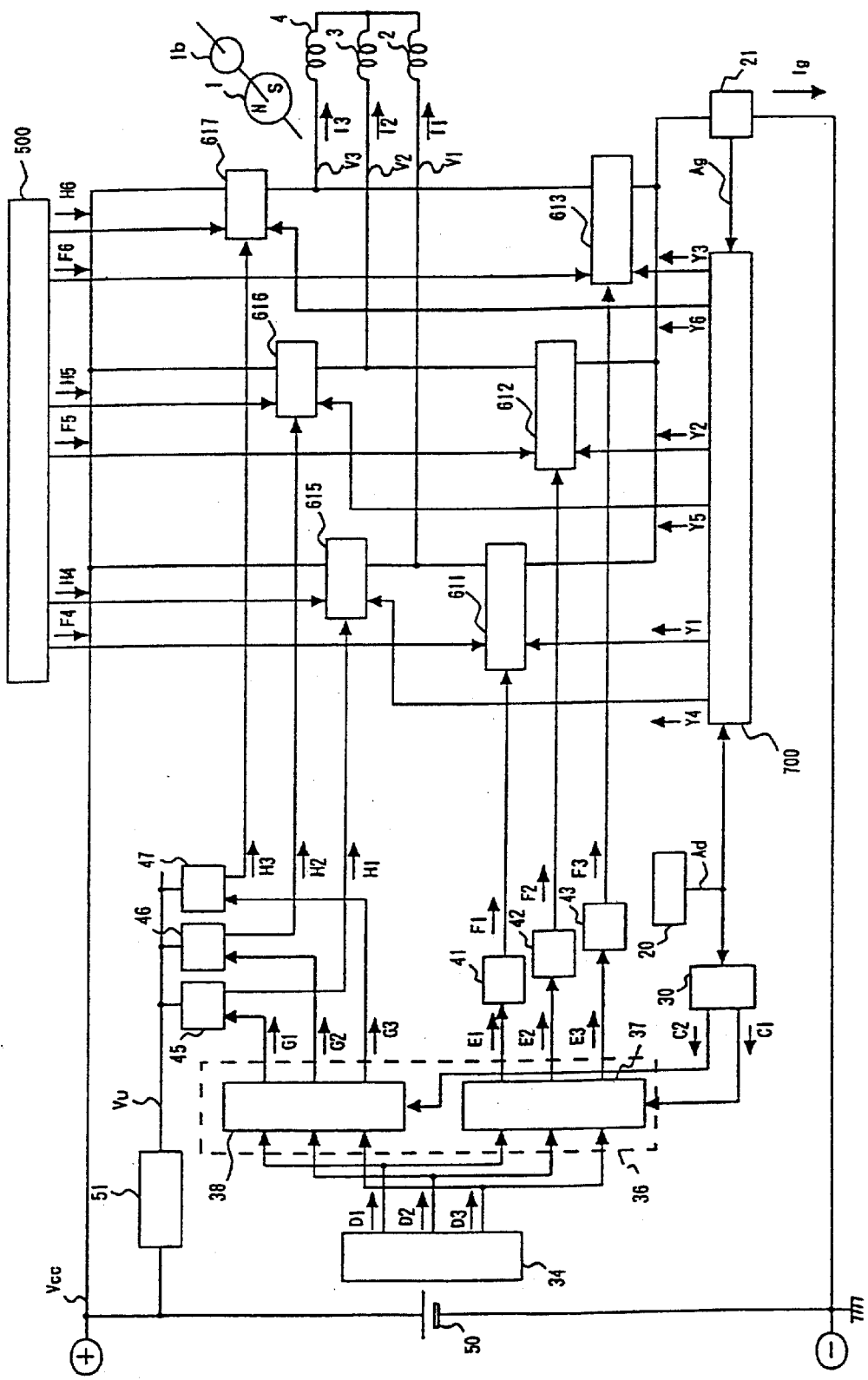
FIG. 21 is a diagram showing the configuration of the embodiment 4 of the present invention.
Figure 22:
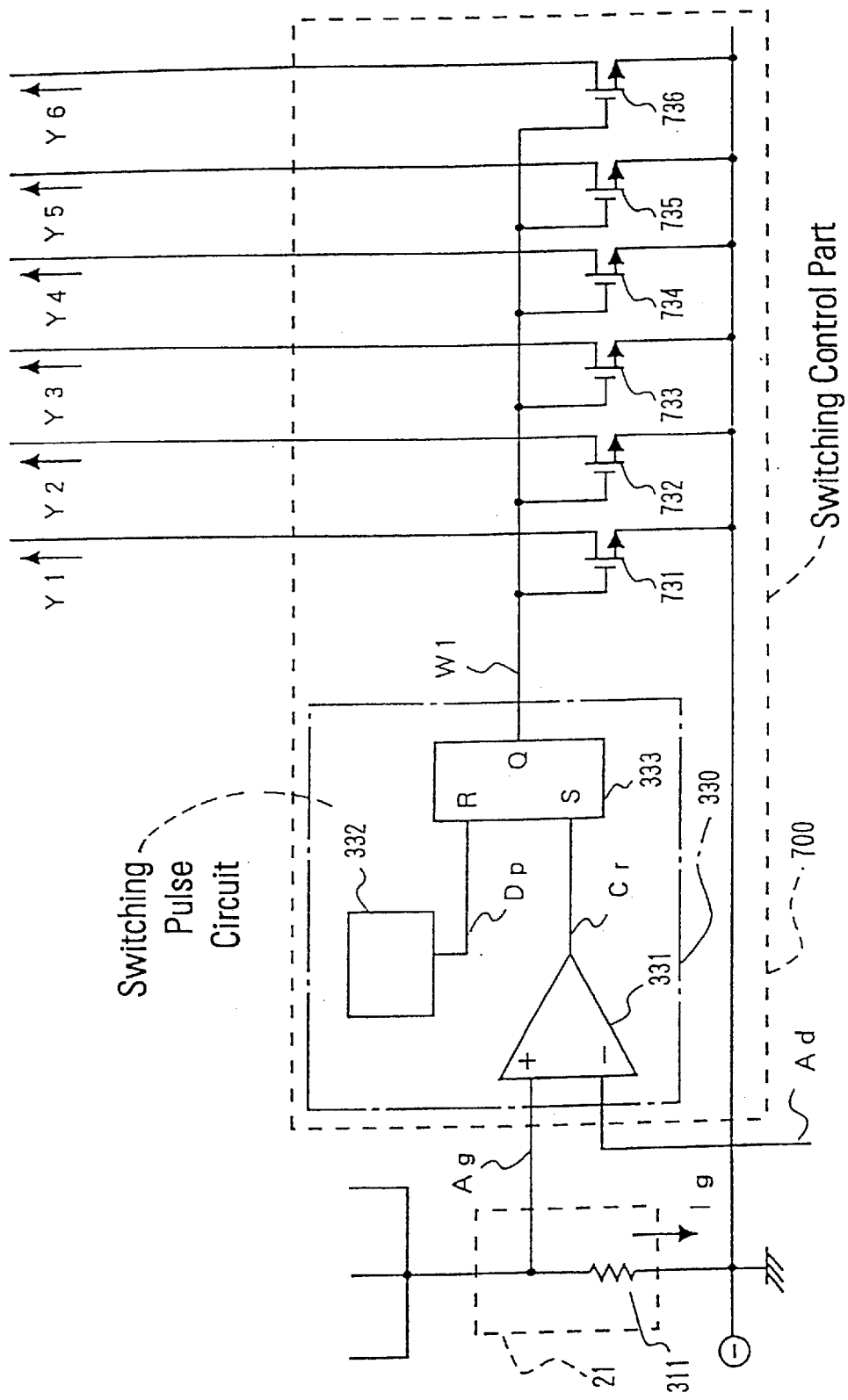
FIG. 22 is a circuit diagram of a switching control part 700 in the embodiment 4.

FIGS. 21 and 22 illustrate the motor in the embodiment 4 of the present invention. FIG. 21 shows a configuration of the motor. In the embodiment 4, switching control part 700 supplies control pulse signals Y1 to Y6. The switching control part 700 can cause the first and second NMOS-FET power transistors of the first and second power amplifying parts to perform high frequency on/off switching. In the other configuration, components similar to the foregoing embodiments 1, 2, and 3 are designated by the same numerals, and detailed explanation thereof is omitted.

The switching control part 700 in FIG. 21 generates control pulse signals Y1, Y2, Y3, Y4, Y5, and Y6 according to the result of comparing the command signal Ad with the current detected signal Ag from the current detecting part 21 so as to cause the first power amplifying parts 611, 612, and 613, and the second power amplifying parts 615, 616, and 617 to perform high frequency on/off switching. The configuration of each of the first power amplifying parts 611, 612, and 613, and the second power amplifying parts 615, 616, and 617 is the same as that of the power amplifying part 620 illustrated in FIG. 19 or the power amplifying part 640 illustrated in FIG. 20. Thus, detailed explanation for them will be omitted here.

FIG. 22 shows a configuration of the switching control part 700. The comparator circuit 331 of the switching pulse circuit 330 in the switching control part 700 obtains a compared output signal Cr by comparing the command signal Ad with the current detected signal Ag. The trigger generating circuit 332 outputs a high frequency trigger pulse signal Dp of about 100 kHz. The state holding circuit 333 changes the state of the switching control signal W1 to "Lb" (low potential state) at a rising edge of the trigger pulse signal Dp, and changes the state of the switching control signal W1 to "Hb" (high potential state) at a rising edge of the compared output signal Cr. When the switching control signal W1 is turned to the "Lb" state, the control transistors 741, 742, 743, 744, 745, and 746 are turned off concurrently and the control pulse signals Y1, Y2, Y3, Y4, Y5, and Y6 are turned off (non-conducted state). At this time, the first power amplifying parts 611, 612, and 613 amplify the first amplified current signals F1, F2, and F3 so as to form current paths for supplying negative current parts of the drive current signals I1, I2, and I3 to the windings 2, 3, and 4. The second power amplifying parts 615, 616, and 617 amplify the second amplified current signals H1, H2, and H3 so as to form current paths for supplying positive current parts of the drive current signals I1, I2, and I3 to the windings 2, 3, and 4. When the switching control signal W1 is turned to the "Hb" state, the control transistors 741, 742, 743, 744, 745, and 746 are turned on concurrently and the control pulse signals Y1, Y2, Y3, Y4, Y5, and Y6 are turned on (conducted state). At this time, not only the first NMOS-FET power transistors of the first power amplifying parts 611, 612, and 613 but also the second NMOS-FET power transistors of the second power amplifying parts 615, 616, and 617 are all turned off simultaneously. The first power amplifying parts 611, 612, and 613 and the second power amplifying parts 615, 616, and 617 are controlled so as to be turned on/off at a high frequency according to a single switching control signal W1 so that the drive current signals to the windings are controlled corresponding to the command signal Ad. Hereunder, this operation will be described.

When the switching control signal W1 of the state holding circuit 333 is changed to "Lb" at a rising edge of the trigger pulse signal Dp, one or two of the first power amplifying parts are conducted according to the first amplified current signals F1, F2, and F3, and one or two of the second power amplifying parts are also conducted at this time according to the second amplified current signals H1, H2, and H3. For example, if only the first amplified current signal F1 and the second amplified current signal H2 are selected, the first NMOS-FET power transistor of the first power amplifying part 611 is conducted according to the first amplified current signal F1, thereby forming a current path for supplying the negative current part of the drive current signal I1 to the winding 2. And, according to the second amplified current signal H2, the second NMOS-FET power transistor of the second power amplifying part 616 is conducted, thereby forming a current path for supplying the positive current part of the drive current signal I2 to the winding 3. The first NMOS-FET power transistor of the first power amplifying part 611 and the second NMOS-FET power transistor of the second power amplifying part 616 are turned on fully at this time to supply the drive current signals enough to the windings 2 and 3. The values of the drive current signals I1 and I2 are increased gradually due to the inductances of the windings. Consequently, the conducted current signal Ig from the DC power source part 50 is increased so as to increase the composed supply current to the windings. When the value of the current detected signal Ag of the current detecting part 21 exceeds the value of the command signal Ad, the compared output signal Cr of the comparing circuit 331 generates a rising edge, thereby changing the switching control signal W1 of the state holding circuit 333 to "Hb". As a result, the control pulse signals Y1 to Y6 are turned on, thereby causing the first NMOS-FET power transistors of the first power amplifying parts 611, 612, and 613 and the second NMOS-FET power transistors of the second power amplifying parts 615, 616, and 617 to be turned off simultaneously. At this time, the inductance of the winding 2 increases the drive voltage V1 pulsively, thereby forming a current path passing through the second power diode of the second power amplifying part 615. As a result, the negative current part of the drive current signal I1 to the winding 2 flows continuously. And the inductance of the winding 3 increases the drive voltage V2 pulsively, thereby forming a current path passing through the first power diode of the first power amplifying part 612. As a result, the positive current part of the drive current signal I2 to the winding 3 flows continuously. Therefore, the drive current signals I1 and I2 to the windings 2 and 3 are gradually decreased in magnitude due to the inductances of the windings. And soon, the next rising edge of the trigger pulse signal Dp appears, thereby enabling the switching operation described above to be repeated. So the peak value of the conducted current signal Ig of the DC power source part 50 is controlled corresponding to the command signal Ad, thereby controlling the drive current signals to the windings 2, 3, and 4. The first auxiliary current signal F4 to the conduction control terminal side of the first power amplifying part 611 can reduce the on-resistance of the first NMOS-FET power transistor of the first power amplifying part 611. The second auxiliary current signal H5 to the conduction control terminal side of the second power amplifying part 616 can reduce the on-resistance of the second NMOS-FET power transistor of the second power amplifying part 616.

Furthermore, since the first amplified current signals are altered smoothly as the movable member 1 is moved, the current paths by the first power amplifying parts 611, 612, and 613 can be altered smoothly. In this case, the first NMOS-FET power transistors of the first power amplifying parts 611, 612, and 613 are caused to perform the high frequency switching operations, as described above. And, since the second amplified current signals are altered smoothly as the movable member 1 is moved, the current paths by the second NMOS-FET power transistors of the second power amplifying parts 615, 616, and 617 can be altered smoothly in this case, the second NMOS-FET power transistors of the second power amplifying parts 615, 616, and 617 are caused to perform the high frequency switching operations, as described above. Consequently, the drive current signals are altered smoothly so as to reduce ripples in the current signals, thereby reducing the vibration and the acoustic noise of the motor significantly. Since the first amplified current signals F1, F2, and F3 and the second amplified current signals H1, H2, and H3 are set to minimum necessary values corresponding to the command signal Ad, the altering operation of the current paths to the windings can be achieved smoothly even when the command signal Ad is changed. And also, the power loss caused by the first and second amplified current signals can be reduced. Since the first and second power amplifying parts include the first and second power FET power current-mirror circuits, respectively, it is possible to reduce the variation of the current amplifying rate and accordingly to obtain the above effects stably.

The remainder of the configuration and operation is similar as that in the embodiment 1 or 2 or 3, so detailed explanation thereof will be omitted here.

In this embodiment, the first and second NMOS-FET power transistors of the first and second power amplifying parts perform high frequency switching, and the power loss of these power transistors is reduced significantly. At this time, since the first and second power amplifying parts are turned on/off according to the single switching control signal W1, the configuration of the motor for controlling high frequency switching operations can be simplified greatly.

This embodiment can thus obtain similar advantages as those of the above embodiments.

<<Embodiment 5>>

Figure 23:
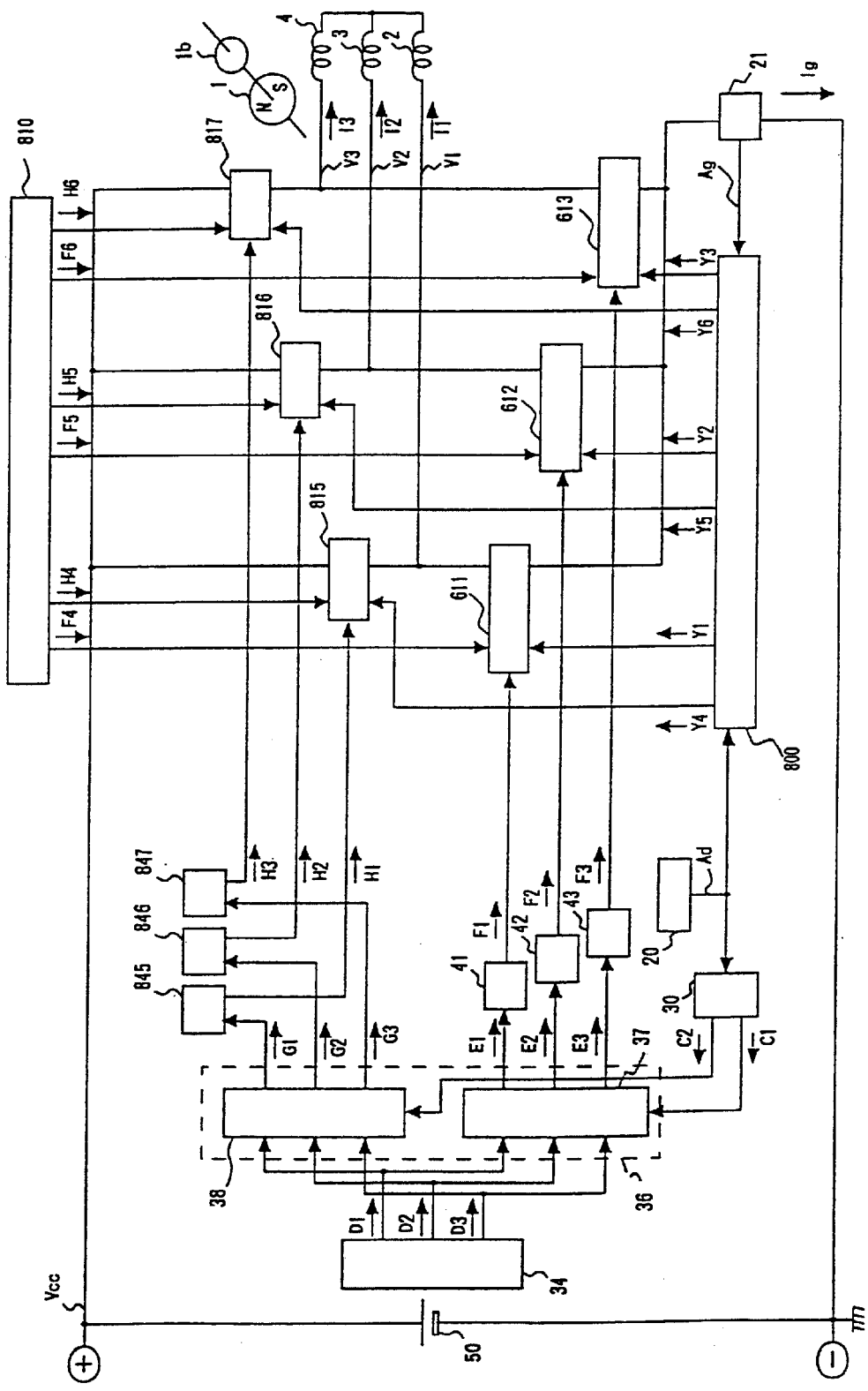
FIG. 23 is a diagram showing the configuration of the embodiment 5 of the present invention.

FIGS. 23 to 27 illustrate the motor in the embodiment 5 of the present invention. FIG. 23 shows a configuration of the motor. In the embodiment 5, each of the second power amplifying parts 815, 816, and 817 has a second PMOS-FET power transistor. In addition, the switching control part 800, the auxiliary supply part 810, the second current amplifying parts 845, 846, and 847 are changed. In the other configuration, components similar to the foregoing embodiment 1, 2, 3, and 4 are designated by the same numerals, and detailed explanation thereof is omitted.

In FIG. 23, the first power amplifying part 611 receives the first amplified current signal F1 from the first current amplifying part 41 via the first terminal of its conduction control terminal side, the first auxiliary current signal F4 from the auxiliary supply part 810 via the second terminal of its conduction control terminal side, and the control pulse signal Y1 from the switching control part 800 via the third terminal of its conduction control terminal side, respectively. In the same way, the first power amplifying part 612 receives the first amplified current signal F2 from the first current amplifying part 42 via the first terminal of its conduction control terminal side, the first auxiliary current signal F5 from the auxiliary supply part 810 via the second terminal of its conduction control terminal side, and the control pulse signal Y2 from the switching control part 800 via the third terminal of its conduction control terminal side, respectively. In the same way, the first power amplifying part 613 receives the first amplified current signal F3 from the first current amplifying part 43 via the first terminal of its conduction control terminal side, the first auxiliary current signal F6 from the auxiliary supply part 810 via the second terminal of its conduction control terminal side, and the control pulse signal Y3 from the switching control part 800 via the third terminal of its conduction control terminal side, respectively.

The power amplifying part 620 shown in FIG. 19 is used as each of the first power amplifying parts 611, 612, and 613 in this embodiment. The power amplifying part 620 in FIG. 19 shows the example of the first power amplifying part 611, as described above.

In FIG. 23, the second power amplifying part 815 receives the second amplified current signal H1 from the second current amplifying part 845 via the first terminal of its conduction control terminal side, the second auxiliary current signal H4 from the auxiliary supply part 810 via the second terminal of its conduction control terminal side, and the control pulse signal Y4 from the switching control part 800 via the third terminal of its conduction control terminal side, respectively. In the same way, the second power amplifying part 816 receives the second amplified current signal H2 from the second current amplifying part 846 via the first terminal of its conduction control terminal side, the second auxiliary current signal H5 from the auxiliary supply part 810 via the second terminal of its conduction control terminal side, and the control pulse signal Y5 from the switching control part 800 via the third terminal of its conduction control terminal side, respectively. In the same way, the second power amplifying part 817 receives the second amplified current signal H3 from the second current amplifying part 847 via the first terminal of its conduction control terminal side, the second auxiliary current signal H6 from the auxiliary supply part 810 via the second terminal of its conduction control terminal side, and the control pulse signal Y6 from the switching control part 800 via the third terminal of its conduction control terminal side, respectively.

Figure 27:
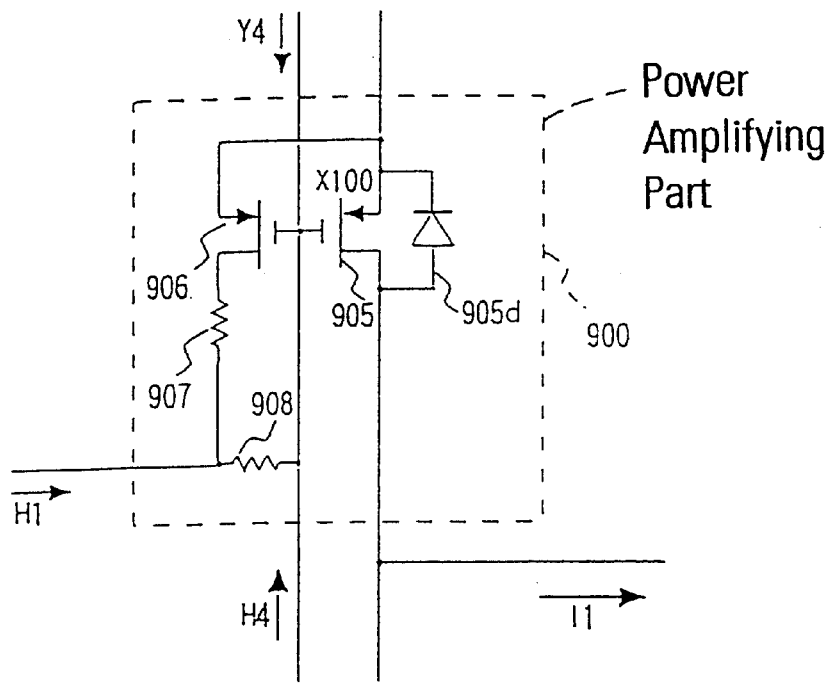
FIG. 27 is a circuit diagram of a second power amplifying part in the embodiment 5.

FIG. 27 illustrates a power amplifying part 900 equivalent to the configuration of each of the second power amplifying parts 815, 816, and 817. In this embodiment, the power amplifying part 900 is used as the second power amplifying part 815. The power amplifying part 900 includes an FET power current-mirror circuit consisting of an PMOS-FET power transistor 905, a power diode 905*d*, a PMOS-FET transistor 906, and resistors 907 and 908. The current input terminal side of the power diode 905*d* is connected to the current output terminal side of the PMOS-FET power transistor 905 and the current output terminal side thereof is connected to the current input terminal side of the PMOS-FET power transistor 905. A resistor 907 is connected between the first terminal of the conduction control side of the power amplifying part 900 and one terminal of the current path terminal pair of the PMOS-FET transistor 906 and a resistor 908 is connected between the first and second terminals of the conduction control terminal side thereof. The third terminal of the conduction control terminal side is connected to the control terminal side of the PMOS-FET power transistor 905. Consequently, the FET power current-mirror circuit of the power amplifying part 900 has a predetermined current amplifying rate while the value of the second amplified current signal H1 supplied to the first terminal of the conduction control terminal side is small. When the value of the second amplified current signal H1 is increased, the current amplifying rate is increased sharply. The second auxiliary current signal H4 supplied to the second terminal of the conduction control terminal side reduces the on-resistance of the PMOS-FET power transistor 905. The PMOS-FET power transistor 905 and the FET power current-mirror circuit of the power amplifying part 900 perform high frequency on/off switching in the case that the control pulse signal Y4 supplied to the third terminal of the conduction control terminal side is turned on/off at a high frequency. The PMOS-FET power transistor 905 is configured, for example, by an FET transistor with double diffused P channel MOS structure and a parasitic diode device of the PMOS-FET power transistor 905 is used as a power diode 905*d*. The resistors 907 or/and 908 of the power amplifying part 900 may be omissible with no operation problem.

The second current amplifying parts 845, 846, and 847 in FIG. 23 generate the second amplified current signals H1, H2, and H3 by amplifying the second distributed current signals G1, G2, and G3, respectively. The second amplified current signals H1, H2, and H3 are supplied to the first terminals of the conduction control terminal sides of the second power amplifying parts 815, 816, and 817, respectively.

Figure 26:
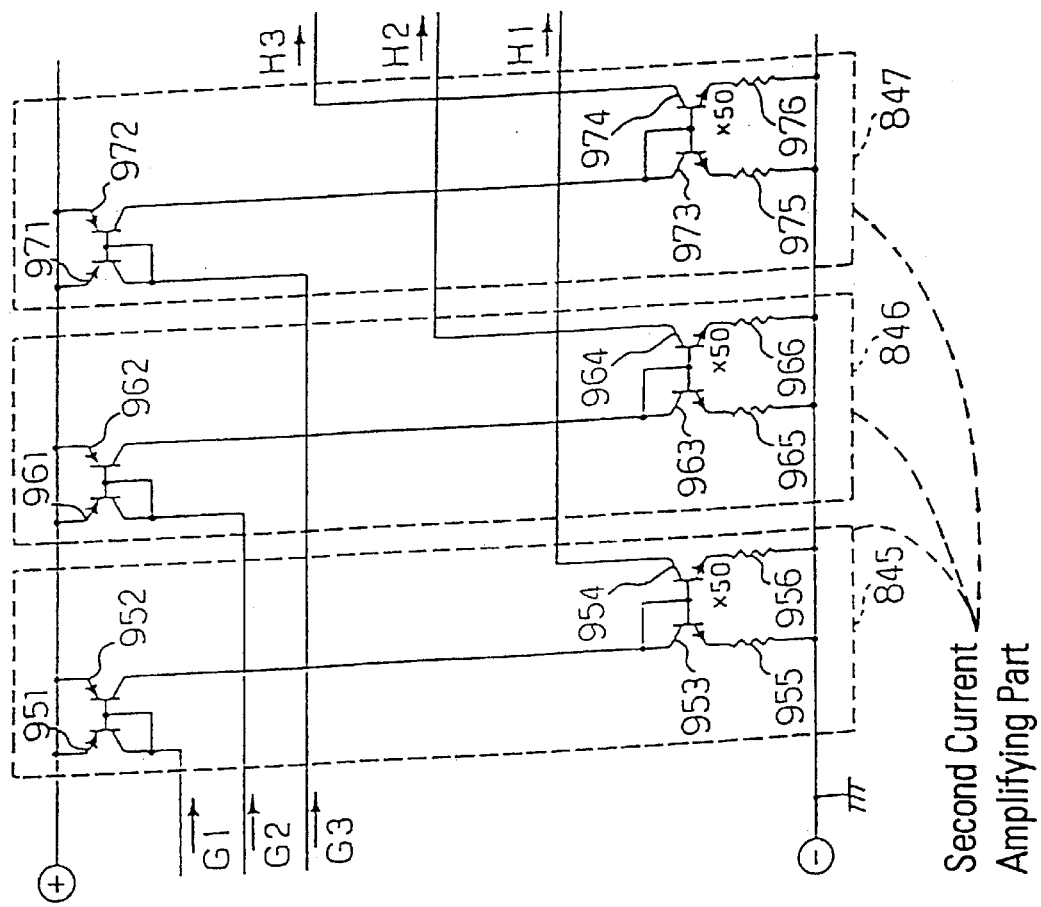
FIG. 26 is a circuit diagram of second current amplifying parts 845, 846, 847 in the embodiment 5.

FIG. 26 shows a configuration of the second current amplifying parts 845, 846, and 847. The second current amplifying part 845 is composed of a second amplifying part current-mirror circuit, which has first-step current-mirror circuit consisting of transistors 951 and 952 and the next-step current-mirror circuit consisting of transistors 953 and 954 and resistors 955 and 956. The second current amplifying part 845 amplifies the input current G1 at a predetermined current amplifying rate of 50 times. In the same way, the second current amplifying part 846 is composed of a second amplifying part current-mirror circuit consisting of transistors 961, 962, 963, and 964, and resistors 965 and 966. The second current amplifying part 846 amplifies the input current G2 at a predetermined current amplifying rate of 50 times. In the same way, the second current amplifying part 847 is composed of a second amplifying part current-mirror circuit consisting of transistors 971, 972, 973, and 974, and resistors 975 and 976. The second current amplifying part 847 amplifies the input current G3 at a predetermined current amplifying rate of 50 times. Consequently, the second current amplifying parts 845, 846, and 847 amplify the three-phase second distributed current signals G1, G2, and G3, respectively, thereby producing the three-phase second amplified current signals H1, H2, and H3.

The switching control part 800 in FIG. 23 causes the first power amplifying parts 611, 612, and 613 and/or the second power amplifying parts 815, 816, and 817 to perform high frequency on/off switching. FIG. 24 shows a configuration of the switching control part 800. The configuration of the switching pulse circuit 330 of the switching control part 800 is the same as the configuration of the circuit shown in FIG. 7. The switching pulse circuit 330 outputs the switching control signal W1.

When the setup switch circuit 840 is connected to the Ga side, the setup switch signal Sf is in the "Lb" state. Thus, the output of the AND circuit 830 enters the "Lb" state and the control transistors 835, 836, and 837 are remained off. Consequently, the control pulse signals Y4, Y5, and Y6 are also remained off. In addition, the control transistors 831, 832, and 833 are turned on/off according to the switching control signal W1. As a result, the first NMOS-FET power transistors of the first power amplifying parts 611, 612, and 613 performs high frequency on/off switching according to the control pulse signals Y1, Y2, and Y3. Since the control pulse signals Y4, Y5, and Y6 are off at this time, the second power amplifying parts 815, 816, and 817 is controlled according to the second amplified current signals H1, H2, and H3 of the second current amplifying parts 845, 846, and 847 (no high frequency switching is performed).

When the setup switch circuit 840 is connected to the Gb side, the setup switch signal Sf is in the "Hb" state. Thus, the control transistors 835, 836, and 837 are also turned on/off according to the switching control signal W1. Consequently, the control transistors 831, 832, 833, 835, 836, and 837 produce the control pulse signals Y1, Y2, Y3, Y4, Y5, and Y6, each of which are turned on/off according to the switching control signal W1. As a result, the first NMOS-FET power transistors of the first power amplifying parts 611, 612, and 613 perform high frequency on/off switching according to the control pulse signals Y1, Y2, and Y3 and the second PMOS-FET power transistors of the second power amplifying parts 815, 816, and 817 perform high frequency on/off switching according to the control pulse signals Y4, Y5, and Y6. The setup switch circuit 840 is fixed at either Ga side or Gb side, but the circuit 840 may be changed over as needed.

Figure 25:
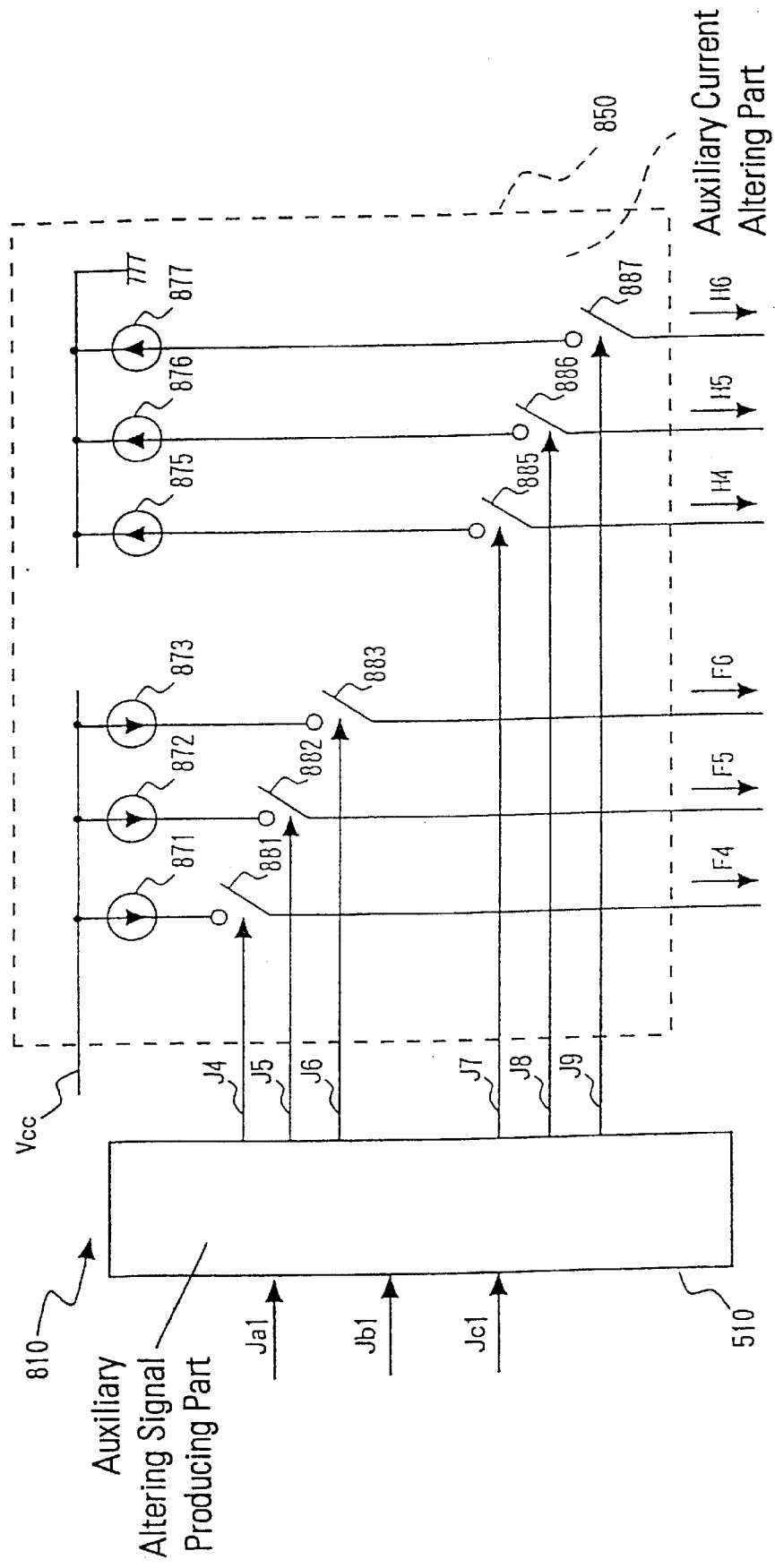
FIG. 25 is a circuit diagram of an auxiliary supply part 810 in the embodiment 5.

The auxiliary supply part 810 in FIG. 23 supplies the three-phase first auxiliary current signals F4, F5, and F6 to the conduction control terminmal sides of the first power amplifying parts 611, 612, and 613 according to output signals from the altering signal producing part 34 and supplies the three-phase second auxiliary current signals H4, H5, and H6 to the conduction control terminal sides of the second power amplifying parts 815, 816, and 817 according to output signals from the altering signal producing part 34. FIG. 25 shows a configuration of the auxiliary supply part 810. The configuration of the auxiliary altering signal producing part 510 of the auxiliary supply part 810 is the same as that shown in FIGS. 14 and 15. Thus, detailed explanation for the part 510 will be omitted here. The auxiliary current altering part 850 includes three first current sources 871, 872, 873, three second current sources 875, 876, and 877, three first switch circuits 881, 882, and 883, and three second switch circuits 885, 886, and 887. The first current sources 871, 872, and 873 are connected to the positive terminal side of the DC power source part 50 and the second current sources 875, 876, and 877 are connected to the negative terminal side of the DC power source part 50.

The first switch circuits 881, 882, and 883 are switched on according to the "Hb" states of the auxiliary altering signals J4, J5, and J6 of the auxiliary altering signal producing part 510, respectively, thereby supplying current signals of the first current sources 871, 872, and 873 as the first auxiliary current signals F4, F5, and F6. The second switch circuits 885, 886, and 887 are switched on according to the "Hb" states of the auxiliary altering signals J7, J8, and J9 of the auxiliary altering signal producing part 510, respectively, thereby supplying current signals of the second current sources 875, 876, and 877 as the second auxiliary current signals H4, H5, and H6.

The relationship of waveforms between the first amplified current signals F1, F2, and F3 and the first auxiliary current signals F4, F5, and F6 is the same as that illustrated in FIGS. 17(g) and (a) to (c). The relationship of waveforms between the second amplified current signals H1, H2, and H3 and the second auxiliary current signals H4, H5, and H6 is the same as that illustrated in FIGS. 17(h) and (d) to (f).

The remainder of the configuration and operation is similar as that in the embodiment 1, 2, 3, or 4. Thus detailed explanation thereof will be omitted here.

In this embodiment, since the first NMOS-FET power transistors of the first power amplifying parts perform high frequency on/off switching, the power loss of the first power amplifying parts is small. In addition, since the second PMOS-FET power transistors of the second power amplifying parts are turned on fully or perform high frequency on/off switching, the power loss of the second power amplifying parts is small. Consequently, this embodiment can provide a motor with excellent power efficiency. In addition, the first and second amplified current signals are changed in magnitude corresponding to the command signal Ad, thereby reducing the power loss caused by an input currents to the first and second power amplifying parts.

Furthermore, since the first NMOS-FET power transistors are used in the first power amplifying parts and the second PMOS-FET power transistors are used in the second power amplifying parts, no high-voltage outputting part is used and no voltage source part except for the DC power source part 50 is used for controlling the power transistors. Thus, the configuration of the motor can be simplified very much.

In this embodiment, while an NMOS-FET power transistor and a PMOS-FET power transistor have different non-linear voltage amplifying gains, the variation of the current amplifying rates of the first and second power amplifying parts can be reduced remarkably by the configuration of the FET power current-mirror circuits in them.

Furthermore, since the first amplified current signals (as first three-phase current signals), and the second amplified signals (as second three-phase current signals) are changed in magnitude corresponding to the command signal Ad, the altering operation of the current paths to the windings can be achieved smoothly even when the command signal Ad is changed.

This embodiment can thus have similar advantages as those of the above embodiments.

Furthermore, in this embodiment, each of the first power amplifying parts 611, 612, and 613 can be modified freely. For example, the power amplifying part 640 shown in FIG. 20 can be used as each of the first power amplifying parts 611, 612, and 613.

Figure 28:
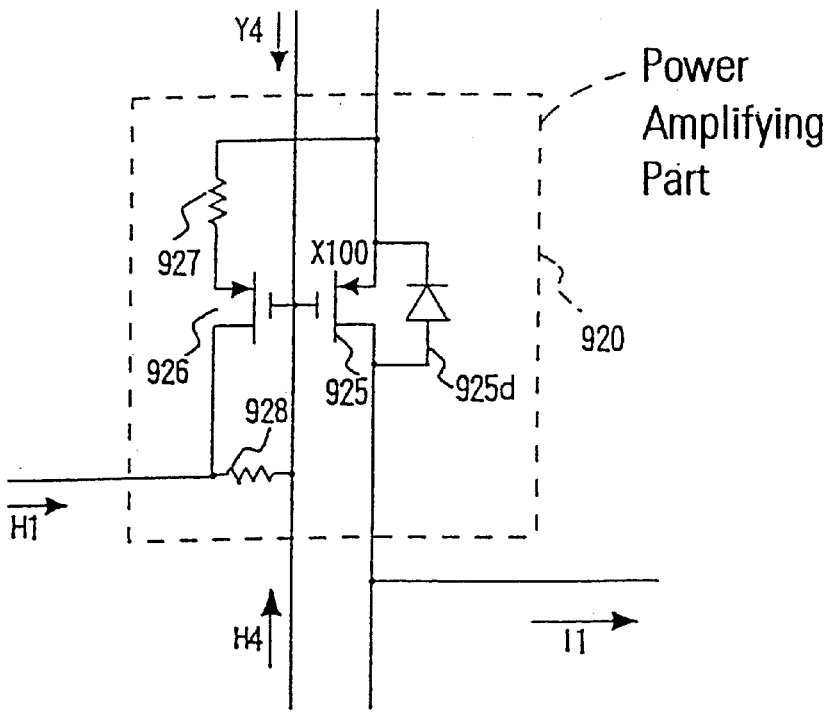
FIG. 28 is a circuit diagram showing another configuration of the second amplifying part in the embodiment of the present invention.

Furthermore, each of the second power amplifying parts 815, 816, and 817 can be modified freely. For example, FIG. 28 illustrates another configuration of the power amplifying part 920 usable as each of the second power amplifying parts 815, 816, and 817. In this example, the power amplifying part 920 is used as the second power amplifying part 815. The power amplifying part 920 includes an FET power current-mirror circuit consisting of an PMOS-FET power transistor 925, a power diode 925*d*, an PMOS-FET transistor 926, and resistors 927 and 928. The current input terminal side of the power diode 925*d* is connected to the current output terminal side of the PMOS-FET power transistor 925 and the current output terminal side thereof is connected to the current input terminal side of the PMOS-FET power transistor 925. The first terminal of the conduction control terminal side of the power amplifying part 920 is connected to one terminal of the current path terminal pair of the PMOS-FET transistor 926 and a resistor 927 is connected between the other terminal of the current path terminal pair of the PMOS-FET transistor 926 and one terminal of the current path terminal pair of the PMOS power transistor 925 and a resistor 928 is connected between the first and second terminals of the conduction control terminal side thereof. The third terminal of the conduction control terminal side is connected to the control terminal side of the PMOS-FET power transistor 925. Consequently, the FET power current-mirror circuit of the power amplifying part 920 has a considerably large current amplifying rate. In addition, the second auxiliary current signal H4 supplied to the second terminal of the conduction control terminal side reduces the power loss caused by the on-resistance of the PMOS-FET power transistor 925. The PMOS-FET power transistor 925 and the FET power current-mirror circuit of the power amplifying part 920 perform high frequency on/off switching when the control pulse signal Y4 supplied to the third terminal of the conduction control terminal side is turned on/off. The PMOS-FET power transistor 925 is configured, for example, by an FET transistor with double diffused P channel MOS structure and a parasitic diode device of the PMOS-FET power transistor 925 is used as a power diode 925*d*. The resistors 927 or/and 928 of the power amplifying part 920 are omissible with no operation problem.

<<Embodiment 6>>

Figure 29:
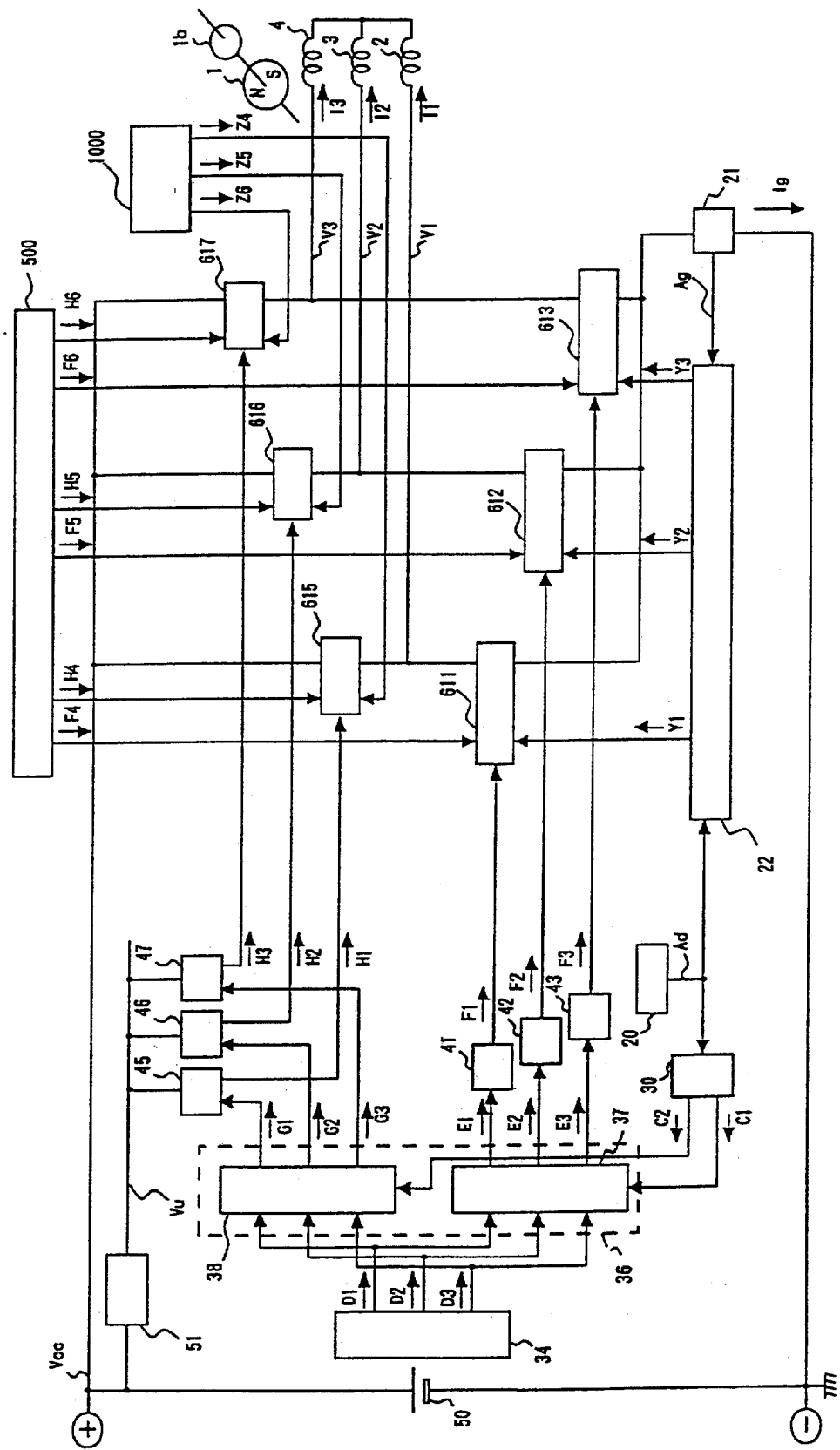
FIG. 29 is a diagram showing the configuration of the embodiment 6 of the present invention.
Figure 30:
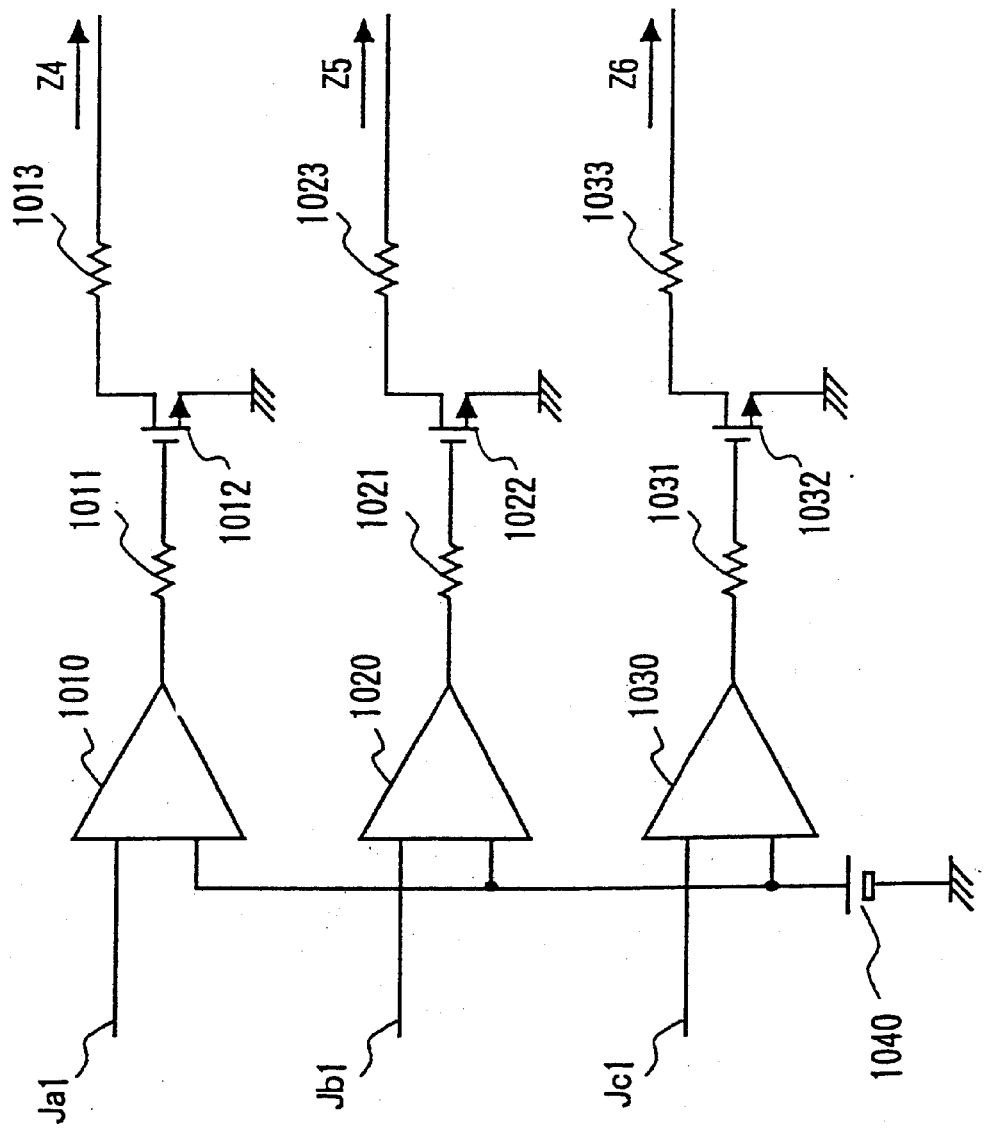
FIG. 30 is a circuit diagram of an off-operation part 1000 in the embodiment 6.

FIGS. 29 and 30 illustrate the motor in the embodiment 6 of the present invention. FIG. 29 shows a configuration of the motor. In the embodiment 6, an off operation part 1000 is provided newly. In the other configuration, components similar to the foregoing embodiment 1, 2, 3, 4, and 5 are designated by the same numerals, and detailed explanation thereof is omitted.

In FIG. 29, the first power amplifying part 611 receives the first amplified current signal F1 from the first current amplifying part 41 via the first terminal of its conduction control terminal side, the first auxiliary current signal F4 from the auxiliary supply part 500 via the second terminal of its conduction control terminal side, and the control pulse signal Y1 from the switching control part 22 via the third terminal of its conduction control terminal side, respectively. In the same way, the first power amplifying part 612 receives the first amplified current signal F2 from the first current amplifying part 42 via the first terminal of its conduction control terminal side, the first auxiliary current signal F5 from the auxiliary supply part 500 via the second terminal of its conduction control terminal side, and the control pulse signal Y2 from the switching control part 22 via the third terminal of its conduction control terminal side, respectively. In the same way, the first power amplifying part 613 receives the first amplified current signal F3 from the first current amplifying part 43 via the first terminal of its conduction control terminal side, the first auxiliary current signal F6 from the auxiliary supply part 500 via the second terminal of its conduction control terminal side, and the control pulse signal Y3 from the switching control part 22 via the third terminal of its conduction control terminal side, respectively.

The second power amplifying part 615 receives the second amplified current signal H1 from the second current amplifying part 45 via the first terminal of its conduction control terminal side, the second auxiliary current signal H4 from the auxiliary supply part 500 via the second terminal of its conduction control terminal side, and an off current signal Z4 from the off operation part 1000 via the third terminal of its conduction control terminal side, respectively. In the same way, the second power amplifying part 616 receives the second amplified current signal H2 from the second current amplifying part 46 via the first terminal of its conduction control terminal side, the second auxiliary current signal H5 from the auxiliary supply part 500 via the second terminal of its conduction control terminal side, and the off current signal Z5 from the off operation part 1000 via the third terminal of its conduction control terminal side, respectively. In the same way, the second power amplifying part 617 receives the second amplified current signal H3 from the second current amplifying part 47 via the first terminal of its conduction control terminal side, the second auxiliary current signal H6 from the auxiliary supply part 500 via the second terminal of its conduction control terminal side, and the off current signal Z6 from the off operation part 1000 via the third terminal of its conduction control terminal side, respectively.

The off current signal Z4 of the off operation part 1000 causes the second power amplifying part 615 to be turned off when the first power amplifying part 611 is performing high frequency switching. When the second power amplifying part 615 becomes to be conducted, the off current signal Z4 enters the no-signal state (zero current) so that the second power amplifying part 615 is controlled according to the input current signal to the conduction control terminal side. In the same way, the off current signal Z5 of the off operation part 1000 causes the second power amplifying part 616 to be turned off when the first power amplifying part 612 is performing high frequency switching. When the second power amplifying part 616 becomes to be conducted, the off current signal Z5 enters the no-signal state (zero current) so that the second power amplifying part 616 is controlled according to the input current signal to the conduction control terminal side. In the same way, the off current signal Z6 of the off operation part 1000 causes the second power amplifying part 617 to be turned off when the first power amplifying part 613 is performing high frequency switching. When the second power amplifying part 617 becomes to be conducted, the off current signal Z6 enters the no-signal state (zero current) so that the second power amplifying part 617 is controlled according to the input current signal to the conduction control terminal side.

FIG. 30 illustrates a configuration of the off operation part 1000. A comparator 1010 of the off operation part 1000 compares an output signal Ja1 of the altering signal producing part 34 with a predetermined voltage so as to turn on/off the NMOS-FET transistor 1012 according to the comparison result. As a result, the off current signal Z4 is output, thereby turning off the second power amplifying part 615 surely. In the same way, another comparator 1020 of the off operation part 1000 compares an output signal Jb1 of the altering signal producing part 34 with the predetermined voltage so as to turn on/off the NMOS-FET transistor 1022 according to the comparison result. As a result, the off current signal Z5 is output, thereby turning off the second power amplifying part 616 surely. In the same way, another comparator 1030 of the off operation part 1000 compares an output signal Jc1 of the altering signal producing part 34 with the predetermined voltage so as to turn on/off the NMOS-FET transistor 1032 according to the comparison result. As a result, the off current signal Z6 is output, thereby turning off the second power amplifying part 617 surely.

The remainder of the configuration and operation is similar as that in the embodiment 3, 2, and 1. Thus, detailed explanation thereof will be omitted here.

In this embodiment, when each of the conducted first power amplifying parts performs high frequency switching, each of the second power amplifying parts of the same phase is turned off by each of the off current signals from the off operation part 1000. Thus, even when each of the drive voltage signals is a high frequency pulse voltage with a large amplitude, it is possible to prevent unnecessary current through each of the second power amplifying parts which should be in the off state. Especially, when each of the second power amplifying parts includes an FET power current-mirror circuit, such an unnecessary current is apt to be flown through it. Thus, the off operation part 1000 is very effective to prevent such the unnecessary current.

In the above configuration, only the first power amplifying parts perform high frequency switching. However, both first and second power amplifying parts may perform high frequency switching. Besides, when a first power amplifying part remains off, the first power amplifying part can be maintained off forcibly by another off signal from the off operation part.

This embodiment can thus obtain similar advantages as those in the above embodiments.

In the detailed configuration of each of the foregoing embodiments, various modifications are possible. For example, the winding of each phase can be configured by a plurality of partial windings connected in series or in parallel. The three-phase windings are not limited to a star connection configuration, but a delta connection configuration can be employed. Generally, a motor having plural-phase windings can be realized. Further, the field part of the movable member is not limited to the illustrated one. Also, the number of magnetic poles is not limited to two; generally, a motor having a plurality of magnetic poles can be realized. Moreover, the field part is only required to supply the windings with the magnetic flux that varies in accordance with the movement of the movable member, and various known configurations are possible. Various motors, such as brushless motors, permanent magnet stepping motors, reluctance stepping motors, and hybrid stepping motors, and so on, can be configured according to the present invention, and therefore these motors are also in the scope of the present invention. Furthermore, the movement of the movable member is not limited to a rotational motion, but a motor of a linear motion can be realized. The configurations of the switching control part, the current detecting part, the distributed signal producing part, each of the first current amplifying parts, and each of the second current amplifying parts are not limited only to the ones described above. All or part of the functions of the switching control part, as well as other predetermined functions can be executed digitally using a microprocessor.

Figure 31:
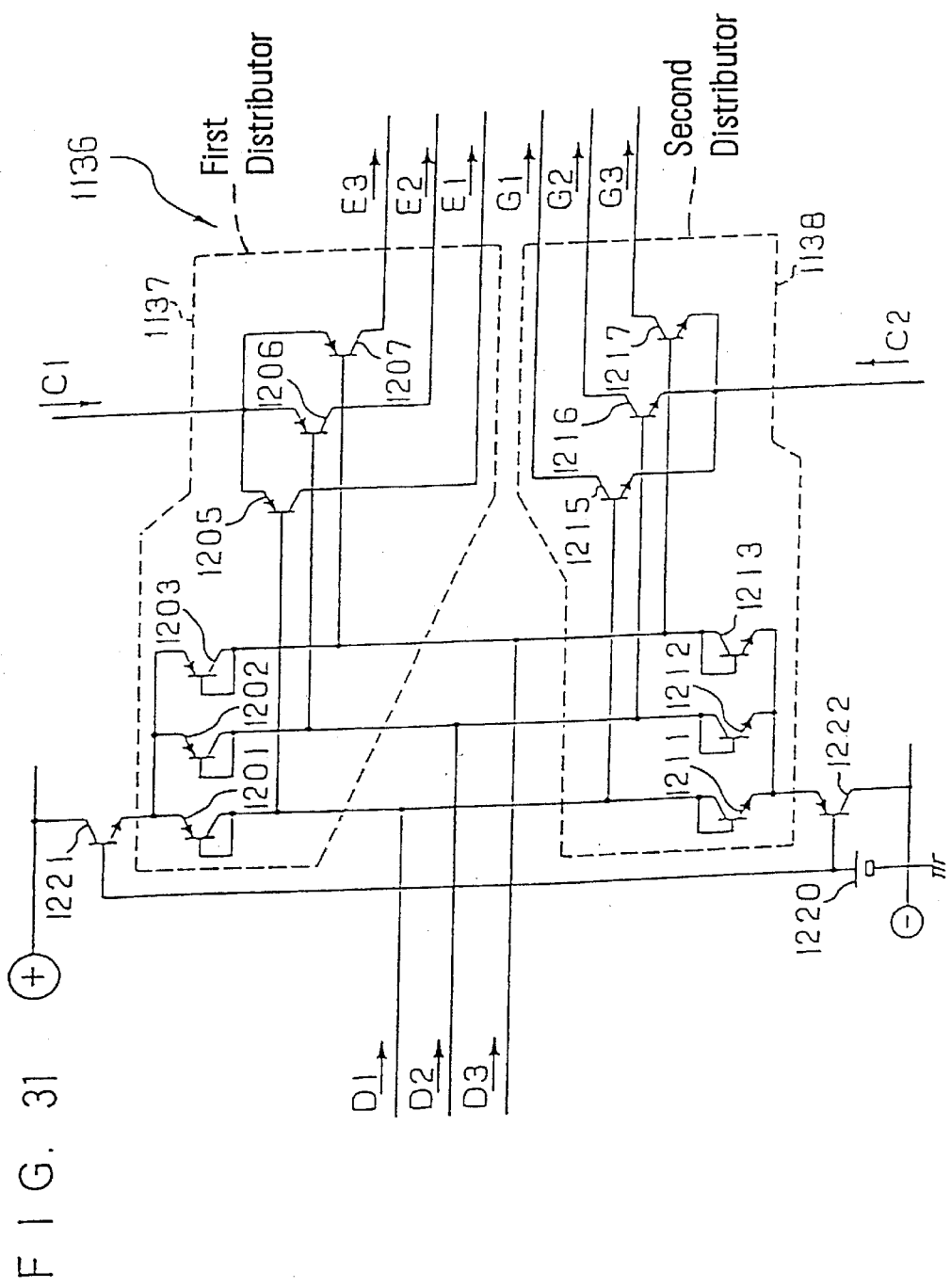
FIG. 31 is a circuit diagram showing another configuration of the distributed signal producing part in the embodiment of the present invention.

The distributed signal producing part is not limited to the one as described above. FIG. 31 illustrates the distributed signal producing part 1136 in another configuration, which will be described. The distributed signal producing part 1136 includes a first distributor 1137 and a second distributor 1138. The first distributor 1137 distributes the first supply current signal C1 of the supply signal producing part 30 according to the three-phase altering current signals D1, D2, and D3 from the altering signal producing part 34, and produces first three-phase distributed current signals E1, E2, and E3, each varying smoothly. The second distributor 1138 distributes the second supply current signal C2 of the supply signal producing part 30 according to the three-phase altering current signals D1, D2, and D3 from the altering signal producing part 34, and produces second three-phase distributed current signals G1, G2, and G3, each varying smoothly.

The first distributor 1137 is composed of three first input transistors 1201, 1202, and 1203, and three first distributing transistors 1205, 1206, and 1207. The conduction control terminal and the signal input terminal of the current path terminal pair of each of the first input transistors 1201, 1202, and 1203 are connected to the current input-output terminal side of the distributed signal producing part 1136, to which each of three-phase altering current signals D1, D2, and D3 is entered from the altering signal producing part 34. The signal output terminals of the current path terminal pairs of the first input transistors 1201, 1202, and 1203 are connected commonly. The current signal input terminal sides of the first distributing transistors 1205, 1206, and 1207 are connected commonly, so that the first supply current signal C1 of the supply signal producing part 30 is entered to the common-connected terminal side. The conduction control terminal sides of the first distributing transistors 1205, 1206, and 1207 are connected to the current input-output terminal sides of the distributed signal producing part 1136, to which three-phase altering current signals D1, D2, and D3 are entered, respectively. Consequently, the three first distributing transistors 1205, 1206, and 1207 output three-phase first distributed current signals E1, E2, and E3 from their current signal output terminal sides. The first input transistors 1201, 1202, and 1203 are identical in type to the first distributing transistors 1205, 1206, and 1207. In this embodiment, a PNP bipolar transistor is used for each of the first input transistors 1201, 1202, and 1203, as well as for each of the first distributing transistors 1205, 1206, and 1207. The conduction control terminal of each of the first input transistors is the base terminal, the signal input terminal of the current path terminal pair is the collector terminal, and the signal output terminal of the current path terminal pair is the emitter terminal. The conduction control terminal of each of the first distributing transistors is the base terminal, the current signal input terminal is the emitter terminal, and the current signal output terminal is the collector terminal.

The second distributor 1138 is composed of three second input transistors 1211, 1212, and 1213, and three second distributing transistors 1215, 1216, and 1217. The conduction control terminal and the signal input terminal of the current path terminal pair of each of the second input transistors 1211, 1212, and 1213 are connected to the current input-output terminal side of the distributed signal producing part 1136, to which each of three-phase altering current signals D1, D2, and D3 is entered from the altering signal producing part 34. The signal output terminals of the current path terminal pairs of the second input transistors 1211, 1212, and 1213 are connected commonly. The current signal input terminal sides of the second distributing transistors 1215, 1216, and 1217 are connected commonly, so that the second supply current signal C2 of the supply signal producing part 30 is entered to the common-connected terminal side. The conduction control terminal sides of the second distributing transistors 1215, 1216, and 1217 are connected to the current input-output terminal sides of the distributed signal producing part 1136, to which three-phase altering current signals D1, D2, and D3 are entered, respectively. Consequently, the three second distributing transistors 1215, 1216, and 1217 output three-phase second distributed current signals G1, G2, and G3 from their current signal output terminal sides. The second input transistors 1211, 1212, and 1213 are identical in type to the second distributing transistors 1215, 1216, and 1217. In addition, the type of the second input transistors 1211, 1212, and 1213 is different from the type of the first input transistors 1201, 1202, and 1203. In this embodiment, an NPN bipolar transistor is used for each of the second input transistors 1211, 1212, and 1213, as well as for each of the second distributing transistors 1215, 1216, and 1217. The conduction control terminal of each of the second input transistors is the base terminal, the signal input terminal of the current path terminal pair is the collector terminal, and the signal output terminal of the current path terminal pair is the emitter terminal. The conduction control terminal of each of the second distributing transistors is the base terminal, the current signal input terminal is the emitter terminal, and the current signal output terminal is the collector terminal. In addition, a reference voltage source 1220 and transistors 1221 and 1222 together form a supplying block of predetermined voltages. The supplying block of predetermined voltages supplies a first DC voltage to the common-connected terminal of the first input transistors 1201, 1202, and 1203 and a second DC voltage to the common-connected terminal of the second input transistors 1211, 1212, and 1213.

Consequently, when the altering current signal D1 is a negative current part, the first input transistor 1201 is conducted and the second input transistor 1211 is not conducted. When the altering current signal D1 is a positive current part, the second input transistor 1211 is conducted and the first input transistor 1201 is not conducted. In other words, according to the polarity of the altering current signal D1, a smooth current is supplied in a complementary manner to the first and second input transistors 1201 and 1211. Thus, a current is never flown concurrently into both the first and second input transistors 1201 and 1211. In the same way, when the altering current signal D2 is a negative current part, the first input transistor 1202 is conducted. When the altering current signal D2 is a positive current part, the second input transistor 1212 is conducted. In the same way, when the altering current signal D3 is negative current part, the first input transistor 1203 is conducted. When the altering current signal D3 is a positive current part, the second input transistor 1213 is conducted.

The first distributing transistors 1205, 1206, and 1207 of the first distributor 1137 distribute the first supply current signal C1 to the current signal output terminal sides according to the three-phase currents flowing in the first input transistors 1201, 1202, and 1203, thereby producing the three-phase first distributed current signals E1, E2, and E3. Consequently, the three-phase first distributed current signals E1, E2, and E3 are varied smoothly according to the negative current parts of the three-phase altering current signals D1, D2, and D3, so that the sum value of the distributed current signals E1, E2, and E3 becomes equal to the value of the first supply current signal C1. In the same way, the second distributing transistors 1215, 1216, and 1217 of the second distributor 1138 distribute the second supply current signal C2 to the current signal output terminal sides according to the three-phase currents flowing in the second input transistors 1211, 1212, and 1213, thereby producing the three-phase second distributed current signals G1, G2, and G3. Consequently, the three-phase second distributed current signals G1, G2, and G3 are varied smoothly according to the positive current parts of the three-phase altering current signals D1, D2, and D3, so that the sum value of the distributed current signals G1, G2, and G3 becomes equal to the value of the second supply current signal C2. The waveforms of the three-phase first distributed current signals E1, E2, and E3, and the three-phase second distributed current signals G1, G2, and G3 become the same as those shown in FIG. 9.

Furthermore, various types of single chip IC technologies using a well-known semiconductor process can be used for integrating the parts of the above motor into an IC. For example, there is a technology usable for various types of single chip ICs. The technology can use a single type or plural types of FET transistors with double diffused MOS structure and FET transistors with CMOS structure. Whether single type or plural types of transistors is used, the substraight of the IC can be connected to a potential (ground potential) of the negative terminal side of a DC power source, thereby integrating transistors, resistors, and some other components in a high density. The technology is not limited to the above-mentioned one, but a dielectric isolation technology can also be used for integrating transistors and resistors. The specific transistor layout within the chip is a design matter, so detailed explanation will be omitted here.

Power diodes of power amplifying parts can be disposed together with power transistors in an IC, but they can be disposed outside the IC as needed. For example, a Schottkey barrier power diode may be connected reversely in parallel to each of power transistors. The first amplifying part current-mirror circuit of each of the first current amplifying parts and the second amplifying part current-mirror circuit of each of the second current amplifying parts may be provided with non-linear current amplifying characteristics so that when a current is increased, the current amplifying rate is also increased.

The switching control part has enabled highly accurate controlling of currents by controlling switching operations of each power amplifying part according to the result of comparison between a current detected signal and a command signal. The present invention is not limited only to such a configuration, however. Various modifications are possible. For example, the switching control part may cause at least one of either or both first power amplifying parts and second power amplifying parts to perform switching according to a single switching control signal. Furthermore, either or both first power amplifying parts and second power amplifying parts may perform switching according to plural-phase switching control signals. The current detecting part may be inserted into the positive terminal side of the DC power source part. The current detecting part is not limited only to a method for detecting a supply current from a DC power source directly; various well-known methods can apply to the current detecting method of the current detecting part. For example, the current detecting part may be composed to obtain a signal corresponding to a conducted current of each FET power transistor.

The configuration of the auxiliary supply part is not limited only to the one for outputting an auxiliary current signal. For example, it may be decided so as to supply an auxiliary voltage signal to the conduction control terminal side of each of the power amplifying parts. The auxiliary signal of the auxiliary supply part can reduce the on-resistance of each FET power transistor of each power amplifying part, thereby reducing the power loss caused by the on-resistance without disturbing the smooth altering operation of each current path.

Each of the windings may be composed to receive any of two-way and one-way currents. The current supplied to each winding may be changed over between two-way and one-way currents as needed.

Figure 32:
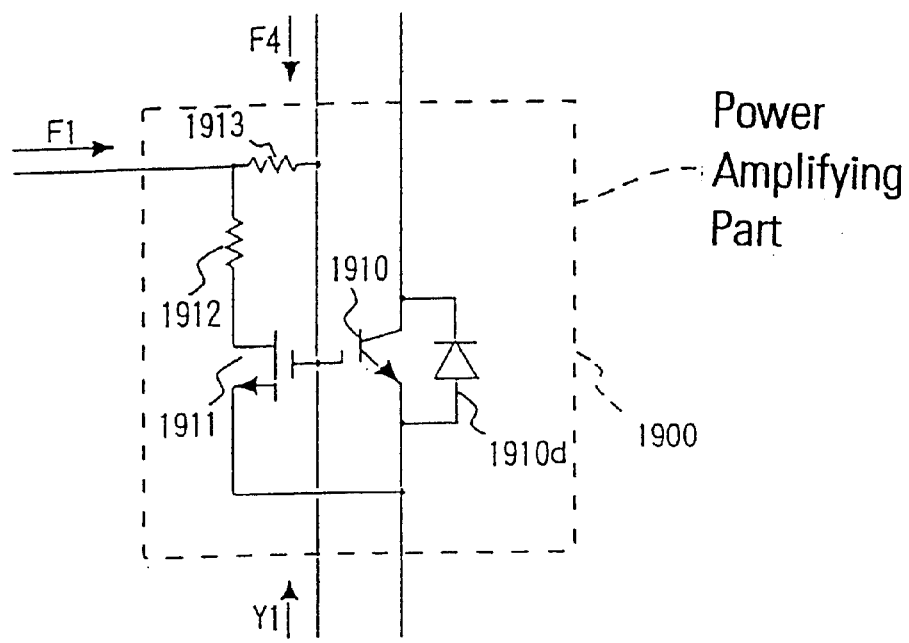
FIG. 32 is a circuit diagram showing another configuration of the power amplifying part in the embodiment of the present invention.
Figure 33:
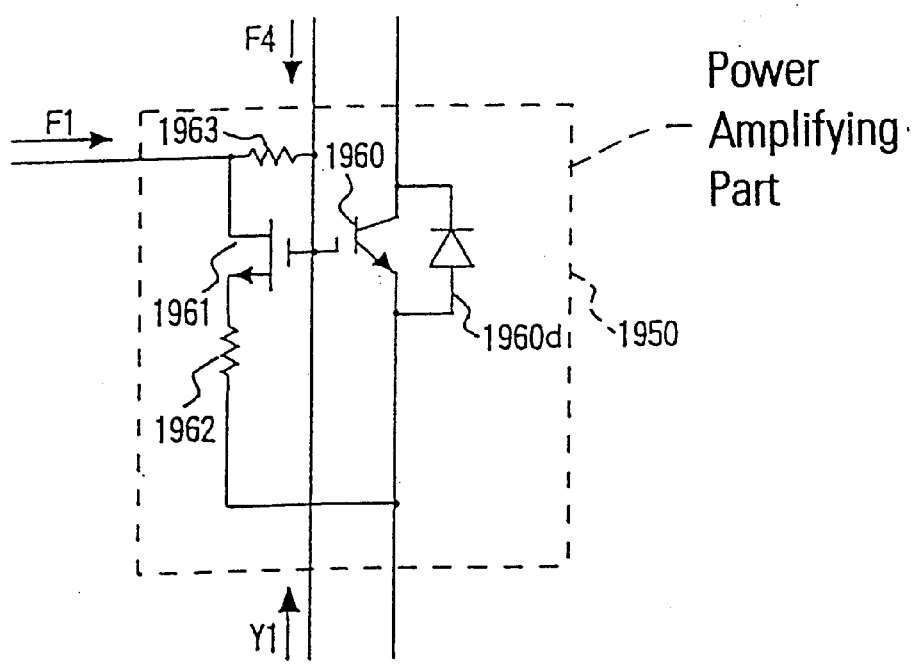
FIG. 33 is a circuit diagram showing another configuration of the power amplifying part in the embodiment of the present invention.
Figure 34:
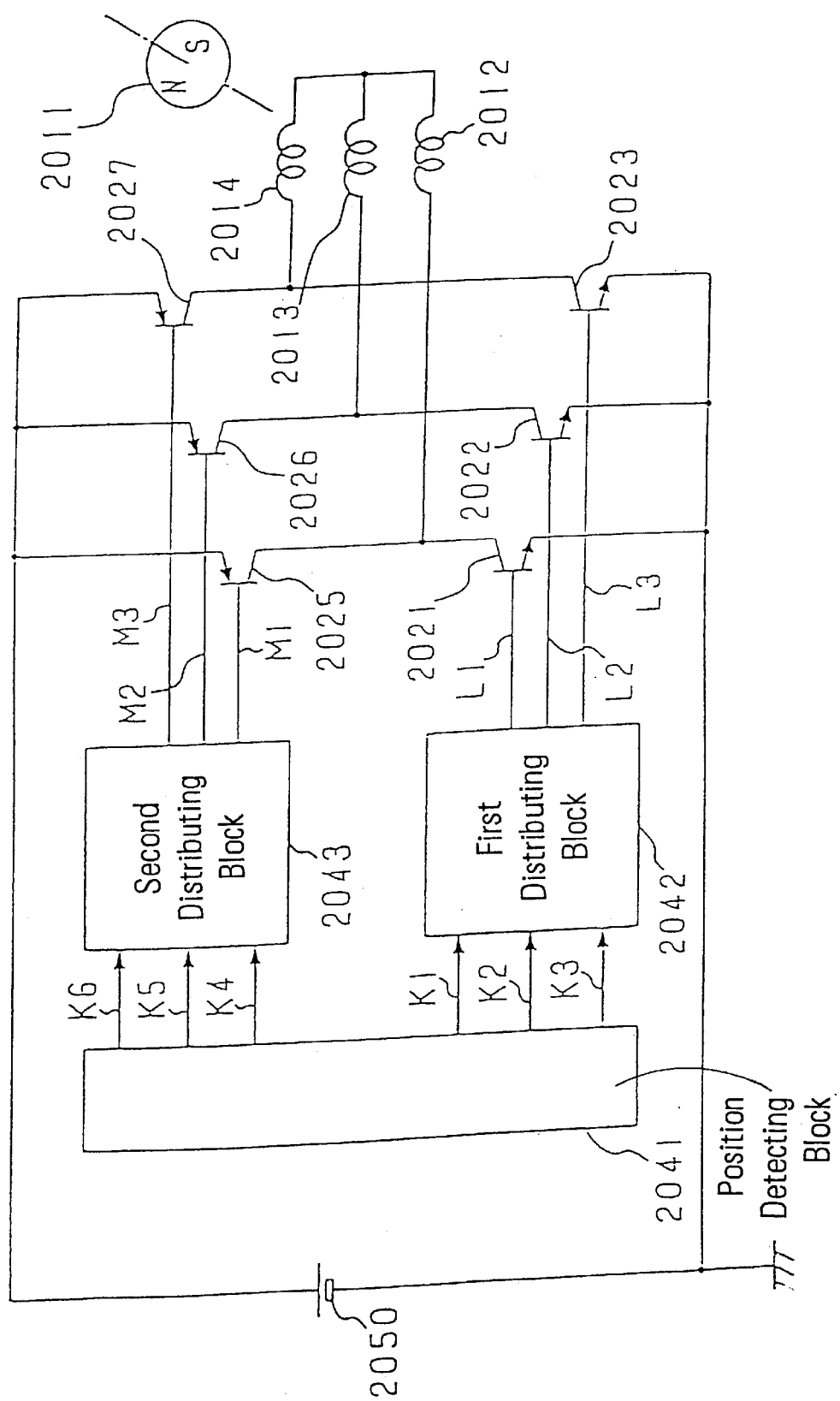
FIG. 34 is a diagram showing a configuration of a prior art motor.

The first power amplifying parts and second power amplifying parts are not limited to the illustrated configuration, but various modifications are possible. In the foregoing embodiments, a power amplifying part having a power current-mirror circuit of FET power transistors is shown as a preferred example, but the invention is not limited to such a configuration. For example, an IGBT transistor (Insulated Gate Bipolar Transistor) or COMFET transistor (Conductivity Modulated Field Effect Transistor) is a composite FET power transistor having a nonlinear voltage amplification characteristic and is used as an on-off switching device, because of a large variation of the amplification characteristic. However, since the IGBT transistor is a composite FET transistor having an FET transistor at the input side, an FET power current-mirror circuit can be configured by using the IGBT transistor, thereby configuring a power amplifying part which includes an IGBT power transistor and has a current amplifying characteristic. By supplying a current signal, varying smoothly or substantially smoothly at least in the rising and/or falling slope portions, to the conduction control terminal side of such a power amplifying part, it becomes possible to alter the current paths smoothly. Though the composite FET transistor has many shortcomings (large ON voltage, large variation in amplification gain, etc.), the various effects shown in the present invention can be obtained. Accordingly, the FET transistors in the present invention include the IGBT transistor or composite FET transistor having an FET transistor at the input side. FIG. 32 shows an example of a power amplifying part 1900 having a composite FET power transistor 1910 such as the IGBT transistor. In this configuration, the power amplifying part 1900 is used as the first power amplifying part 611. With the connection of the composite FET power transistor 1910, an FET transistor 1911 and resistors 1912 and 1913, an FET power current-mirror circuit is formed equivalently. With this configuration, the input current to the conduction control terminal side of the power amplifying part 1900 is amplified, and the drive current is output through the current path terminal pair of the composite FET transistor 1910. A power diode 1910*d* is a parasitic diode connected equivalently and reversely in parallel to the current path terminal pair of the composite FET power transistor 1910. The composite FET power transistor 1910 performs a full-on operation with a voltage drop including a bias value of a voltage. The power amplifying part 1900 can perform high frequency switching by the switching control part, and can alter current paths smoothly according to a input current signal varying smoothly at least in rising and falling slopes. The power amplifying part 1900 can be used instead of each of the first and second power amplifying parts. The resistors 1912 and 1913 may be zero and thus omissible. FIG. 33 shows another example of a power amplifying part 1950 having a composite FET power transistor 1960 such as the IGBT transistor. With the connection of the composite FET power transistor 1960, an FET transistor 1961, and resistors 1962 and 1963, an FET power current-mirror circuit is formed equivalently.

Further, an excellent disk apparatus with much reduced pulsation of a generated torque and reduced vibration can be realized according to the invention.

It will also be appreciated that various other modifications are possible without departing from the scope of the present invention and such modifications are also included in the invention.

What is claimed is:

1. A motor comprising:
    a movable member;
    Q-phase windings (Q being an integer of 3 or more);
    voltage supplying means, including two output terminals, for supplying a DC voltage;
    Q first power amplifying means each including a first power transistor for forming a current path between one output terminal side of said voltage supplying means and one of said Q-phase windings;
    Q second power amplifying means each including a second power transistor for forming a current path between the other output terminal side of said voltage supplying means and one of said Q-phase windings;

altering signal producing means for producing altering signals;

first distribution control means for producing first Q-phase signals responding with at least one of the altering signals of said altering signal producing means, so as to determine an active period of each of said Q first power amplifying means responding with said first Q-phase signals, the active period being an active electrical angle larger than 360/Q degrees, thereby causing at least one of said Q first power amplifying means to be in the active period;

second distribution control means for producing second Q-phase signals responding with at least one of the altering signals of said altering signal producing means, so as to determine an active period of each of said Q second power amplifying means responding with said second Q-phase signals, the active period being an active electrical angle larger than 360/Q degrees, thereby causing at least one of said Q second power amplifying means to be in the active period; and switching operation means for causing at least one power amplifying means among said Q first power amplifying means and said Q second power amplifying means to perform high-frequency switching;

said switching operation means including:

current detecting means for obtaining a current detected signal corresponding to a composed supply current of negative or positive parts of Q-phase drive currents to said Q-phase windings, and switching control means for comparing an output signal of said current detecting means with a command signal and switching at least said Q first power amplifying means simultaneously to an off state when the output signal of said current-detecting means reaches the command signal, thereby causing said at least one power amplifying means among said Q first power amplifying means and said Q second power amplifying means to perform high-frequency switching responding with the comparison result.

2. The motor in accordance with claim 1, wherein said first distribution control means includes means for supplying first Q-phase current signals as said first Q-phase signals to conduction control terminal sides of said Q first power amplifying means, each first Q-phase current signal having an active electrical angle larger than 360/Q degrees.

3. The motor in accordance with claim 1, wherein said first distribution control means includes means for varying at least some part of at least one of said first Q-phase signals corresponding to the command signal.

4. The motor in accordance with claim 1, wherein said first distribution control means for supplying first Q-phase current signals as said first Q-phase signals to control terminal sides of said Q first power amplifying means, each first Q-phase current signal varying substantially smoothly in at least one of rising and falling slopes.

5. The motor in accordance with claim 1, wherein said second distribution control means includes means for supplying second Q-phase current signals as said second Q-phase signals to conduction control terminal sides of said Q second power amplifying means, each second Q-phase current signal varying substantially smoothly in at least one of rising and falling slopes.

6. The motor in accordance with claim 1, wherein said first distribution control means includes auxiliary supply means for supplying at least an auxiliary signal to a conduction terminal side of at least one power amplifying means among said Q first power amplifying means.

7. The motor in accordance with claim 1, wherein at least one power amplifying means among said Q first power amplifying means and said Q second power amplifying means includes an FET power current-mirror circuit having an FET power transistor thereby performing current amplifying of an input current signal to a conduction control terminal side of said at least one power amplifying means.

8. The motor in accordance with claim 1, wherein said active period of each of said Q first power amplifying means is an active electrical angle of at least 150 degrees.

9. A motor comprising:

a movable member;

Q-phase windings (Q being an integer of 3 or more);

voltage supplying means, including two output terminals, for supplying a DC voltage;

Q first power amplifying means each including a first power transistor for forming a current path between one output terminal side of said voltage supplying means and one of said Q-phase windings;

Q second power amplifying means each including a second power transistor for forming a current path between the other output terminal side of said voltage supplying means and one of said Q-phase windings;

altering signal producing means for producing altering signals;

first distribution control means for producing first Q-phase current signals responding with at least one of the altering signals of said altering signal producing means, so as to determine an active period of each of said Q first power amplifying means responding with said first Q-phase current signals, thereby causing at least one of said Q first power amplifying means to be in the active period;

second distribution control means for producing second Q-phase current signals responding with at least one of the altering signals of said altering signal producing means, so as to determine an active period of each of said Q second power amplifying means responding with said second Q-phase current signals, thereby causing at least one of said Q second power amplifying means to be in the active period; and switching operation means for causing at least one power amplifying means among said Q first power amplifying means to perform high-frequency switching;

said switching operation means including:

current detecting means for obtaining a current detected signal corresponding to a composed supply current of negative or positive parts of the Q-phase drive currents to said Q-phase windings, and switching control means for comparing an output signal of said current detecting means with a command signal and switching at least said Q first power amplifying means simultaneously to an off state when the output signal of said current detecting means reaches the command signal, thereby causing said at least one power amplifying means among said Q first power amplifying means to perform high-frequency switching responding with the comparison result.

10. A motor comprising a movable member;

Q-phase windings (Q being an integer of 3 or more);

voltage supplying means, including two output terminals, for supplying a DC voltage;

Q first power amplifying means each including a first power transistor for forming a current path between one output terminal side of said voltage supplying means and one of said Q-phase windings;

Q second power amplifying means each including a second power transistor for forming a current path between the other output terminal side of said voltage supplying means and one of said Q-phase windings;

altering signal producing means for producing altering signals;

first distribution control means for producing first Q-phase signals responding with at least one of the altering signals of said altering signal producing means, so as to determine an active period of each of said Q first power amplifying means responding with said first Q-phase signals, the active period being an active electrical angle larger than 360/Q degrees, thereby causing at least one of said Q first power amplifying means to be in the active period;

second distribution control means for producing second Q-phase signals responding with at least one of the altering signals of said altering signal producing means, so as to determine an active period of each of said Q second power amplifying means responding with said second Q-phase signals, the active period being an active electrical angle larger than 360/Q degrees, thereby causing at least one of said Q second power amplifying means to be in the active period; and switching operation means for causing at least one power amplifying means among said Q first power amplifying means and said Q second power amplifying means to perform high-frequency switching;

said switching operating means causing at least one power transistor among Q of said first power transistors and Q of said second power transistors to perform high-frequency switching at a conduction control terminal side of said at least one power transistor, and causing at least said Q first power amplifying means simultaneously to perform high-frequency switching responding with a single pulse signal.

11. The motor in accordance with claim 10, wherein said first distribution control means includes means for supplying first Q-phase current signals as said first Q-phase signals to conduction control terminal sides of said Q first power amplifying means, each first Q-phase current signal having an active electrical angle larger than 360/Q degrees.

12. The motor in accordance with claim 10, wherein said first distribution control means includes means for varying at least some part of at least one of said first Q-phase signals corresponding to a command signal which commands supply power to said Q-phase windings.

13. The motor in accordance with claim 10, wherein said first distribution control means includes means for supplying first Q-phase current signals as said first Q-phase signals to conduction control terminal sides of said Q first power amplifying means, each first Q-phase current signal varying substantially smoothly in at least one of rising and falling slopes.

14. The motor in accordance with claim 10, wherein said second distribution control means includes means for supplying second Q-phase current signals as said second Q-phase signals to conduction control terminal sides of said Q second power amplifying means, each second Q phase current signal varying substantially smoothly in at least one of rising and falling slopes.

15. The motor in accordance with claim 10, wherein said switching operation means includes:

current detecting means for obtaining a current detected signal corresponding to a composed supply current of negative or positive parts of the Q-phase drive currents to said Q-phase windings, and switching control means for comparing an output signal of said current detecting means with a command signal which commands supply power to said Q-phase windings, thereby causing at least said Q first power amplifying means simultaneously to perform high-frequency switching responding with the comparison result.

16. The motor in accordance with claim 10, wherein said first distribution control means includes auxiliary supply means for supplying at least one auxiliary signal to a conduction control terminal side of at least one of said Q first power amplifying means.

17. The motor in accordance with claim 10, wherein at least one of said Q first power amplifying means and said Q second power amplifying means includes an FET power current-mirror circuit having an FET power transistor thereby performing current amplifying of an input current signal to a conduction control terminal side.

18. The motor in accordance with claim 10, wherein said active period of each of said Q first power amplifying means is an active electrical angle of at least 150 degrees.

19. A motor comprising:

a movable member;

Q-phase windings (Q being an integer of 3 or more);

voltage supplying means, including two output terminals, for supplying a DC voltage;

Q first power amplifying means each including a first power transistor for forming a current path between one output terminal side of said voltage supplying means and one of said Q-phase windings;

Q second power amplifying means each including a second power transistor for forming a current path between the other output terminal side of said voltage supplying means and one of said Q-phase windings;

altering signal producing means for producing altering signals;

first distribution control means for controlling said Q first power amplifying means responding with at least one of the altering signals of said altering signal producing means, thereby causing at least one of said Q first power amplifying means to be in the active period; and second distribution control means for controlling said Q second power amplifying means responding with at least one of the altering signals of said altering signal producing means, thereby causing at least one of said Q second power amplifying means to be in the active period;

said first distribution control means including:

first means for supplying at least a current signal varying substantially smoothly in at least one of rising and falling slopes, to a conduction control terminal side of at least one power amplifying means among said Q first power amplifying means, and second means for supplying at least an auxiliary signal, which has an active period within an interval between the rising slope and the falling slope of said at least a current signal, to a conduction control terminal side of said at least one power amplifying means.

20. The motor in accordance with claim 19, wherein said first distribution control means includes:

first current means for supplying first Q-phase current signals to conduction control terminal sides of said Q first power amplifying means, each first Q-phase current signal varying substantially smoothly in at least one of rising and falling slopes, and first auxiliary means for supplying first Q-phase auxiliary signals to conduction control terminal sides of said Q first power amplifying means.

21. The motor in accordance with claim 19, wherein said second distribution control means includes:

second current means for supplying second Q-phase current signals to conduction control terminal sides of said Q second power amplifying means, each second Q-phase current signal varying substantially smoothly in at least one of rising and failing slopes, and second auxiliary means for supplying second Q-phase auxiliary signals to conduction control terminal sides of said Q second power amplifying means.

22. The motor in accordance with claim 19, wherein said first distribution control means includes means for varying at least some part of said at least a current signal corresponding to a command signal which commands supply power to said Q-phase windings.

23. The motor in accordance with claim 19, further comprising switching operation means for causing at least one power amplifying means among said Q first power amplifying means and said Q second power amplifying means to perform high-frequency switching.

24. The motor in accordance with claim 23, wherein said switching operation means includes:

current detecting means for obtaining a current detected signal corresponding to a composed supply current of negative or positive parts of the Q-phase drive currents to said Q-phase windings, and switching control means for comparing an output signal of said current detecting means with a command signal which commands supply power to said Q-phase windings, thereby causing at least said Q first power amplifying means simultaneously to perform high-frequency switching responding with a comparison result.

25. The motor in accordance with claim 19, wherein said first distribution control means includes means for mixing said at least a current signal with said at least an auxiliary signal, thereby supplying a mixed signal to a conduction control terminal side of said at least one power amplifying means.

26. The motor in accordance with claim 19, wherein at least one power amplifying means among said Q first power amplifying means and said Q second power amplifying means includes an FET power current-mirror circuit having an FET power transistor, thereby amplifying an input current signal to a conduction control terminal side.

27. The motor in accordance with claim 19, wherein said at least an auxiliary signal has an active electrical angle substantially equal to 360/Q degrees.

28. The motor in accordance with claim 19, wherein said at least a current signal has an active electrical angle of at least 150 degrees between the rising slope and the falling slope.

29. The motor in accordance with claim 7, wherein said FET power current-mirror circuit performs high-frequency switching responding with an output signal of said switching operation means.

30. The motor in accordance with claim 17, wherein said FET power current-mirror circuit performs high-frequency switching responding with an output signal of said switching operation means.

31. The motor in accordance with claim 26, wherein said FET power current-mirror circuit performs high-frequency switching responding with an output signal of said switching operation means.

* * * * *